(12) United States Patent
Srinivasa et al.

(10) Patent No.: US 8,793,118 B2
(45) Date of Patent: Jul. 29, 2014

(54) ADAPTIVE MULTIMODAL COMMUNICATION ASSIST SYSTEM

(75) Inventors: Gowri Srinivasa, Bangalore (IN); Himanshu Lilha, Varanasi (IN)

(73) Assignee: Pes School of Engineering, Bangalore, Karnataka (IN)

( * ) Notice: Subject to any disclaimer, the term of this patent is extended or adjusted under 35 U.S.C. 154(b) by 52 days.

(21) Appl. No.: 13/330,712

(22) Filed: Dec. 20, 2011

(65) Prior Publication Data
US 2013/0108994 A1 May 2, 2013

(30) Foreign Application Priority Data
Nov. 1, 2011 (IN) .......................... 3735/CHE/2011

(51) Int. Cl.
| | |
|---|---|
| G06F 17/28 | (2006.01) |
| G09B 21/00 | (2006.01) |
| G09B 7/00 | (2006.01) |
| G09B 19/06 | (2006.01) |
| G09B 5/00 | (2006.01) |
| G10L 13/04 | (2013.01) |
| G10L 15/26 | (2006.01) |
| G10L 21/10 | (2013.01) |
| H04M 3/42 | (2006.01) |

(52) U.S. Cl.
CPC .......... G06F 17/2872 (2013.01); G06F 17/289 (2013.01); G06F 17/2818 (2013.01); G09B 21/009 (2013.01); G09B 7/00 (2013.01); G09B 19/06 (2013.01); G09B 5/00 (2013.01); G09B 21/00 (2013.01); G10L 13/043 (2013.01); G10L 15/265 (2013.01); G10L 2021/105 (2013.01); H04M 2203/2061 (2013.01); H04M 2201/40 (2013.01); H04M 3/42391 (2013.01)
USPC ........................................................ 704/2

(58) Field of Classification Search
CPC .............. G06F 17/2872; G06F 17/289; G06F 17/2818; G09B 21/009; G09B 7/00; G09B 19/06; G09B 5/00; G09B 21/00; G10L 13/043; G10L 15/265; G10L 2021/105; H04M 2203/2061; H04M 2201/40; H04M 3/42391
USPC .......................... 434/156, 322, 323, 350, 365
See application file for complete search history.

(56) References Cited

U.S. PATENT DOCUMENTS

| | | |
|---|---|---|
| 5,544,050 A | 8/1996 | Abe et al. |
| 5,734,923 A | 3/1998 | Sagawa et al. |
| 5,887,069 A | 3/1999 | Sakou et al. |
| 5,890,120 A * | 3/1999 | Haskell et al. ................. 704/271 |
| 5,974,116 A | 10/1999 | Engelke et al. |
| 6,188,771 B1 | 2/2001 | Horrall |

(Continued)

*Primary Examiner* — Jack Yip
(74) *Attorney, Agent, or Firm* — Ash Tankha; Lipton, Weinberger & Husick

(57) ABSTRACT

A computer implemented method and system for assisting a user to learn and/or communicate in a visual communication language in one or more modes is provided. The multimodal communication assist application, provided on a user's computing device, determines the user's characteristic information based on one or more selected multimodal communication mappers. The multimodal communication assist application determines a delay factor based on the characteristic information. The multimodal communication assist application captures a modal input in one of the modes from the user via an interactive interface based on the delay factor and the characteristic information. The multimodal communication assist application processes and transforms the captured modal input in one of the modes into a modal output in another one or more of the modes and renders the modal output to the user via the interactive interface. The multimodal communication assist application generates learning components and testing components for the user.

32 Claims, 32 Drawing Sheets

(56) References Cited

U.S. PATENT DOCUMENTS

| | | |
|---|---|---|
| 6,215,890 B1 | 4/2001 | Matsuo et al. |
| 6,377,925 B1 | 4/2002 | Greene, Jr. et al. |
| 6,460,056 B1 | 10/2002 | Horii |
| 6,477,239 B1 | 11/2002 | Ohki et al. |
| 6,549,887 B1 | 4/2003 | Ando et al. |
| 7,277,858 B1 | 10/2007 | Weaver et al. |
| 7,774,194 B2 | 8/2010 | Liebermann et al. |
| 2003/0077559 A1* | 4/2003 | Braunberger et al. ......... 434/322 |
| 2003/0208289 A1* | 11/2003 | Ben-Arie ....................... 700/61 |
| 2004/0143430 A1 | 7/2004 | Said et al. |
| 2005/0196730 A1* | 9/2005 | Kellman ....................... 434/118 |
| 2007/0168450 A1* | 7/2007 | Prajapat et al. ............... 709/207 |
| 2009/0012788 A1 | 1/2009 | Gilbert et al. |
| 2009/0059031 A1* | 3/2009 | Miyakoshi ................... 348/222.1 |
| 2009/0231278 A1 | 9/2009 | St. Hilaire et al. |
| 2012/0173187 A1* | 7/2012 | Lee et al. ...................... 702/123 |

\* cited by examiner

NEW ACCOUNT

- EMAIL ID
- USERNAME
- PASSWORD
- CONFIRM PASSWORD
- SECRET QUESTION
- ANSWER

SUBMIT  CANCEL

FIG. 17

LOGIN SCREEN

CREATE ACCOUNT

USERNAME
PASSWORD

GET STARTED WITHOUT LOGGING

LOGIN

EXIT APPLICATION

FORGOT PASSWORD?

ADAPTIVE MULTIMODAL COMMUNICATION ASSIST SYSTEM

CROSS REFERENCE TO RELATED APPLICATIONS

This application claims the benefit of non-provisional patent application number 3735/CHE/2011 titled "Adaptive Multimodal Communication Assist System", filed on Nov. 1, 2011 in the Indian Patent Office.

The specification of the above referenced patent application is incorporated herein by reference in its entirety.

BACKGROUND

The computer implemented method and system disclosed herein, in general, relates to assistive technology. More particularly, the computer implemented method and system disclosed herein relates to assisting a user to learn and/or communicate in a visual communication language in one or more of multiple modes, for example, a visual mode, a text mode, an audio mode, etc.

A language is a medium for communicating thoughts, expressions, etc., of an individual. An individual with communication disabilities, for example, hearing impairment, speech disabilities, blindness, etc., faces challenges while communicating with others. A visual communication language, for example, a sign language, acts as a bridge for enabling communication between hearing impaired and inarticulate individuals and other individuals. For example, sign language uses visually transmitted sign patterns, hand gestures, etc., to communicate the thoughts, expressions, etc., of the individual.

An individual versed in a visual mode of the visual communication language faces challenges while communicating with others who are not versed in the visual mode of the visual communication language. For example, an individual with hearing impairment and speech disabilities who is versed in a sign language faces challenges while communicating with a blind individual. In another example, an individual with limited or no exposure to a sign language faces challenges in understanding and conversing with an individual having hearing impairment or speech disabilities who is versed in the sign language. In another example, an individual with hearing impairment and speech disabilities who is well versed only in one sign language format faces challenges in communicating with an individual having hearing impairment and speech disabilities who is well versed in a different sign language format. Hence, there is a need for assisting individuals with hearing impairment and speech disabilities and other individuals to learn and/or communicate in different modes of a visual communication language.

Currently, most communication assist devices are configured to recognize single handed gestures or a limited set of dual handed gestures for assisting individuals to communicate in a visual communication language. Some visual communication language gestures are based on occlusion and disambiguation which require sophisticated electronic paraphernalia for recognition. These sophisticated electronic paraphernalia are expensive and cannot be generalized to work with user defined gestures. Communication assist devices that are available are almost always pre-trained to work for a specific set of gestures and typically cannot adapt to an individual user's requirements, without intervention of a programmer or a device designer. Furthermore, systems that are designed as communication-assist devices may not function as adaptive tutors that generate and adapt lessons and tests to improve an individual user's skills in a visual communication language.

Furthermore, just as all speakers do not have the same fluency, all signers do not have the same skill or proficiency level to communicate using gestures. Therefore, if frames with gestures are sampled at a high rate, that is, with a low delay factor for a beginner, then the same words may be transcribed repeatedly or inter-gesture transitions may be transcribed erroneously as words in a communication language. Similarly, if the frames are sampled at a low rate, that is, with a high delay factor for an expert, then several words may not be transcribed as the rate at which the expert gesticulates may be much faster than the processing. Therefore, there is a need for automatically adjusting the delay factor for each user to determine the rate of sampling frames for processing.

Hence, there is a long felt but unresolved need for a computer implemented method and system that assists a user to adaptively learn, translate, and communicate a visual communication language in one or more of multiple modes. Moreover, there is a need for a computer implemented method and system that recognizes visual communication language gestures with occlusion and disambiguation and user defined visual communication language gestures based on the user's delay factor, while assisting the user to adaptively learn, translate, and communicate the visual communication language.

SUMMARY OF THE INVENTION

This summary is provided to introduce a selection of concepts in a simplified form that are further disclosed in the detailed description of the invention. This summary is not intended to identify key or essential inventive concepts of the claimed subject matter, nor is it intended for determining the scope of the claimed subject matter.

The computer implemented method and system disclosed herein addresses the above stated need for assisting a user to adaptively learn, translate, and communicate a visual communication language in one or more of multiple modes. As used herein, the term "visual communication language" refers to a communication language comprising, for example, meaningful shapes, structures, sign patterns, gestures, etc., for expressing thoughts, expressions, messages, etc., of a user. The computer implemented method and system disclosed herein also addresses the above mentioned need for recognizing visual communication language gestures with occlusion and disambiguation and user defined visual communication language gestures based on the user's delay factor, while assisting the user to adaptively learn, translate, and communicate the visual communication language.

The computer implemented method and system disclosed herein provides a multimodal communication assist application on a computing device of a user. The multimodal communication assist application provides an interactive interface to the user for enabling communication of the visual communication language in multiple modes, for example, a visual mode, a text mode, an audio mode, etc., and any combination thereof. The multimodal communication assist application provides multiple multimodal communication mappers, for example, a visual to text and/or audio mapper, a text to visual and/or audio mapper, an audio to text and/or visual mapper, etc., to the user via the interactive interface. The multimodal communication mappers map a modal input in one of the modes to a modal output in another one or more of the modes.

The user selects one or more of the multimodal communication mappers via the interactive interface. The multimodal communication assist application identifies the multimodal communication mappers selected by the user via the interactive interface. The multimodal communication assist application determines characteristic information of the user based on the identified multimodal communication mappers. As used herein, the characteristic information comprises, for example, one or more of skin color of the user, position of hands of the user, a communication language of the user, a response time of the user, for example, for mapping a text mode to a visual mode, accessories, for example, a cuff or a rim of a user's full sleeved shirt, nail polish, a wearable sticker, a watch, a bracelet, a wrist band, finger rings, tattoos, etc., of the user used by the multimodal communication assist application as markers, etc.

The multimodal communication assist application determines a delay factor for the user based on the determined characteristic information, for example, based on the response time of the user. As used herein, the term "delay factor" refers to a rate of sampling a modal input in a visual mode, for example, gestures captured from a user. The multimodal communication assist application determines a delay factor for the user as follows: The multimodal communication assist application presents one or more text elements and corresponding visual elements to the user via the interactive interface. The multimodal communication assist application captures a modal input in a visual mode from the user via the interactive interface at a predefined sampling rate, where the modal input is a simulation of the visual elements corresponding to the presented text elements. The multimodal communication assist application matches the captured modal input in the visual mode with multiple modal outputs in the visual mode, for example, gestures stored in a database maintained by the multimodal communication assist application. The multimodal communication assist application determines a response time of the user for each of the presented text elements during the capture of the matched modal input and utilizes the response time to determine the delay factor.

The determined delay factor defines the proficiency level of the user. As used herein, the term "proficiency level" refers to a level of skill attained by the user for communicating the visual communication language. The proficiency level is, for example, a beginner level, an advanced beginner level, a competent level, a professional level, an expert level, etc., assigned to the user by the multimodal communication assist application for the level of skill or the fluency in communicating the visual communication language, attained by the user.

The multimodal communication assist application captures a modal input in one of the modes from the user via the interactive interface based on the determined delay factor and one or more of the characteristic information. The multimodal communication assist application initiates the capture of the modal input in one of the modes from the user via the interactive interface based on one of multiple options selected by the user on the interactive interface. The options represent, for example, the multimodal communication mappers, learning components, testing components, etc.

The multimodal communication assist application processes and transforms the captured modal input in one of the modes into a modal output in another one or more of the modes using the identified multimodal communication mappers. The multimodal communication assist application renders the modal output in the other one or more of the modes to the user via the interactive interface for assisting the user to learn and/or communicate in the visual communication language in one or more modes.

In an embodiment, the multimodal communication assist application processes and transforms the captured modal input in the visual mode received from an input device, for example, a camera, into a modal output in the text mode and/or the audio mode. The captured modal input in the visual mode comprises, for example, single handed gestures, dual handed gestures, overlapping hand gestures, etc., of the user. The multimodal communication assist application detects and extracts one or more visual elements, for example, gestures, movements of a user's hands, etc., from the captured modal input in the visual mode based on the characteristic information of the user. The multimodal communication assist application scales the extracted visual elements to a predetermined scale. The multimodal communication assist application segments each of the scaled visual elements into a predetermined number of blocks. In an embodiment, each of the predetermined number of blocks of each of the scaled visual elements is of an equal size. In another embodiment, each of the predetermined number of blocks of each of the scaled visual elements is of a non-equal size.

The multimodal communication assist application then determines a numerical descriptor, for example, an occurrence vector, for each of the scaled visual elements based on number of highlighted visual constituents, for example, highlighted pixels, in each of the predetermined number of blocks. The multimodal communication assist application recognizes a gesture from multiple gestures stored in a database maintained by the multimodal communication assist application based on the determined numerical descriptor. The multimodal communication assist application associates the recognized gesture with one or more text elements, for example, words, and/or one or more audio elements, for example, sounds, stored in the database to generate the modal output in the text mode and/or the audio mode respectively, that corresponds to the captured modal input in the visual mode. The multimodal communication assist application renders the generated modal output in the text mode and/or the audio mode to the user via the interactive interface for assisting the user to learn and/or communicate in the visual communication language.

The database maintained by the multimodal communication assist application stores mappings of the modal input in one of the modes to the modal output in another one or more of the modes, the characteristic information of the user, the determined delay factor for the user, and a proficiency level of the user defined by the multimodal communication assist application based on the determined delay factor. In an embodiment, the multimodal communication assist application acquires one or more mappings of the modal input in one or more of the modes to the modal output in another one or more of the modes from the user via the interactive interface and stores the acquired mappings in the database.

In an embodiment, the multimodal communication assist application processes and transforms a modal output in the text mode into a modal output in an audio mode by associating the generated modal output in the text mode with one or more audio elements stored in the database to generate the modal output in the audio mode. The multimodal communication assist application renders the generated modal output in the text mode and/or the audio mode to the user via the interactive interface for assisting the user to learn and/or communicate in the visual communication language.

In an embodiment, the multimodal communication assist application processes and transforms the captured modal input in the text mode into a modal output in the visual mode and/or the audio mode. The multimodal communication assist application extracts one or more text elements, for example, an alphabet, a word, a group of words defined by the user, etc., from the captured modal input in the text mode. The multimodal communication assist application retrieves one or more modal outputs in the visual mode and/or the audio mode for the extracted text elements from the database. The multimodal communication assist application archives the retrieved modal outputs in the visual mode and/or the audio mode. The multimodal communication assist application renders the archived modal outputs in the visual mode and/or the audio mode to the user via the interactive interface for assisting the user to learn and/or communicate in the visual communication language.

In an embodiment, the multimodal communication assist application generates one or more learning components and testing components for the user, for example, using one or more of mappings of the modal input in one of the modes to the modal output in another one or more of the modes, the characteristic information of the user, the determined delay factor for the user, a proficiency level of the user defined by the multimodal communication assist application based on the determined delay factor, predetermined test information, previous performance reports stored in the database, etc. The multimodal communication assist application presents the generated learning components or the generated testing components in one or more of the modes to the user via the interactive interface based on the determined delay factor. The multimodal communication assist application captures the modal input in another one of the modes provided by the user based on the determined delay factor using an input device, for example, a camera for the visual mode, a keyboard or a touchpad for the text mode, an audio recorder for the audio mode, etc.

The multimodal communication assist application evaluates the captured modal input in the other one of the modes based on the mappings of the modal input to the modal output stored in the database. The multimodal communication assist application generates a performance report based on the evaluation and renders the performance report to the user via the interactive interface. The performance report comprises, for example, a learning curve, analytics for consistently misidentified gestures, etc. The multimodal communication assist application tracks performance of the user who engages with the generated learning components and the generated testing components to select the generated learning components and the generated testing components to be presented to the user via the interactive interface for assisting the user to learn and/or communicate in the visual communication language in one or more modes.

In an embodiment, the multimodal communication assist application communicates with a central adaptive learning system, for example, a server, via a communication network, for example, the internet, for generating one or more learning components and testing components. The central adaptive learning system gathers performance data, for example, responses to the learning components and the testing components, response times, proficiency levels, etc., of multiple users for enhancing the generation of the learning components and the testing components.

The multimodal communication assist application therefore assists a user with hearing impairment and speech disabilities to learn and/or communicate in the visual communication language in multiple modes, for example, from a visual mode to an audio mode, to communicate with a blind user. The multimodal communication assist application also assists a user versed in one mode of the visual communication language, for example, a visual mode to communicate with other individuals who are not versed in the visual mode of the visual communication language, in other modes, for example, a text mode, an audio mode, etc. Similarly, the multimodal communication assist application also assists a user who is not versed in one mode of the visual communication language, for example, a visual mode to communicate with other individuals who are versed in the visual mode of the visual communication language, by allowing transformation of a modal input in the text mode and/or the audio mode to a modal output in the visual mode. Moreover, the multimodal communication assist application also assists a user who is not versed in one mode of the visual communication language, for example, a visual mode to communicate with other individuals who are also not versed in the visual mode of the visual communication language, by allowing transformation of a modal input in the text mode to a modal output in the audio mode, or by allowing transformation of a modal input in the audio mode to a modal output in the text mode. Furthermore, the multimodal communication assist application works not only for single handed gestures but also for dual handed gestures where there is significant contact between the user's hands.

Moreover, in order to provide additional benefits of learning the visual mode of the visual communication language, the multimodal communication assist application provides an adaptive tutorial with adaptive lessons and tests to evaluate the user's proficiency and to improve the user's skills along with communication and translation assistance of the visual communication language. Furthermore, the multimodal communication assist application does not require any sophisticated paraphernalia, for example, wireless accelerometers or wearable sensors and allows users to define their own gestures and interpretations and train the multimodal communication assist application without the intervention of a programmer or a device designer.

The multimodal communication assist application adapts to the user's characteristic information, for example, the user's skin color, learns user-defined gestures, automatically tunes the delay factor for the user, adapts to the proficiency level of the user to adjust processing speed of the multimodal communication assist application, and administers learning components and testing components best suited to a user. Furthermore, the multimodal communication assist application allows users to customize the visual communication language by augmenting an existing dictionary with gestures and corresponding words or phrases of their own, and also to define an entirely new language without the intervention of a programmer or a device designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein.

FIG. 17 exemplarily illustrates a screenshot of an interactive interface provided by the multimodal communication assist application for enabling a user to create an account for logging in to the multimodal communication assist application.

FIG. 18 exemplarily illustrates a screenshot of the interactive interface provided by the multimodal communication assist application for enabling a user to log in to the multimodal communication assist application.

DETAILED DESCRIPTION OF THE INVENTION

Figure 1A:
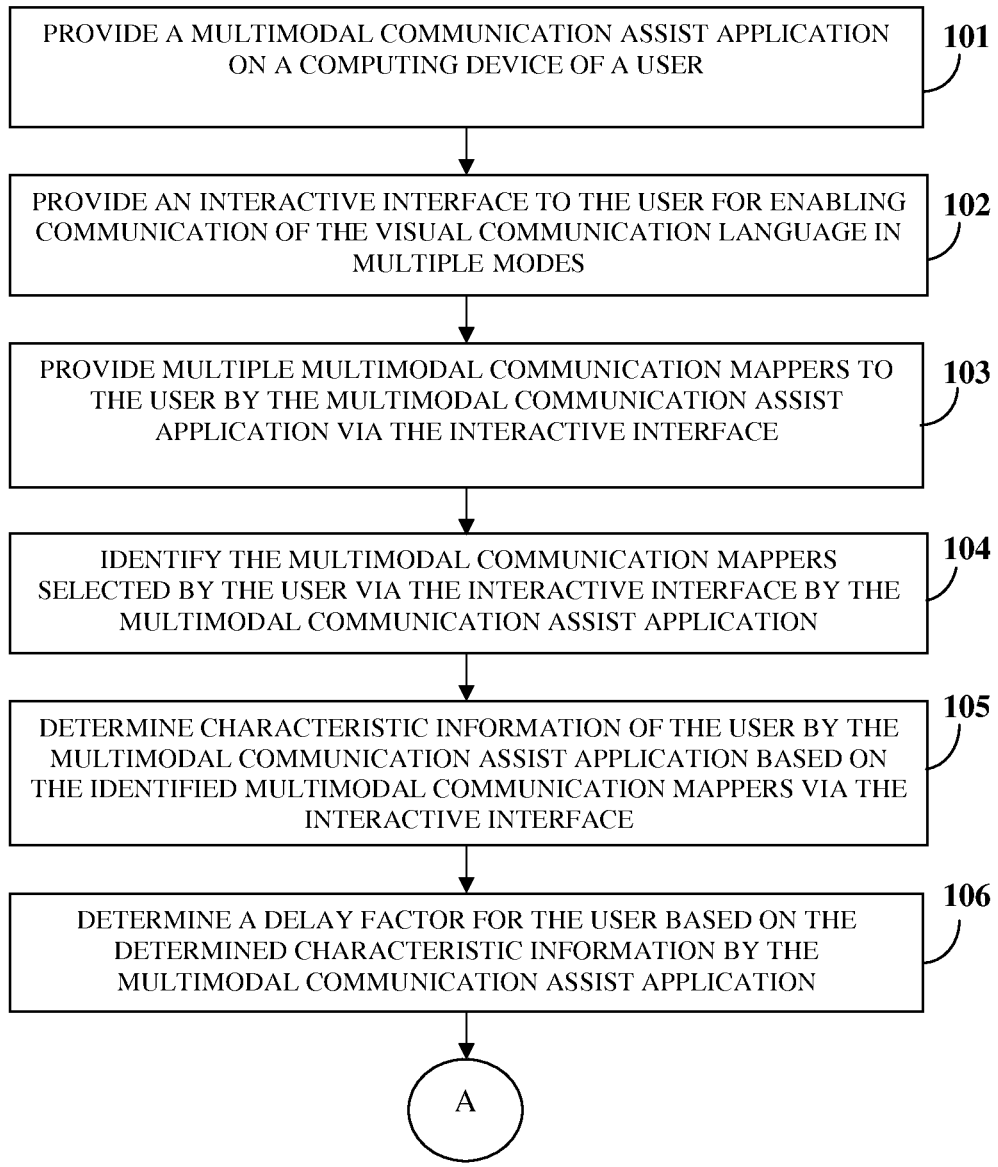
FIGS. 1A-1B illustrate a computer implemented method for assisting a user to learn and/or communicate in a visual communication language in one or more of multiple modes.
Figure 1B:
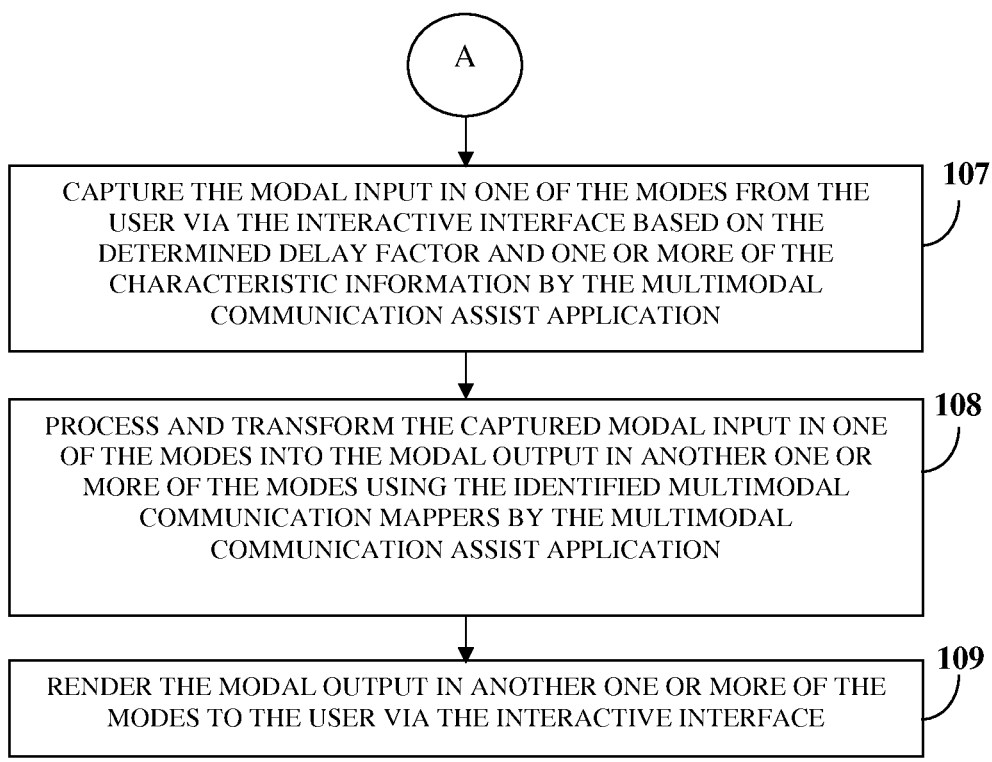
Figure 2A:
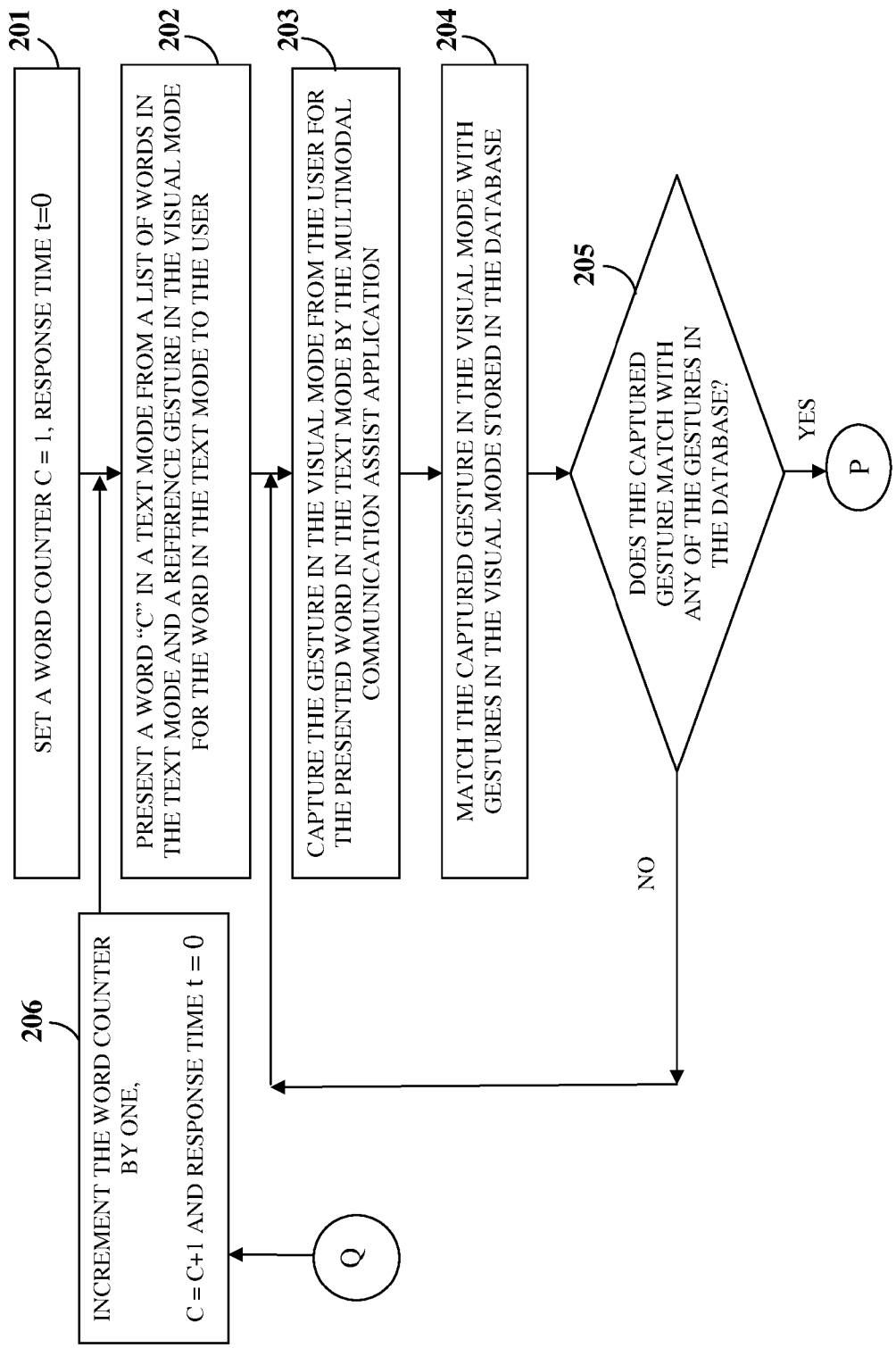
FIGS. 2A-2D exemplarily illustrate a flowchart comprising the steps for determining a delay factor that defines a proficiency level for the user.
Figure 2B:
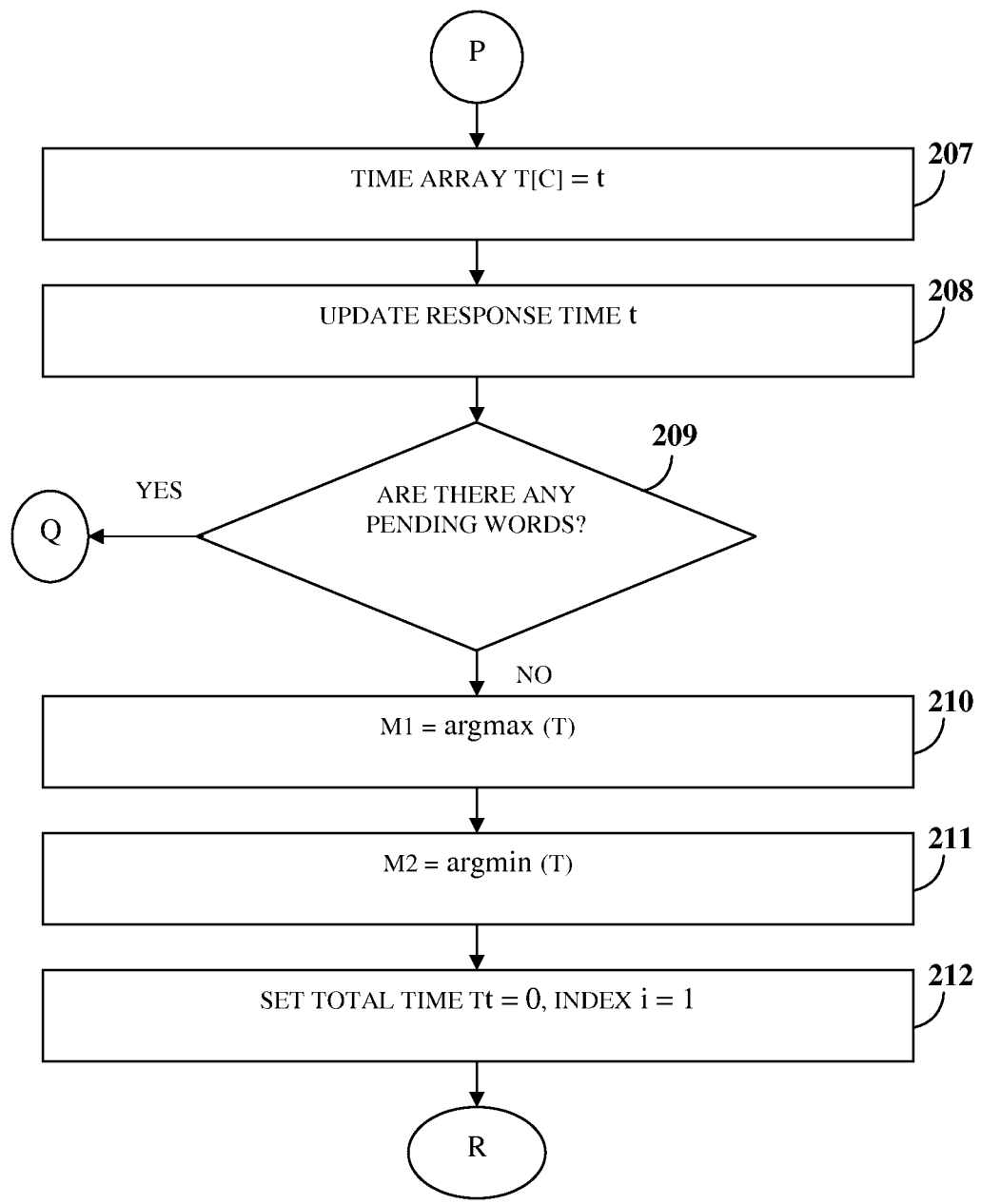
Figure 2C:
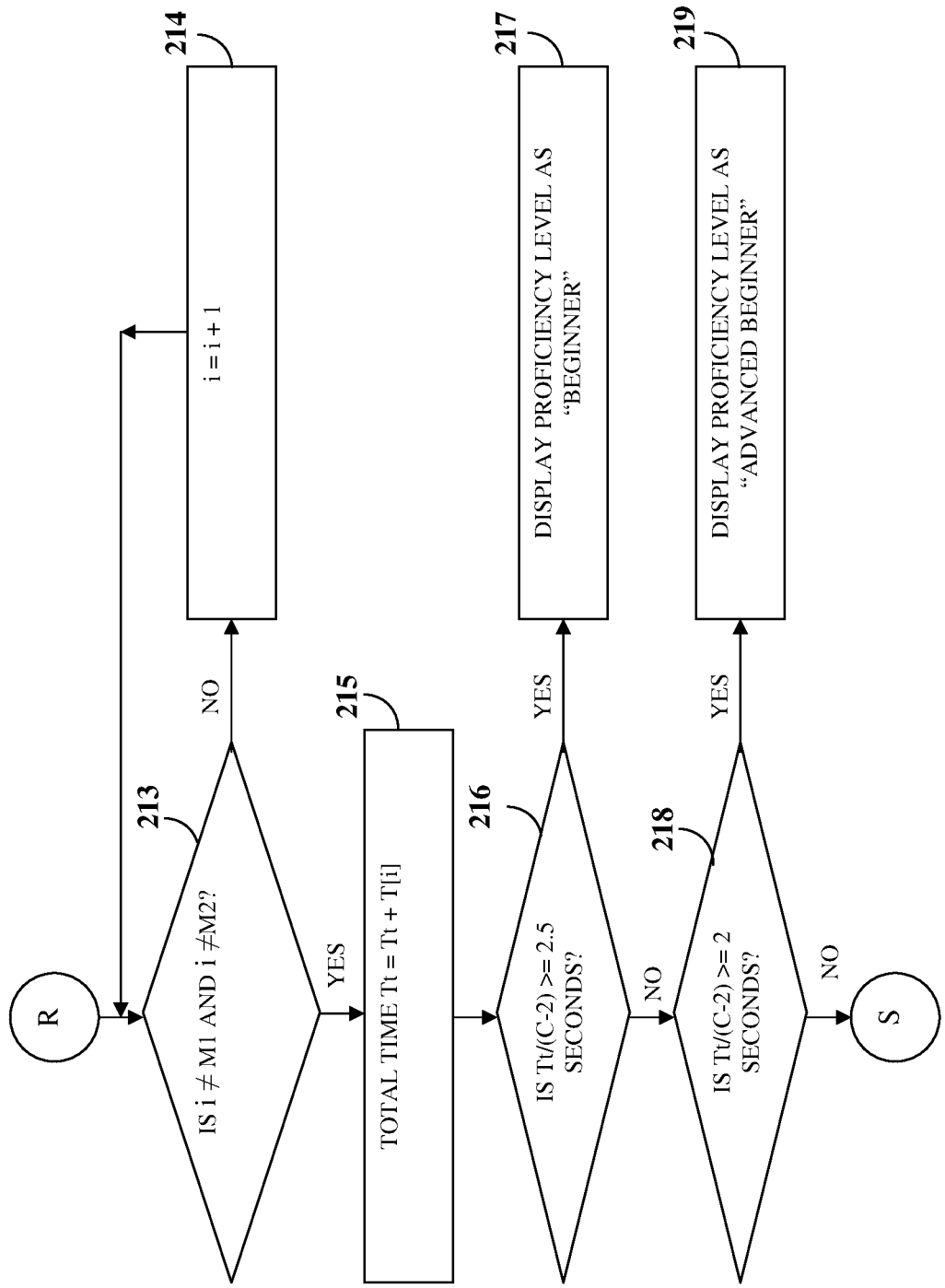
Figure 2D:
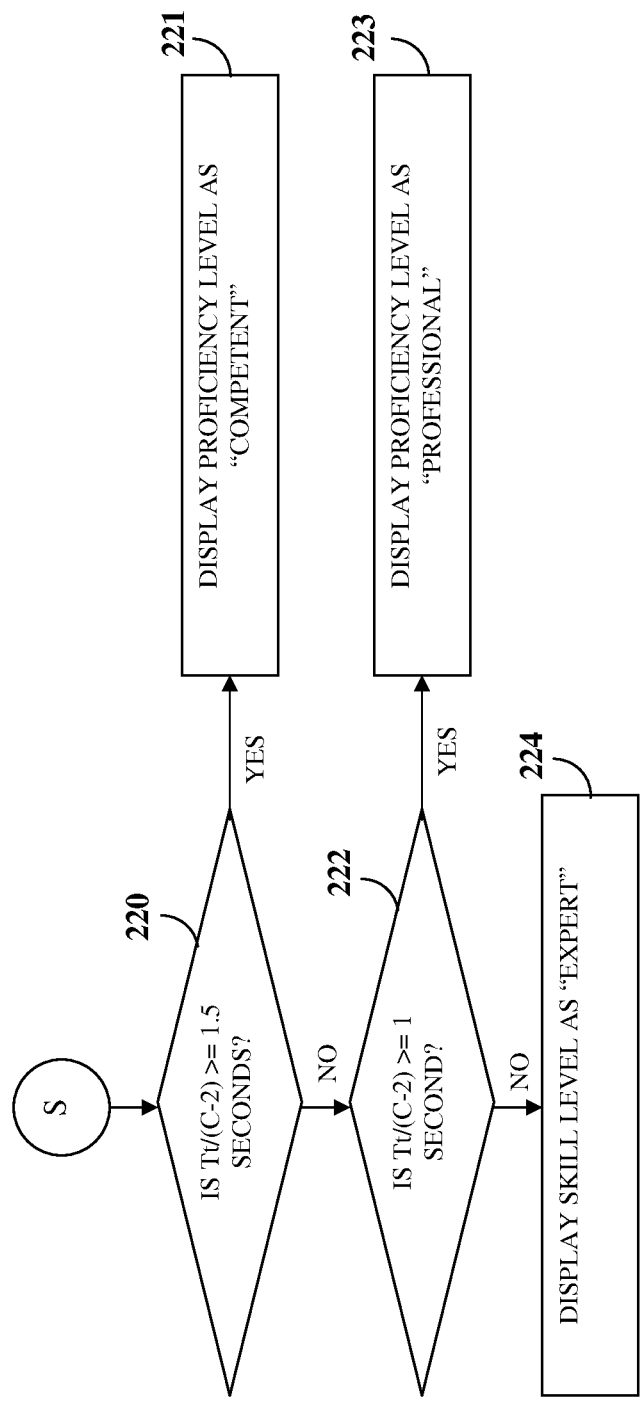

FIGS. 1A-1B illustrate a computer implemented method for assisting a user to learn and/or communicate in a visual communication language in one or more of multiple modes. As used herein, the term "visual communication language" refers to a communication language comprising, for example, meaningful shapes, structures, sign patterns, gestures, etc., for expressing thoughts, expressions, messages, etc., of a user. Also, as used herein, the term "modes" refers, for example, to a visual mode, a text mode, an audio mode, etc., and any combination thereof, for communicating thoughts, expressions, messages, etc., of the user. The visual mode of the visual communication language comprises visual elements, for example, a user's hands, gestures, movements of a user's hands, etc., that are visually perceptible to the user or another individual. The text mode of the visual communication language comprises text elements, for example, characters, letters, numbers, words, etc., that are readable by the user or another individual. The audio mode of the visual communication language comprises audible elements, for example, sounds, that are aurally perceptible to the user or another individual.

The computer implemented method disclosed herein can be used for assisting a user with disabilities to communicate with other users in one or more of the modes. For example, the computer implemented method disclosed herein assists a deaf and mute user to communicate with a sighted user using the visual communication language, for example, in the visual mode or the text mode. That is, the computer implemented method disclosed herein enables transformation of a modal input in the text mode acquired from the deaf and mute user into a modal output in the visual mode for enabling the deaf and mute user to communicate with the sighted user in the visual mode, and also enables transformation of a modal input in the visual mode acquired from the deaf and mute user into a modal output in the text mode for enabling the deaf and mute user to communicate with the sighted user in the text mode. As used herein, the term "modal input" refers to input data entered into the multimodal communication assist application by the user in one of the modes, for example, the visual mode, the text mode, the audio mode, etc. Also, as used herein, the term "modal output" refers to output data generated by the multimodal communication assist application in another one or more of the modes, for example, the text mode, the audio mode, the visual mode, etc., on processing the modal input.

In another example, the computer implemented method disclosed herein assists the deaf and mute user to communicate with a blind user using the visual communication language, for example, in the audio mode. That is, the computer implemented method disclosed herein enables transformation of a modal input in the text mode acquired from the deaf and mute user into a modal output in the audio mode for enabling the deaf and mute user to communicate with the blind user in the audio mode, and also enables transformation of a modal input in the visual mode acquired from the deaf and mute user into a modal output in the audio mode for enabling the deaf and mute user to communicate with the blind user in the audio mode.

A multimodal communication assist application is provided 101 on a computing device of the user. The multimodal communication assist application is a software application implemented on hardware components of the user's computing device for assisting the user to learn and/or communicate in the visual communication language. The computing device is, for example, a cellular phone, a personal computer, a laptop, a personal digital assistant, a tablet computing device, a mobile device, a digital notebook, a portable communication device, a computer equipped with an image recording device such as a camera that records video pictures, etc. In an embodiment, the multimodal communication assist application on the user's computing device can connect to a central server via a communication network, for example, the internet, for assisting the user to learn and/or communicate in the visual communication language in one or more modes. The multimodal communication assist application provides 102 an interactive interface to the user for enabling communication of the visual communication language in multiple modes. The interactive interface is, for example, a graphical user interface that enables the user to interact with the multimodal communication assist application for learning and/or communicating in the visual communication language in one or more of the modes.

The multimodal communication assist application provides 103 multiple multimodal communication mappers to the user via the interactive interface. The multimodal communication mappers map a modal input in one of the modes to a modal output in another one or more of the modes. The multimodal communication mappers are, for example, a visual to text and/or audio mapper, a text to visual and/or audio mapper, an audio to text and/or visual mapper, etc. The visual to text and/or audio mapper maps a modal input in the visual mode to a modal output in the text mode and/or the audio mode. The text to visual and/or audio mapper maps a modal input in the text mode to a modal output in the visual mode and/or the audio mode. The audio to text and/or visual mapper maps a modal input in the audio mode to a modal output in the text mode and/or the visual mode. The user selects one or more of the multimodal communication mappers via the interactive interface. The multimodal communication assist application identifies 104 the multimodal communication mappers selected by the user via the interactive interface.

The multimodal communication assist application determines 105 characteristic information of the user based on the identified multimodal communication mappers. As used herein, the characteristic information comprises, for example, one or more of skin color of the user, position of hands of the user, a communication language of the user, a response time of the user, for example, for mapping a text mode into a visual mode, accessories, for example, a cuff or a rim of a user's full sleeved shirt, nail polish, a wearable sticker, a watch, a bracelet, a wrist band, finger rings, tattoos, etc., of the user used by the multimodal communication assist application as markers, etc.

The multimodal communication assist application determines 106 a delay factor for the user based on the determined characteristic information, for example, the response time of the user. As used herein, the term "delay factor" refers to a rate of sampling modal input in a visual mode, for example, gestures captured from a user. The multimodal communication assist application determines the delay factor for the user as follows: The multimodal communication assist application presents one or more text elements and corresponding visual elements to the user via the interactive interface. The multimodal communication assist application captures a modal input in a visual mode from the user via the interactive interface at a predefined sampling rate, where the modal input is a simulation of the visual elements corresponding to the presented text elements. The multimodal communication assist application matches the captured modal input in the visual mode with multiple modal outputs in the visual mode, for example, gestures stored in a database maintained by the multimodal communication assist application. The multimodal communication assist application determines a response time of the user for each of the presented text elements during the capture of the matched modal input and utilizes the response time to calculate to determine the delay factor for the user.

The multimodal communication assist application defines a proficiency level for the user based on the determined delay factor as disclosed in the detailed description of FIGS. 2A-2D. As used herein, the term "proficiency level" refers to a level of skill attained by the user for communicating the visual communication language. The proficiency level is, for example, a beginner level, an advanced beginner level, a competent level, a professional level, an expert level, etc., assigned to the user by the multimodal communication assist application for the level of skill or the fluency in communicating the visual communication language, attained by the user.

The multimodal communication assist application captures 107 a modal input on one of the modes from the user via the interactive interface based on the determined delay factor and one or more of the characteristic information. The multimodal communication assist application initiates the capture of the modal input in one of the modes from the user via the interactive interface based on one of multiple options selected by the user on the interactive interface. The options represent, for example, the multimodal communication mappers, learning components, testing components, etc. The multimodal communication assist application processes and transforms 108 the captured modal input in one of the modes into a modal output in another one or more of the modes using the identified multimodal communication mappers.

In an example, the multimodal communication assist application processes and transforms the captured modal input in the visual mode into a modal output in the text mode and/or the audio mode using the visual to text and/or audio mapper. In another example, the multimodal communication assist application processes and transforms the captured modal input in the text mode into a modal output in the visual mode and/or the audio mode using the text to visual and/or audio mapper. The computer implemented method for processing and transforming a captured modal input in the visual mode into a modal output in the text mode and/or the audio mode by the multimodal communication assist application is disclosed in the detailed description of FIG. 4. The computer implemented method for processing and transforming a captured modal input in the text mode into a modal output in the visual mode and/or the audio mode by the multimodal communication assist application is disclosed in the detailed description of FIG. 7.

In an embodiment, the multimodal communication assist application also maps or transforms a modal input in one or more modes from a first communication language to a modal output in another one or more of the modes in second communication language, thereby providing a form of translation. For example, the multimodal communication assist application processes and transforms gestures captured from a user in a first communication language to a modal output in the text mode in the first communication language. The multimodal communication assist application then maps this modal output in the text mode in the first communication language to a modal output in the text mode in a second communication language. The multimodal communication assist application may then retrieve the gestures that correspond to the modal output in the text mode in the second communication language and display them to the user via the interactive interface.

In another example, the multimodal communication assist application processes and transforms the captured modal input in the audio mode into a modal output in the text mode and/or the visual mode using the audio to text and/or visual mapper as follows: The multimodal communication assist application recognizes the captured modal input in the audio mode. The multimodal communication assist application retrieves and renders one or more modal outputs in the text mode and/or the visual mode for the recognized modal input in the audio mode from the database maintained by the multimodal communication assist application to the user.

The multimodal communication assist application renders 109 the modal output in the other one or more of the modes, for example, the text mode, the visual mode, the audio mode, etc., to the user via the interactive interface for assisting the user to learn and/or communicate in the visual communication language in one or more of the modes. In an embodiment, the multimodal communication assist application renders the modal output in the other one or more of the modes to the user based on the determined delay factor via the interactive interface.

Figure 10:
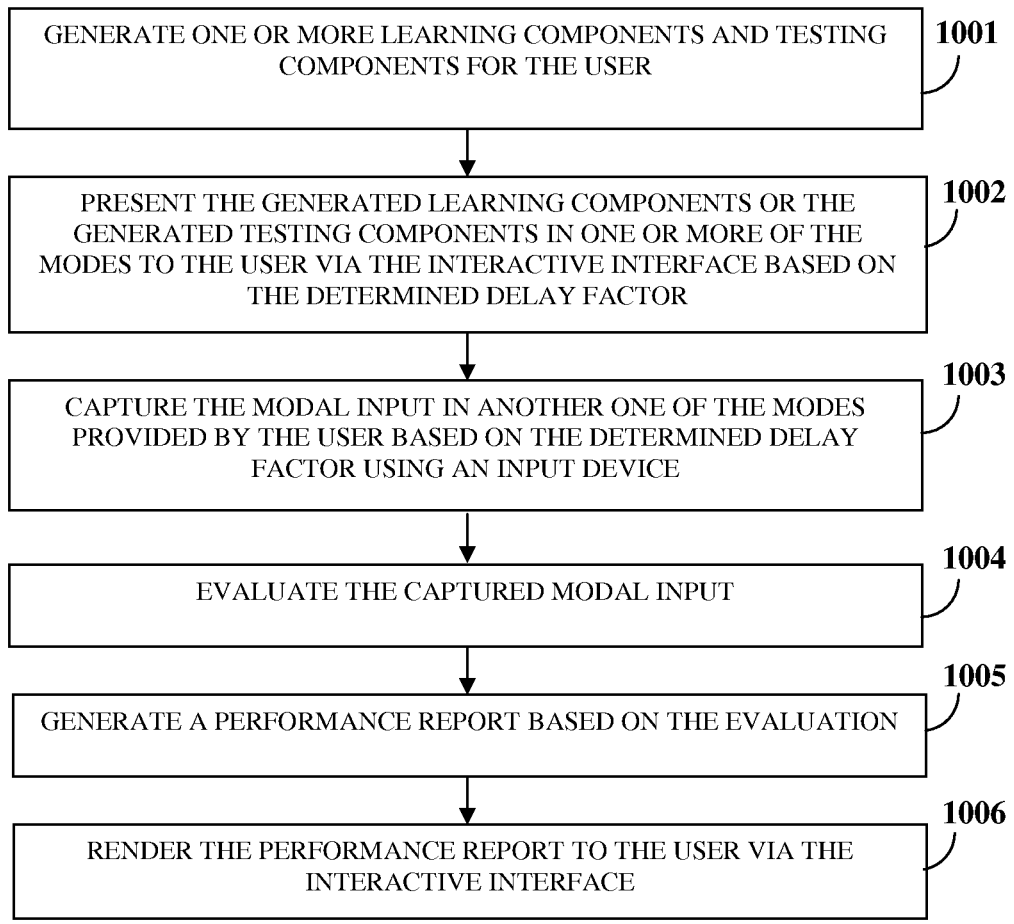
FIG. 10 illustrates a computer implemented method for generating and utilizing learning components and testing components for assisting a user to learn and/or communicate in the visual communication language in one or more of multiple modes.

In an embodiment, the multimodal communication assist application generates one or more learning components and testing components for the user, for example, using one or more of mappings of a modal input in one of the modes into a modal output in another one or more of the modes, the characteristic information of the user, the determined delay factor for the user, the defined proficiency level, predetermined test information, previous performance reports stored in the database maintained by the multimodal communication assist application as disclosed in the detailed description of FIG. 10.

FIGS. 2A-2D exemplarily illustrate a flowchart comprising the steps for determining a delay factor that defines a proficiency level for the user. The multimodal communication assist application presents one or more text elements and corresponding visual elements to the user via the interactive interface. For example, the multimodal communication assist application presents a list of words in the text mode to the user. The multimodal communication assist application initially sets 201 a word counter "C" to one and a response time "t" to zero. The multimodal communication assist application displays a reference gesture in the visual mode for each word in the list of words in the text mode for reference of the user. The multimodal communication assist application presents 202 a word in the text mode from the list of words in the text mode and the reference gesture in the visual mode for the presented word in the text mode to the user. When the word is provided to the user, the multimodal communication assist application triggers a timer that is set to zero to start counting the time the user takes to respond. The multimodal communication assist application captures 203 a modal input, for example, a gesture in the visual mode from the user for the presented word in the text mode at a predefined sampling rate, typically a high sampling rate, via an input device, for example, a camera connected to or built into the user's computing device. The modal input is a simulation of the visual elements corresponding to the presented text elements.

The multimodal communication assist application matches 204 the captured gesture in the visual mode for the presented word with gestures in the visual mode stored in the database. That is, the multimodal communication assist application captures the gesture in the visual mode at a high rate and matches the gesture with an expected target gesture stored in the database. The multimodal communication assist application determines 205 whether the captured gesture in the visual mode matches with any of the gestures in the visual mode in the database corresponding to the presented word. If the captured gesture in the visual mode does not match with any of the valid gestures in the visual mode in the database, then the multimodal communication assist application allows the user to provide a gesture in the visual mode again for the presented word in the text mode, which is captured 203 by the multimodal communication assist application. If the captured gesture in the visual mode matches with any of the valid gestures in the visual mode in the database, then the multimodal communication assist application stores 207 the time counted by the timer in a time array T[C] as the response time for the presented word as:

$$T[C]=t$$

The user's response time for the presented word in the list of words in the text mode depends on the user's proficiency in communicating in the visual communication language in the visual mode. The user's response time reduces with practice.

The multimodal communication assist application updates 208 the value of the timer, that is, the response time to "t". The multimodal communication assist application checks 209 for pending words in the text mode in the list of words in the text mode to be matched with corresponding gestures in the visual mode. If the list of words in the text mode comprises pending words to be matched with the corresponding gestures in the visual mode, then the multimodal communication assist application increments 206 the word counter "C" by one, that is C=C+1, resets the timer to set the response time "t" as zero, and presents 202 the pending words in the text mode from the list of words in the text mode with the corresponding reference gestures in the visual mode to the user.

If the list of words in the text mode does not comprise any pending words in the text mode to be matched with the corresponding gestures in the visual mode, then the multimodal communication assist application calculates 210 an argument of maximum "M1" as:

$$M1 = \mathrm{argmax}(T)$$

The multimodal communication assist application also calculates 211 an argument of minimum "M2" as:

$$M2 = \mathrm{argmin}(T)$$

The multimodal communication assist application further sets 212 a total time "Tt" to zero and an index "i" to one. The multimodal communication assist application compares 213 the index "i" with the argument of maximum M1 and with the argument of minimum M2. If the index "i", the argument of maximum M1, and the argument of minimum M2 are equal, or the index "i" is equal to the argument of maximum M1, or the index "i" is equal to the argument of minimum M2, then the multimodal communication assist application increments 214 the value of the index "i" by one. The multimodal communication assist application continues to compare the index "i" with the argument of maximum M1, and the argument of minimum M2 after incrementing the index "i". If the index "i" is not equal to both the argument of maximum M1 and the argument of minimum M2, then the multimodal communication assist application calculates 215 the value of the total time "Tt". For the index "i", the multimodal communication assist application calculates the total time "Tt" as:

$$\text{Total time } Tt = Tt + T[i]$$

The multimodal communication assist application disregards both the maximum and minimum response times, and computes an average response time from the response times for the remaining C−2 words in the list of words. The multimodal communication assist application determines the average response time which represents the delay factor as follows:

$$\text{Delay Factor} = \text{Total time } Tt/(C-2)$$

The multimodal communication assist application provides a reset option to allow the user to respond to the list of words again to recalculate the delay factor, if the previous delay factor was inaccurate, for example, due to distractions and other interferences that occurred during the determination of the delay factor.

The determined delay factor defines the proficiency level of the user. The multimodal communication assist application checks 216 whether the delay factor "Tt/(C−2)" is greater than or equal to 2.5 seconds. If the delay factor "Tt/(C−2)" is greater than or equal to 2.5 seconds, then the multimodal communication assist application defines and displays 217 the proficiency level of the user as "beginner" on the interactive interface. If the delay factor "Tt/(C−2)" is less than 2.5 seconds, then the multimodal communication assist application checks 218 whether the delay factor "Tt/(C−2)" is greater than or equal to 2 seconds. If the delay factor "Tt/(C−2)" is greater than or equal to 2 seconds, then the multimodal communication assist application defines and displays 219 the proficiency level of the user as "advanced beginner" on the interactive interface. If the delay factor "Tt/(C−2)" is less than 2 seconds, then the multimodal communication assist application checks 220 whether the delay factor "Tt/(C−2)" is greater than or equal to 1.5 seconds. If the delay factor "Tt/(C−2)" is greater than or equal to 1.5 seconds, then the multimodal communication assist application defines and displays 221 the proficiency level of the user as "competent" on the interactive interface. If the delay factor "Tt/(C−2)" is less than 1.5 seconds, then the multimodal communication assist application checks 222 whether the delay factor "Tt/(C−2)" is greater than or equal to 1 second. If the delay factor "Tt/(C−2)" is greater than or equal to 1 second, then the multimodal communication assist application defines and displays 223 the proficiency level of the user as "professional". If the delay factor "Tt/(C−2)" is less than 1 second, then the multimodal communication assist application defines and displays 224 the proficiency level of the user as "expert" on the interactive interface. The multimodal communication assist application uses, for example, Michael Eraut's summary of increasing skill to define the proficiency level of the user.

The delay factor varies for each user. If the user takes, for example, about 2 seconds to complete a gesture corresponding to a word in the list of words, the multimodal communication assist application learns not to attempt mapping the same gesture multiple times to some word. For example, in one of the Indian sign language dialects, the word "by" is indicated by the characters "b" and "y". If the user takes 2 seconds to gesture the character "b" and transition to the character "y", the multimodal communication assist application learns not to sample the modal input in the visual mode at 250 milliseconds (ms) and transcribe the gesture as a "bbbb" as the modal output in the text mode. The multimodal communication assist application therefore ensures that transitions, for example, between gestures are not transcribed for a slow user, and words or phrases are not omitted for a rapid user.

Consider an example where the multimodal communication assist application renders a list of finger spelled words to the user. To compute the delay factor, the multimodal communication assist application sets a very high sampling rate for capturing the modal input in the visual mode from the user. The multimodal communication assist application provides the words prestored in the database to the user via the interactive interface, and ascertains the corresponding gestures to expect for the words from the user. The multimodal communication assist application also flashes the gestures to guide a naïve user interested in learning or improving his/her proficiency level in the visual mode of the visual communication language.

The multimodal communication assist application determines the response times of the user for the list of finger spelled words, for example, as follows:

| 1. BJT | 2.140 seconds |
| 2. FEI | 1.990 seconds |
| 3. GAP | 2.130 seconds |
| 4. URL | 2.210 seconds |
| 5. ODI | 2.000 seconds |
| 6. XML | 2.230 seconds |
| 7. SIR | 2.200 seconds |

| | | |
|---|---|---|
| 8. HON | 2.110 seconds | |
| 9. KRW | 2.450 seconds | |
| 10. ZQC | 2.220 seconds | |

Since the second word and the ninth word in the list of words take the shortest time and the longest time respectively, the multimodal communication assist application disregards the response times determined for the second word and the ninth word for the computation of the average response time. The multimodal communication assist application computes the average response time as 2.155 seconds for the above list of three-letter words based on the user's response times. Therefore, the user takes about 2.155/3=0.72 seconds per letter or alphabet. The multimodal communication assist application therefore determines the delay factor for the user as 0.72 seconds per alphabet and assigns a proficiency level of "Expert" to the user. If capture delay of the modal input by the multimodal communication assist application is much less than 0.72 seconds for the "Expert" user, the same alphabet gets mapped multiple times and if the delay is much more than 0.72 seconds, the gestures input by the user would be missed. The multimodal communication assist application therefore allows automatic tuning of the delay factor for controlling the sampling rate of capturing the modal input, for example, in the visual mode from the user based on the user's proficiency level or rapidity of providing the gestures.

Figure 3:
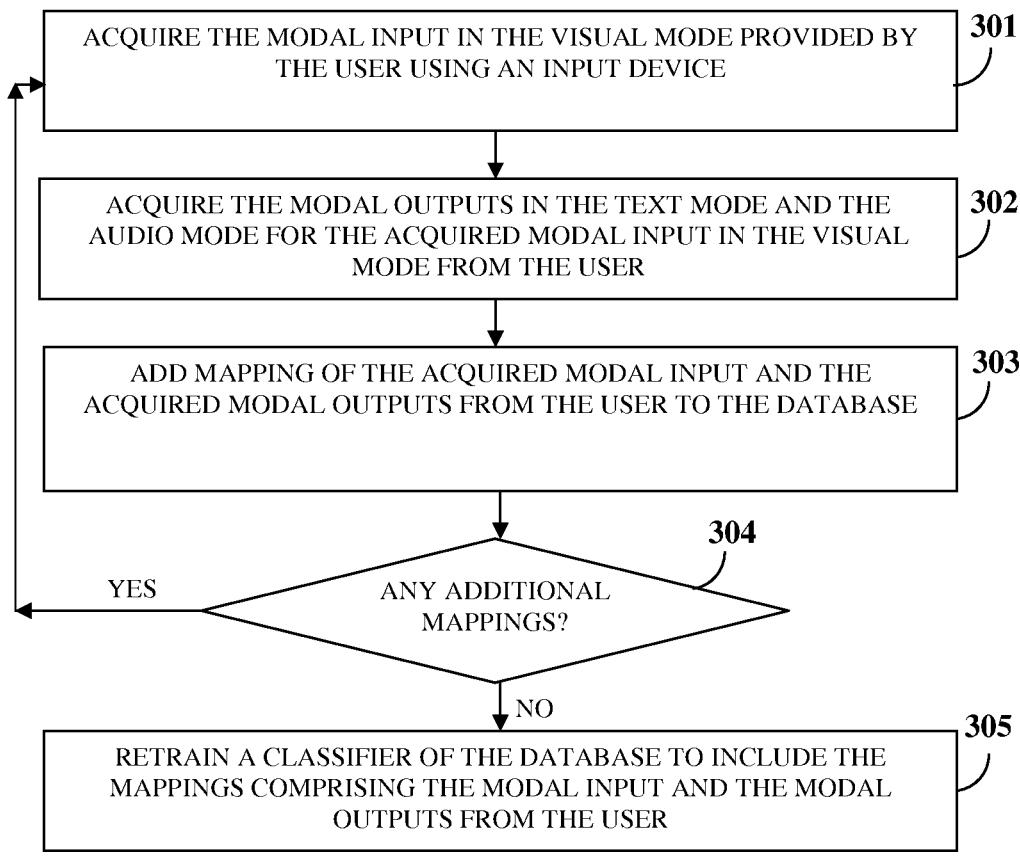
FIG. 3 exemplarily illustrates a flowchart comprising the steps for updating a database maintained by a multimodal communication assist application with one or more mappings of a modal input in one or more of the modes to a modal output in another one or more of the modes acquired from the user via the interactive interface.

FIG. 3 exemplarily illustrates a flowchart comprising the steps for updating a database maintained by the multimodal communication assist application with one or more mappings of a modal input in one or more of the modes to a modal output in another one or more of the modes acquired from the user via the interactive interface. The multimodal communication assist application acquires 301 the modal input, for example, in the visual mode provided by the user using an input device, for example, a camera. The multimodal communication assist application acquires 302 the modal outputs in the text mode and the audio mode for the acquired modal input in the visual mode from the user. The multimodal communication assist application adds 303 the mapping of the acquired modal input and the acquired modal outputs from the user to the database.

Consider an example where the user gestures by waving the user's right open hand back and forth several times in front of a camera on the user's computing device to provide a modal input in a visual mode. The user then enters the word "Hello" in a text field on the interactive interface to provide a modal output in the text mode for the gesture and speaks the word "Hello" through a microphone of the user's computing device to provide a modal output in the audio mode for the same gesture. The multimodal communication assist application acquires the gesture of waving a right open hand back and forth several times and maps this gesture to the word "Hello" and to the spoken audio "Hello" and updates the database. In another example, the user gestures by shaping both hands into fists and with the user's palms facing downward, the user uses the dominant fist to tap the wrist or the side of the non-dominant fist a few times in front of a camera on the user's computing device to provide a modal input in a visual mode. The user then enters the word "Work" in a text field on the interactive interface to provide a modal output in the text mode for the gesture and speaks the word "Work" through a microphone of the user's computing device to provide a modal output in the audio mode for the same gesture. The multimodal communication assist application acquires the user's gesture of tapping the dominant fist to the wrist or the side of the non-dominant fist and maps this gesture to the word "Work" and to the spoken audio "Work" and updates the database.

The multimodal communication assist application determines 304 whether the user wishes to create any additional mappings. If the user wishes to create additional mappings, the multimodal communication assist application acquires 301 the modal input in one or more modes, for example, the visual mode and acquires 302 the modal outputs in another one or more of the modes, for example, the text mode and/or the audio mode from the user for updating the database. If the user does not wish to create any additional mappings, then the multimodal communication assist application retrains 305 a classifier of the database to include the mappings comprising the modal input and the modal outputs from the user. As used herein, the term "classifier" refers to a rule by which a modal input, for example, a gesture is recognized. The classifier converts the gesture to an appropriate text element and/or an audio element and vice versa based on the multimodal communication mappers selected by the user.

In an embodiment, the multimodal communication assist application enables the user to define short-hand notations in the existing vocabulary for frequently used phrases. For example, instead of using complex gestures for the words, "Please may I have a drink of water with some ice", the user may define a simplified gesture for those words by creating an impression of holding a thumb near the user's lips. The user simulates the gesture using an input device, for example, a camera and enters the corresponding words on the interactive interface using another input device, for example, a keyboard to define the new simplified gesture. The multimodal communication assist application acquires the simplified gesture and the corresponding words from the user via the interactive interface and stores the mapping in the database based on the language selected by the user.

Figure 4:
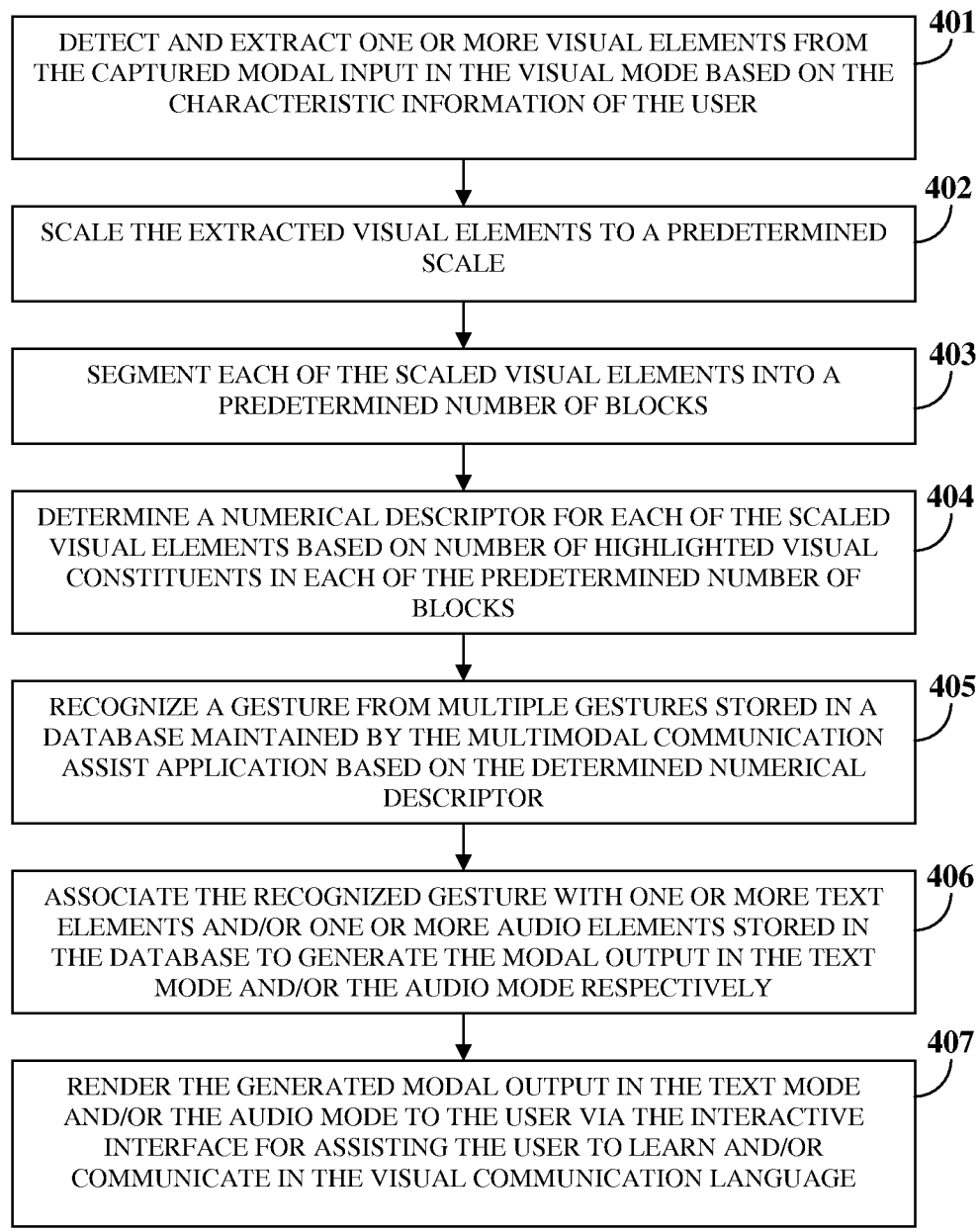
FIG. 4 illustrates a computer implemented method for processing and transforming a captured modal input in a visual mode received from an input device into a modal output in a text mode and/or an audio mode by the multimodal communication assist application.

FIG. 4 illustrates a computer implemented method for processing and transforming a captured modal input in a visual mode received from an input device into a modal output in a text mode and/or an audio mode by the multimodal communication assist application. The modal input in the visual mode captured from a user through an input device, for example, a camera, comprises, for example, single handed gestures, dual handed gestures, overlapping hand gestures, etc. The multimodal communication assist application detects and extracts 401 one or more visual elements from the captured modal input in the visual mode based on the characteristic information, for example, skin color of the user, position of the user's hands, the user's accessories, for example, wrist bands, a watch, a bracelet, tattoos, etc., used as markers by the multimodal communication assist application, a communication language of the user, and a response time of the user. The visual elements are, for example, a user's hands, gestures, movements of the user's hands, etc., that are visually perceptible to a user.

In an example, the multimodal communication assist application detects and extracts an image of the user's hand, for example, based on the skin tone or skin color of the user, position of the user's hands, accessories of the user used as markers, etc. The multimodal communication assist application registers the image of the user's hand using directional axes to ensure that there is no lateral inversion. This ensures that numerical descriptors computed at a later stage are rotation invariant. As used herein, the term "rotation invariant" refers to the ability of the multimodal communication assist application to process and transform a modal input in the visual mode received from an input device, for example, a camera, into a modal output in the text mode and/or the audio mode regardless of the angle of rotation of the visual elements, for example, hands of the user with respect to the input device. That is, even if the placement of the user's hands is at an angle with respect to the camera, the multimodal communication assist application accurately recognizes the user's hands via the interactive interface.

After registering the image, the registered image comprises only the extracted visual elements, that is, the user's hand, the interior edges of the user's hand, etc., since the multimodal communication assist application retains only a portion of the image in which the user's hands are localized and crops the remaining portions of the image during registration. The multimodal communication assist application uses, for example, a bounding box which acts as a tight frame around a detected region of interest, for example, the user's hand or a pair of the user's hands for extracting the visual elements. This ensures that the visual elements, that is, the user's hand or hands spans the entire frame of the image to be analyzed and there is no effect of translation on the numerical descriptors computed subsequently, thereby rendering the numerical descriptors translation invariant. As used herein, the term "translation invariant" refers to the ability of the multimodal communication assist application to accurately recognize visual elements, for example, hands of the user from the captured modal input in the visual mode regardless of the position, for example, a far left position, a central position, a far right position, etc., of the user's hands in an image frame.

The multimodal communication assist application scales 402 the extracted visual elements to a predetermined scale. To avoid the problems of varying resolutions or sizes of the extracted visual elements, that is, the user's hand due to varying distances from the camera, the multimodal communication assist application resizes the images that have undergone the foregoing transformations to be of a common dimension or a predetermined scale that allows their comparison for gesture content. This ensures that the scale, that is, the size of the user's hand or distance from the camera does not affect the numerical descriptors computed at a later stage, thereby rendering the numerical descriptors scale invariant. As used herein, the term "scale invariant" refers to the ability of the multimodal communication assist application to recognize the visual elements from the captured modal input in the visual mode accurately regardless of the space occupied by the user's hands in the image frame, provided the entire hand or a pair of hands required for performing a gesture is visible. For example, provided the user is within a reasonable distance from an input device, for example, a camera, the multimodal communication assist application can accurately recognize gestures made by the user's hands regardless of the space occupied by the user's hands in the image frame.

The multimodal communication assist application segments 403 each of the scaled visual elements into a predetermined number of blocks. In an embodiment, each of the predetermined number of blocks is of an equal size. In another embodiment, each of the predetermined number of blocks is of a non equal size. The multimodal communication assist application determines 404 a numerical descriptor, for example, an occurrence vector, for each of the scaled visual elements based on number of highlighted visual constituents, for example, highlighted edge pixels, in each of the predetermined number of blocks. The registration of the modal input ensures the numerical descriptor to be rotation invariant. The multimodal communication assist application applies a highpass filter on the image to detect regions of sharp change in intensity. By virtue of the segmentation performed earlier, the multimodal communication assist application obtains a wireframe image of the gesture with minimal artifacts. The multimodal communication assist application then applies a block transformation to create "d" meshes of size "$k_1 \times k_2$" on the image. The multimodal communication assist application then accumulates the number of pixels highlighted in each grid or block to create a vector in $\Re^d$. The multimodal communication assist application uses this vector of accumulator values as features to recognize the gesture, as this vector is a signature for gestures that are quite similar to each other in the image domain.

The multimodal communication assist application recognizes 405 a gesture, for example, a single handed gesture, a dual handed gesture, an overlapping hand gesture, etc., from multiple gestures stored in the database maintained by the multimodal communication assist application based on the determined numerical descriptor. The multimodal communication assist application associates 406 the recognized gesture with one or more text elements, for example, characters, letters, words, etc., and/or one or more audio elements, for example, sounds, stored in the database to generate a modal output in the text mode and/or audio mode respectively, that corresponds to the captured modal input in the visual mode. The multimodal communication assist application renders 407 the generated modal output in the text mode and/or the audio mode to the user via the interactive interface for assisting the user to learn and/or communicate in the visual communication language.

Figure 5:
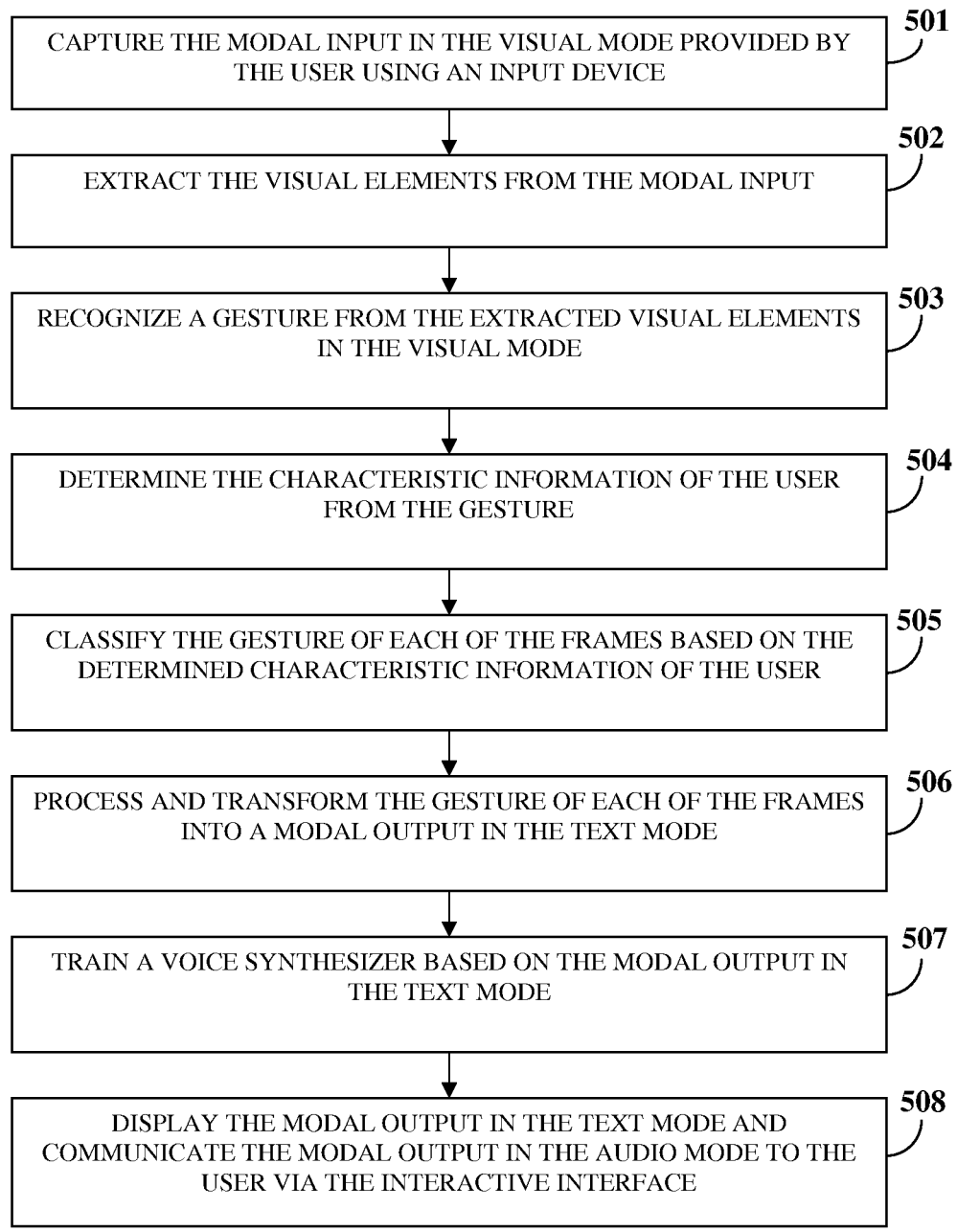
FIG. 5 exemplarily illustrates a flowchart comprising the steps for processing and transforming a modal input in a visual mode into a modal output in a text mode and an audio mode by the multimodal communication assist application.

FIG. 5 exemplarily illustrates a flowchart comprising the steps for processing and transforming a modal input in a visual mode into a modal output in a text mode and an audio mode by the multimodal communication assist application. The multimodal communication assist application captures 501 the modal input in the visual mode provided by the user using an input device, for example, a camera, as frames. The multimodal communication assist application extracts 502 the visual elements, for example, the user's hand or a pair of the user's hands from the frames. The multimodal communication assist application recognizes 503 a gesture, for example, a single handed gesture, a dual handed gesture, etc., from the extracted visual elements in the visual mode.

The multimodal communication assist application determines 504 the characteristic information of the user from the gesture. The multimodal communication assist application classifies 505 the gesture of each of the frames based on the determined characteristic information of the user. The multimodal communication assist application processes and transforms 506 the gesture of each of the frames into a modal output in the text mode. The multimodal communication assist application trains 507 a voice synthesizer based on the modal output in the text mode. The multimodal communication assist application renders the modal output in the text mode and the audio mode on the interactive interface. The multimodal communication assist application displays the modal output in the text mode and communicates 508 the modal output in the audio mode to the user via the interactive interface.

Figure 6A:
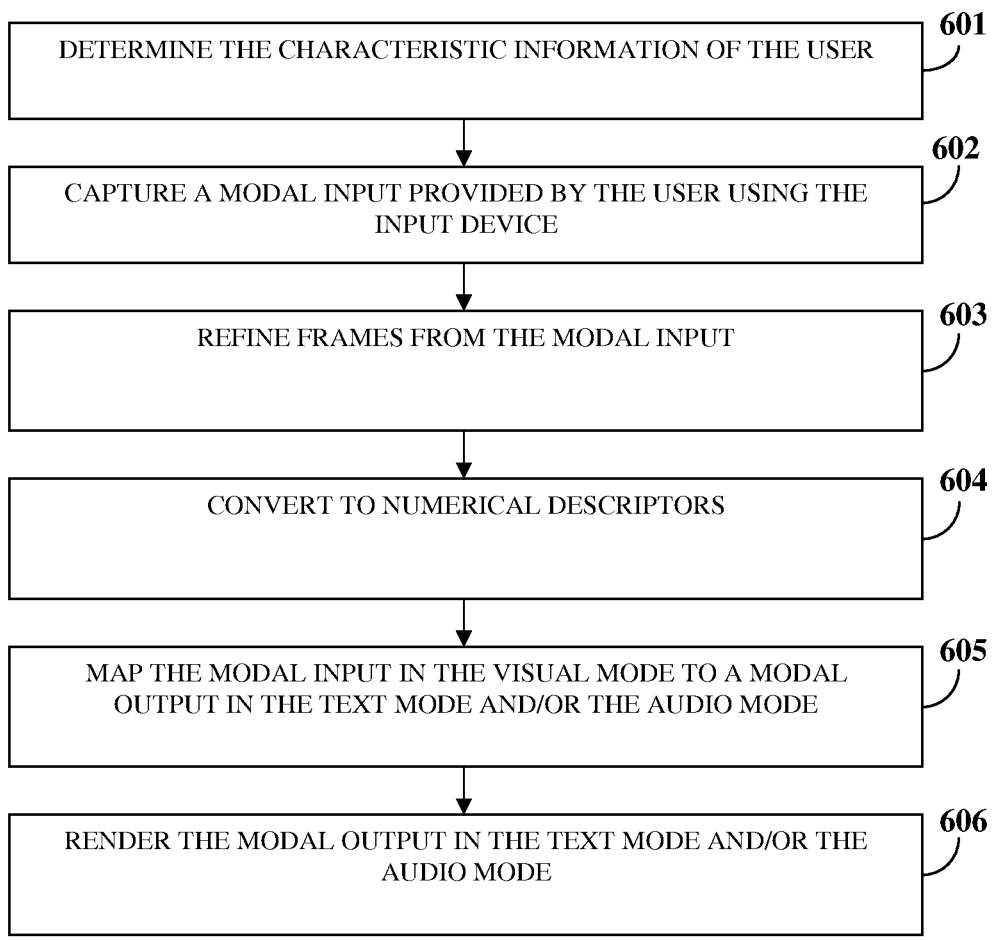
FIGS. 6A-6C exemplarily illustrate an example of a method for processing and transforming a modal input in a visual mode into a modal output in a text mode and/or an audio mode by the multimodal communication assist application.
Figure 6B:
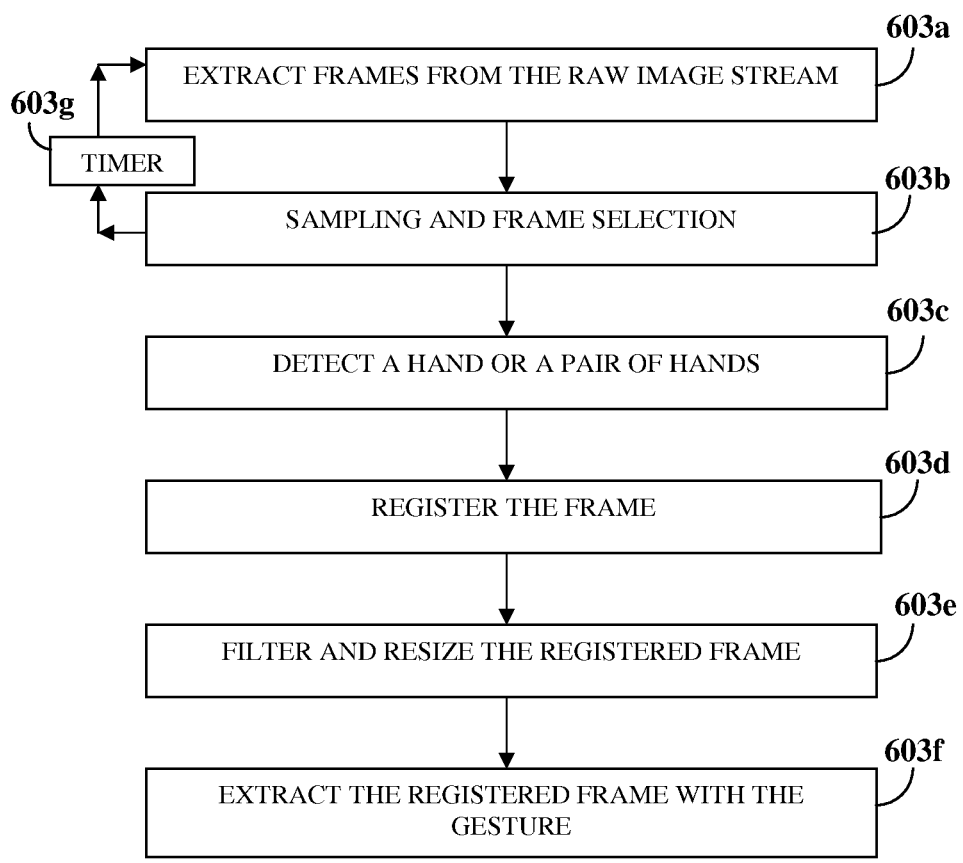
Figure 6C:
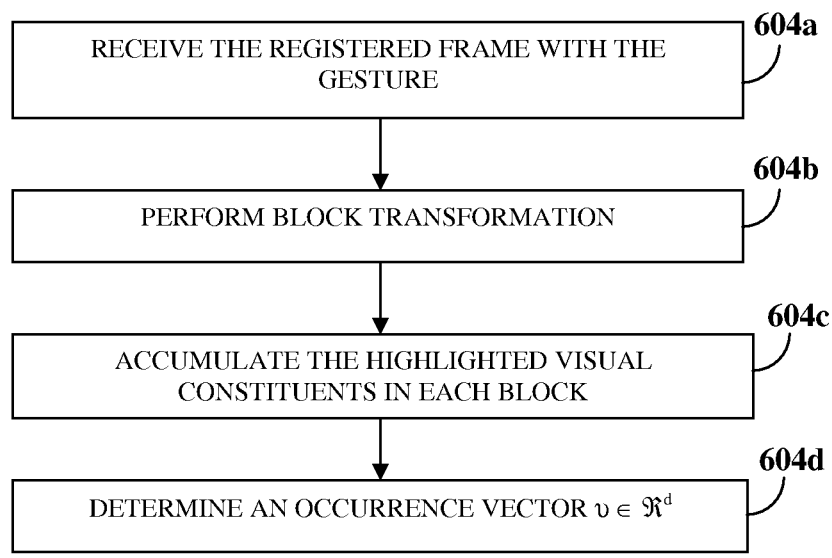

FIGS. 6A-6C exemplarily illustrate an example of a method for processing and transforming a modal input in a visual mode into a modal output in a text mode and/or an audio mode by the multimodal communication assist application. In this example, the multimodal communication assist application captures the modal input in the visual mode, for example, from a deaf and mute user versed only in the visual mode of the visual communication language for mapping to a text mode and/or audio mode of the visual communication language for enabling the deaf and mute user to communicate with another user who is not versed in the visual mode of the visual communication language.

FIG. 6A exemplarily illustrates a flow diagram of the method for mapping the modal input in the visual mode provided by the user using a input device, for example, a camera, to a modal output in the text mode and/or the audio mode. When the user accesses the multimodal communication assist application for the first time, the multimodal communication assist application acquaints the user with the modality of the multimodal communication assist application. The multimodal communication assist application determines 601 the characteristic information of the user. For example, the multimodal communication assist application determines certain characteristic information such as the user's skin color, a range the color is likely to span based on lighting, position of the user's wrist through horizontal profiles and vertical profiles of the user's hand or through markers such as a watch, a bracelet, a sleeve, finger rings, tattoos, etc., that will be used to detect further gestures, one or more languages from a list in which the user would like to communicate, the delay factor between image frames, that is, the rapidity with which the gestures change, and thereby the user's proficiency level, and any user defined gestures the user would like the multimodal communication assist application to learn and store in the database for future use. The multimodal communication assist application also adjusts volume of a speaker on the user's computing device for an audio cue to be heard if the user wishes to communicate in the audio mode.

The input device, for example, a camera is then activated for capturing the modal input in the visual mode from the user. In an embodiment, the input device, for example, a camera with a field of view of about 64×64 pixels is connected to the user's computing device. In another embodiment, the input device is, for example, a moving camera affixed to a wearable gadget. In another embodiment, the input device is, for example, a camera fitted with a ring of rechargeable light emitting diodes (LEDs) to ensure sufficient lighting. In this embodiment, the multimodal communication assist application determines the skin color range of the user without inferring background lighting conditions. In another embodiment, the input device is, for example, a camera accompanied by a single small source of light of sufficient intensity and whose dispersion cone illuminates a field of view of the camera adequately. In this embodiment, the multimodal communication assist application determines the skin color range of the user without inferring background lighting conditions.

The multimodal communication assist application captures 602 the modal input in the visual mode provided by the user using the input device. The multimodal communication assist application captures a raw image stream comprising a sequence of "n" frames per second in the visual mode via the input device. The multimodal communication assist application refines 603 the frames from the raw image stream of the captured modal input as disclosed in the detailed description of FIG. 6B. The multimodal communication assist application converts 604 the refined frames into numerical descriptors as disclosed in the detailed description of FIG. 6C. The numerical descriptors are stored in a file in the database.

The multimodal communication assist application maps 605 the modal input in the visual mode to a modal output in the text mode and/or the audio mode. The multimodal communication assist application stores mappings of the modal input in the visual mode to the modal output in the text mode and the audio mode in the database. The multimodal communication assist application also provides the option to replace existing mappings of modal inputs in one or more modes to modal outputs in another one or more of the modes with user defined mappings in the database. The user can therefore train the multimodal communication assist application based on the user's requirements. The user can train the multimodal communication assist application offline for defining gestures. The user can choose to either add to the default set of gestures in the database or create the user's own visual communication language and replace the existing dictionary in the database. In either case, the user only has to input a set of images with the corresponding labels that identify the gestures into the multimodal communication assist application.

The multimodal communication assist application uses the file containing the numerical descriptors corresponding to the different gestures and to non-gestures or transitions between the gestures to identify a boundary between the gestures in a feature space. Thus, the multimodal communication assist application computes a discriminant function, which is used to recognize an unlabeled gesture. As used herein, the term "discriminant function" refers to a mathematical representation of a hypersurface that separates valid gestures from non-gestures in a feature space.

The multimodal communication assist application determines a class label, for example, an alphabet, a word, a group of words defined by the user, etc., for each of the gestures, for example, based on a location of a numerical descriptor in the feature space which is defined by the parameters of the discriminant function. In an embodiment, the multimodal communication assist application employs a semi-supervised or hierarchical classification approach to classify, recognize, and associate a class label for each of the gestures. The semi-supervised or hierarchical classification approach coarsely sorts each of the gestures into a subset of similar gestures and thereafter uses a sensitive classifier to further recognize and associate a class label to each gesture.

In an embodiment, the multimodal communication assist application processes and transforms the modal output in the text mode to a modal output in the audio mode. The multimodal communication assist application associates the generated modal output in the text mode with one or more audio elements stored in the database to generate the modal output in the audio mode, thereby converting the modal output in the text mode to phonetic equivalents in the audio mode. In another embodiment, the multimodal communication assist application processes and transforms a modal input in the visual mode to a modal output in the audio mode. When the multimodal communication assist application recognizes a valid gesture, the multimodal communication assist application can voice out the audio element corresponding to the gesture, for example, via a speaker, without rendering the corresponding modal output in the text mode on the interactive interface.

After mapping the modal input in the visual mode to the modal output in the text mode and/or the audio mode, the multimodal communication assist application renders 606 the modal output in the text mode and/or the audio mode to the user for assisting the user to learn and/or communicate in the visual communication language in one or more modes. The multimodal communication assist application renders the modal output in the text mode on the interactive interface. The multimodal communication assist application plays back the modal output in the audio mode, via a speaker if the user activates the audio mode on the user's computing device. That is, if the user activates the audio mode, the multimodal communication assist application reads out the modal output in the text mode using a script that converts alphabets to phonetic equivalents and plays the modal output in the audio mode back for the user to hear.

In an embodiment, a speech recognition module may be incorporated in the multimodal communication assist application for analyzing the modal input in the audio mode and recognizing the modal input as a valid "word" in the vocabulary stored in the database. The multimodal communication assist application retrieves an image or a picture or a sequence of images or a short video as well as the words corresponding to the modal input in the audio mode from the database and displays the modal outputs in the visual mode and the text mode to the user via the interactive interface.

FIG. 6B exemplarily illustrates a flow diagram comprising the steps for refining the frames of the modal input captured in the visual mode. The multimodal communication assist application extracts 603a the frames of the captured modal input from the raw image stream received from the input device, for example, the camera. The multimodal communication assist application continually samples 603b the extracted frames in subsets of "m" frames at a sampling rate, where m<n and "n" is the total number of frames in the captured modal input, and selects a frame for a gesture. The sampling rate refers to the number of input frames of the modal input in the visual mode that are skipped or not processed. The sampling rate is defined by the delay factor determined by the multimodal communication assist application as disclosed in the detailed description of FIGS. 2A-2D, which defines the proficiency level of the user. For example, the multimodal communication assist application sets a high sampling rate for a user with a proficiency level of "expert", and a low sampling rate for a user with a proficiency level of "beginner". For a user with a proficiency level of "beginner", the delay in sampling the frames is longer and the number of frames skipped is greater than that for a user with a proficiency level of "expert". A timer 603g sets the sampling rate based on the delay factor.

If "m" successive frames "f" of the sampled subset are the same, or if "m" is equal to two, or if $\|f_i - f_{i+1}\|^2 < \epsilon$, where "i" is the frame index and correction factor $\epsilon > 0$, to account for minor jerks, unsteady hands or distortion due to breathing, etc., and time delay between the frames exceeds a permissible threshold $\tau$, also known as the delay factor, for a gesture, the multimodal communication assist application assumes that the same gesture has been repeated in succession and accordingly processes the gesture. The correction factor "$\epsilon$" is an arbitrarily small constant that accounts for minor jerks or unsteady hands that may cause the position of the user's hands to appear to have shifted between successive frames.

If successive frames are the same and the measured time delay $\theta < \tau$, the multimodal communication assist application skips processing the "m" frames and continues sampling the frames from the raw image stream. The time delay refers to a pause, for example, in seconds, between readings of the modal input captured from the input device. In an embodiment, the computer implemented method disclosed herein further comprises image enhancement for enhancing the modal input in the visual mode to ensure uniform background lighting or illumination. In another embodiment, instead of sampling multiple frames, if m=1, the multimodal communication assist application directly processes the sampled frames without comparing with the previous or successive few frames for persistence of a gesture. In another embodiment, instead of using $l^2$-norm, the multimodal communication assist application uses $l^p$-norm, where p>0, or any other distance measure in the feature space instead of an image space to make allowance for illumination changes. As used herein, the term "distance" refers, for example, to Euclidean distance, where a point or a line comes from Euclid's definition of these quantities.

There exist other measures such as the Haversine distance, which may be used to calculate the distance between two points on a globe, more suited for certain applications than the "straight-line" or Euclidean distance measured on a plane. For the Euclidean distance, p=2. Using different values of "p" provide several variations of the Euclidean distance. Also, as used herein, the term "any other distance measure" refers to measures, for example, the Mahalanobis distance or the Tanimoto distance that are often used in image processing but not included in the formula for the $l^p$-norm. Not only can distances be measured in an image space but also in a feature space, where each image may be represented by a set of features that numerically describe an image. For example, an image containing two squares may be described by counting the number of straight lines, that is, 8, number of right angles, that is, 8, etc., which would be different from the description of an image containing two circles. One method to determine similarity between images is to determine the similarity between their features. Measuring distances between numerical descriptors provides a means for determining similarity between the images.

In another embodiment, the multimodal communication assist application removes motion blur and tracks changes across successive frames by using filters. For example, the multimodal communication assist application tracks changes across successive frames by using a Kalman filter or a hidden Markov model. The Kalman filter uses measurements containing noise or random variations and other inaccuracies observed over time, and produces values that tend to be closer to true values of the measurements and their associated calculated values. The hidden Markov model is a statistical model of transitions between hidden states and associated visible states. In this case, the multimodal communication assist application models the change in the image frames, that is, the visible states to understand the change in the gestures, that is, the hidden states. The multimodal communication assist application is configured to capture a modal input in one or more modes from an input device, when the user provides the modal input while moving with the input device.

The frame selected by the multimodal communication assist application may or may not contain information, for example, presence of a hand or a pair of hands, or may even contain noise, for example, transitions between gestures. The multimodal communication assist application detects 603c a hand or a pair of hands, for example, from a single handed gesture, a dual handed gesture, etc., from the selected frame. The multimodal communication assist application arbitrarily selects a frame to be processed from a valid subset of "m" similar looking frames. The multimodal communication assist application detects similar looking frames based on a difference between the frames being less than $\epsilon > 0$. The multimodal communication assist application detects the gesture by extracting visual elements based on the characteristic information of the user. For example, the multimodal communication assist application detects the presence of a hand or a pair of hands based on the skin color, where the skin color spans a wide range and hence is user-dependent and not fixed. The multimodal communication assist application segments the selected frame based on the detection of the skin color of the user and excludes the remaining portions of the frame. The multimodal communication assist application denotes the segmented frame showing skin as "$\hat{I}$". Since the segmented frame "$\hat{I}$" may yield false positives such as portions of the user's arm being detected, the multimodal communication assist application segments out the hand region in the segmented frame by detecting the steepest change in the left profiles and the right profiles of "$\hat{I}$".

If the input device fails to detect the visual elements, for example, the user's hand, from the modal input captured in the visual mode, for example, due to a sudden change in the ambient lighting, or if the input device detects more than one pair of hands in its field of view, etc., the multimodal communication assist application enters a reset mode. In the reset mode, the multimodal communication assist application requests the user to hold the hand or the pair of hands in view of the input device with the user's fingers spread out, until the multimodal communication assist application autocorrects parameters for background lighting to detect the hand or the pair of hands of the user. If the multimodal communication assist application cannot detect the user's hand or the pair of hands, for example, due to the background color being too close to the skin color of the user, the multimodal communication assist application alerts the user and prompts the user to wear or use markers, for example, a watch, a wearable sticker, finger rings, a bracelet, a wrist band, etc.

In an embodiment, the multimodal communication assist application, in communication with an input device of a high resolution of greater than 2 mega pixels, detects and extracts the visual elements such as the hand regions using multi-resolution techniques, for example, by operating on a coarse sub-band or a smoothed and down sampled version of the frame, thereby reducing computational load without affecting recognition accuracy. In another embodiment, the multimodal communication assist application detects and extracts the hand regions in the frame using markers, for examples, a cuff or a rim of a full sleeved shirt, nail polish, a wearable sticker, a watch, a bracelet, a wrist band, tattoos, etc. In another embodiment, the multimodal communication assist application detects and extracts the hand regions in the frame by interactively ascertaining parameters of the user's hand, for example, a ratio of distance from the user's finger tip to the user's knuckle and the knuckle to a base of the user's hand, span of the hand from the user's thumb to the user's little finger when the user's palm is open and when the user makes a fist, etc.

The multimodal communication assist application then registers 603d the segmented frame comprising the detected hand regions. Since the position of the user's hands with respect to the input device is not constrained, the detected hand regions may not always be in the same orientation across frames. The multimodal communication assist application defines directional axes on the segmented frame. The directional axes are based on proportion and orientation of the user's hands. For example, a radial line through the user's wrist may point in the direction of the fingers rather than the user's arm. Similarly, a horizontal axis points in the direction of the thumb. When an image of the user's hand is segmented, the multimodal communication assist application identifies features, for example, the wrist, the thumb, etc., based on the geometry and the directional axes superimposed on the image. The multimodal communication assist application aligns the directional axes with reference axes to ensure that the subsequently determined numerical descriptors are rotation invariant. Thus, the multimodal communication assist application provides flexibility to the user to position the hand or the pair of hands in any orientation within the field of view of the input device.

In an embodiment, registration of the segmented frame can be circumvented. For example, at the time of building a data set of gestures, if images of various gestures are input at different orientations with respect to a reference axis on the input device, then, regardless of the orientation of the user's hands with respect to the input device, the multimodal communication assist application recognizes the visual elements and hence the gestures. Otherwise, once an image or a sequence of images of the user's hands has been segmented, the multimodal communication assist application has to reorient the image or the sequence of images to match the gestures in the database.

The multimodal communication assist application filters and resizes 603e the registered frame comprising the detected hand regions. The multimodal communication assist application performs robust edge detection through low pass filtering and high pass filtering to eliminate noisy pixels and obtain closed contours including lines of separation, for example, for fingers of the hand, respectively. The multimodal communication assist application then marks a boundary box to contain only the hand regions and to eliminate the other pixels.

The size of the hand and the distance of the hand or the pair of hands from the input device vary across users. For example, the size of a child's hand is typically smaller than the size of an adult's hand. Therefore, the multimodal communication assist application resizes the registered frame comprising the hand region to a reference size "$s_1 \times s_2$". Thus, the multimodal communication assist application ensures translation invariance and scale invariance of the numerical descriptors. In an embodiment, the multimodal communication assist application detects connected components and traces contours of interest, for example, using morphological operators. The morphological operators aid the multimodal communication assist application to determine whether a portion of an image is an object of interest, for example, an image of the user's hand, and hence belongs to either the foreground or the background. The multimodal communication assist application thereby extracts 603f the registered frame with the gesture expressed by the movement of the hand.

FIG. 6C exemplarily illustrates a flow diagram comprising the steps for determining a numerical descriptor for the registered frame. The multimodal communication assist application receives 604a the registered frame with the gesture. The multimodal communication assist application performs 604b block transformation on the registered frame comprising the detected hand regions. The multimodal communication assist application segments or subdivides the registered frame having the reference size "$s_1 \times s_2$" into "d" blocks of equal size "$k_1 \times k_2$". Since registration and resizing disclosed in the detailed description of FIG. 6B brings all the gestures to a common format, subdividing the registered frame having the reference size "$s_1 \times s_2$" into "d" blocks of equal size "$k_1 \times k_2$" provides a format with minimal ambiguity for further processing. In an embodiment, the multimodal communication assist application subdivides the registered frame into "d" blocks of non-equal sizes. The multimodal communication assist application divides the registered frame using a spatial grid that describes the density of pixels or number of edges in each block, for example, based on a space frequency description provided by a wavelet packet tree.

The multimodal communication assist application counts occurrence of highlighted visual constituents, for example, highlighted pixels, in each of the blocks. The multimodal communication assist application accumulates 604c the highlighted visual constituents in each block to determine 604d and chart an occurrence vector $v \in \mathfrak{R}^d$ corresponding to the registered frame to form translation, scale and rotation invariant numerical descriptors. The translation, scale and rotation invariant numerical descriptors for a gesture are a set of numbers that describe a gesture and are the same regardless of the position, for example, far left versus far right; orientation, for example, at an angle of 45 degrees with the horizontal versus 120 degrees; or size of the user's hands, for example, the user's hands filling the entire frame versus half of the frame. The multimodal communication assist application then determines a class label based on the numerical descriptors, and associates the class label to each gesture as disclosed in the detailed description of FIG. 6A, thereby mapping the modal input in the visual mode to the modal output in the text mode.

In an embodiment, the multimodal communication assist application computes block specific statistics, for example, mean, covariance, textures, etc. Since each gesture comprises a different pattern, the block specific statistics help single out a gesture based on unique patterns rather than details from a raw image, for example, color of the hands, which changes for each user.

Figure 7:
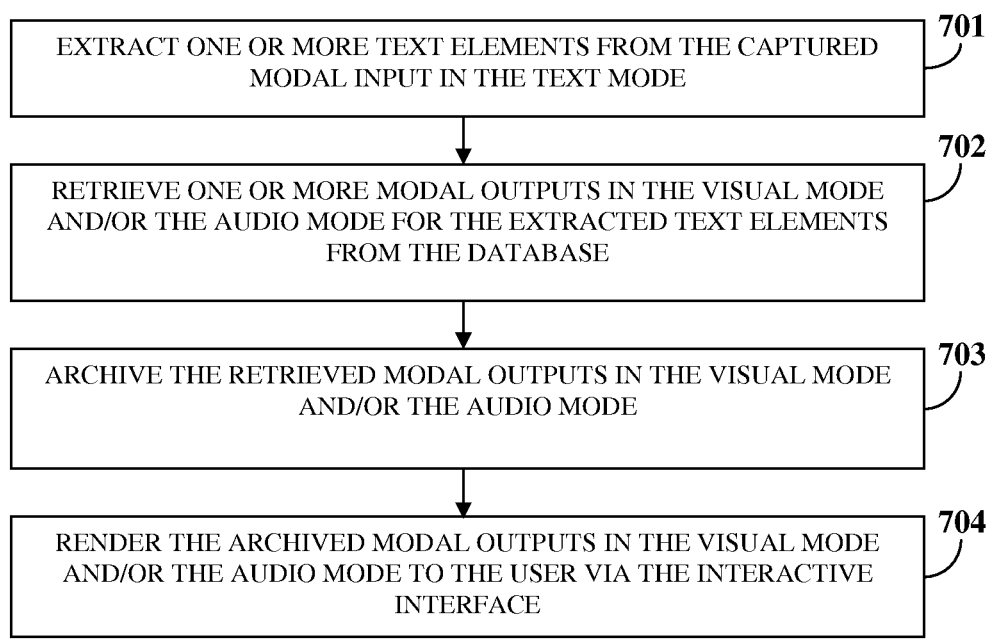
FIG. 7 illustrates a computer implemented method for processing and transforming a captured modal input in a text mode into a modal output in a visual mode and/or an audio mode by the multimodal communication assist application.

FIG. 7 illustrates a computer implemented method for processing and transforming a captured modal input in a text mode into a modal output in a visual mode and/or an audio mode by the multimodal communication assist application. The user may input one or more text elements, for example, characters, letters, a word, a group of words defined by the user, etc., into a text field on the interactive interface using an input device, for example, a keyboard, a touchpad, etc. The multimodal communication assist application extracts 701 one or more text elements from the captured modal input in the text mode. The multimodal communication assist application retrieves 702 one or more modal outputs in the visual mode, for example, gestures, and/or the audio mode, for example, sounds, for the extracted text elements from the database. The multimodal communication assist application archives 703 the retrieved modal outputs in the visual mode and/or the audio mode. The multimodal communication assist application renders 704 the archived modal outputs in the visual mode and/or the audio mode to the user via the interactive interface for assisting the user to learn and/or communicate in the visual communication language. In an embodiment, the multimodal communication assist application renders the archived modal output gestures in the visual mode and/or the audio mode to the user via the interactive interface based on the delay factor determined by the multimodal communication assist application for the user.

Consider an example where a user inputs the words "Hello friend" into a text field on the interactive interface using an input device, for example, a keyboard, a touchpad, etc., of the user's computing device. The multimodal communication assist application extracts the word "Hello" and the word "Friend" from the captured modal input in the text mode. The multimodal communication assist application retrieves a video image of a gesture for the extracted word "Hello" from the database. The retrieved video image shows waving of a right open hand back and forth several times. The multimodal communication assist application retrieves a video image of a gesture for the extracted word "Friend" from the database. The retrieved video image shows consecutive interlocking of index fingers of the right hand and the left hand. The multimodal communication assist application may also retrieve the sound files that speak the words "Hello" and "Friend". The multimodal communication assist application archives the retrieved modal outputs in the visual mode and/or the audio mode based on the user's proficiency level. That is, the multimodal communication assist application allows the user to decide how many gestures they wish to see and/or hear at a time. The multimodal communication assist application displays the gesture for the word "Hello", the gesture for the word "friend", or both the gestures to the user on the interactive interface. The multimodal communication assist application also renders the modal output in the audio mode by playing back the retrieved sound files to the user via the speaker of the user's computing device.

Figure 8:
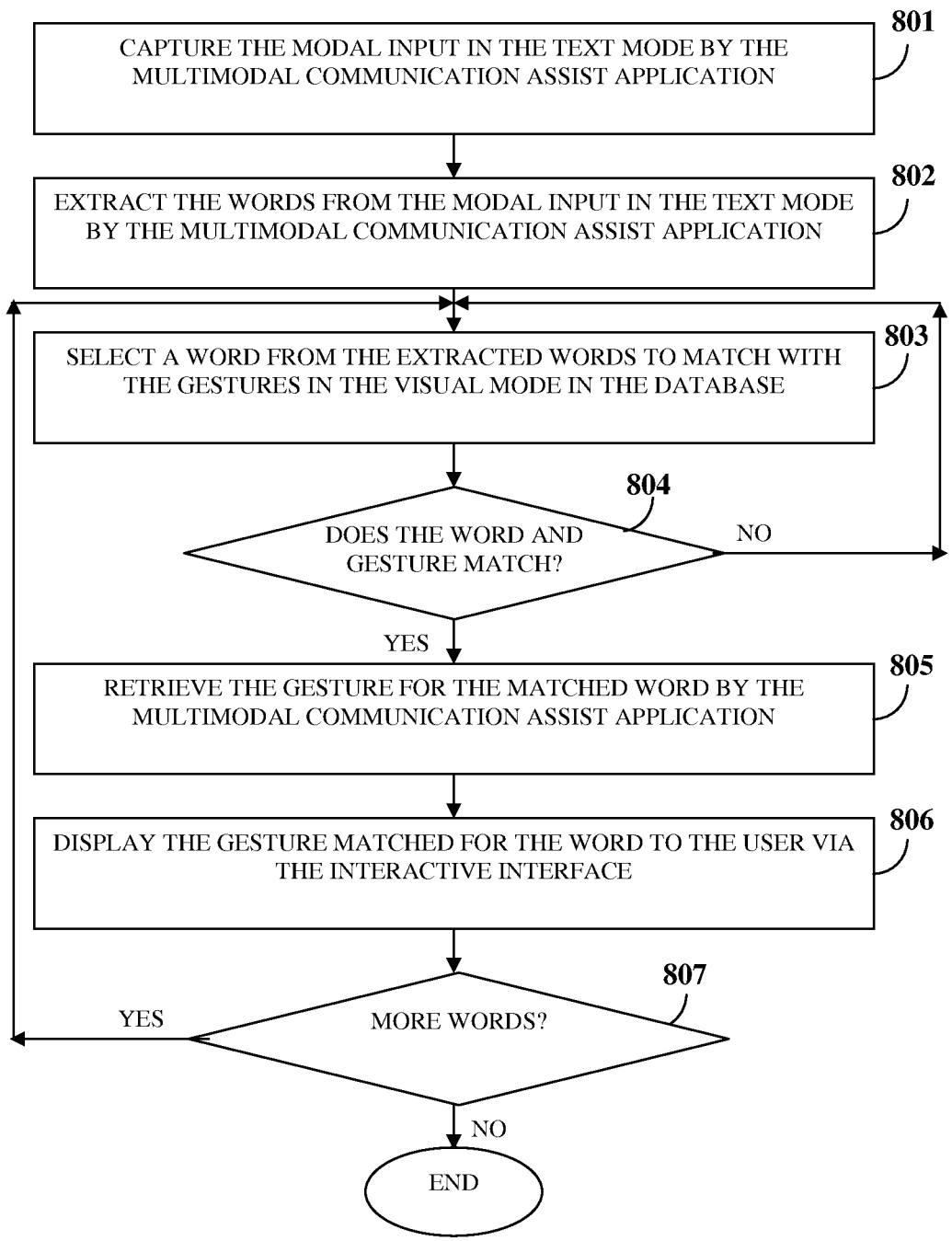
FIG. 8 exemplarily illustrates a flowchart comprising the steps for processing and transforming a modal input in a text mode into a modal output in a visual mode by the multimodal communication assist application.

FIG. 8 exemplarily illustrates a flowchart comprising the steps for processing and transforming a modal input in a text mode into a modal output in a visual mode by the multimodal communication assist application. The multimodal communication assist application captures 801 the modal input in the text mode from the user. The multimodal communication assist application extracts 802 the words from the modal input in the text mode. The multimodal communication assist application selects 803 a word from the extracted words to match with the gestures in the visual mode in the database. The multimodal communication assist application checks 804 whether the word matches any of the gestures in the database. If the word does not match any of the gestures in the database, the multimodal communication assist application selects 803 another word from the extracted words to match with the gestures in the database.

If the word matches any of the gestures in the database, the multimodal communication assist application retrieves 805 the gesture for the matched word. The multimodal communication assist application displays 806 the gesture matched for the word to the user via the interactive interface. The multimodal communication assist application checks 807 whether there are more words in the extracted words that need to be matched. If there are more words in the extracted words that need to be matched, then the multimodal communication assist application repeats the steps 803, 804, 805, and 806. If there are no more words in the extracted words that need to be matched, the multimodal communication assist application terminates the matching process and displays the gestures for the matched words on the interactive interface.

Figure 9:
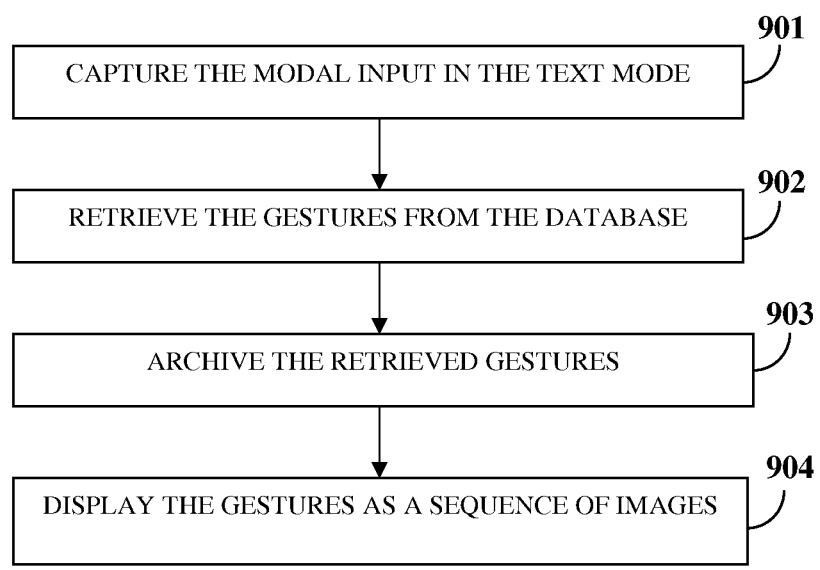
FIG. 9 exemplarily illustrates an example of the method for processing and transforming a modal input in a text mode into a modal output in a visual mode by the multimodal communication assist application.

FIG. 9 exemplarily illustrates an example of the method for processing and transforming a modal input in a text mode into a modal output in a visual mode by the multimodal communication assist application. In this example, the multimodal communication assist application captures the modal input in the text mode from a user who is not versed in the visual mode of the visual communication language to map into a modal output in the visual mode of the visual communication language to allow the user to communicate with a deaf and mute user who is versed only in the visual mode of the visual communication language and not in other modes, for example, the text mode, the audio mode, etc. The multimodal communication assist application captures 901 the modal input in the text mode entered by the user using an input device, for example, a keyboard, a touchpad, etc., via the interactive interface. The multimodal communication assist application maps modal input in the text mode into a modal output in the visual mode using the gestures stored in the database. The multimodal communication assist application retrieves 902 gestures for each of the words entered by the user from the database. The multimodal communication assist application creates an animated version of the sequence of the retrieved gestures by stringing together the retrieved gestures.

The multimodal communication assist application archives 903 the retrieved gestures and plays back the retrieved gestures at a speed that depends on the user's proficiency level, which is ascertained through the user's feedback on the number of gestures he/she would like to see at a time. The retrieved gestures are archived only to assist a user in replaying gestures or tracing a portion of the message after the message has already been played back. The multimodal communication assist application associates the retrieved gestures with a session and saves the retrieved gestures for the entered words in the database for retrieval as a video or a sequence of still images at a later time. The multimodal communication assist application displays 904 the gestures on the interactive interface as a sequence of images corresponding to the modal input in the text mode. The multimodal communication assist application strings together the images of the gestures and plays the images as a video of the set of gestures belonging to a word or a sentence delineated by a white space or a period that is under processing. The multimodal communication assist application provides options to allow the user to view current gestures or the archived gestures as a video or as a sequence of still images retrieved from the database.

FIG. 10 illustrates a computer implemented method for generating and utilizing learning components and testing components for assisting a user to learn and/or communicate in the visual communication language in one or more of multiple modes. The database maintained by the multimodal communication assist application stores mappings of a modal input in one of the modes to a modal output in another one or more of the modes, the characteristic information of the user, the determined delay factor for the user, and the proficiency level of the user. In an embodiment, the multimodal communication assist application acquires one or more mappings of the modal input in one or more modes to the modal output in another one or more of the modes from the user via the interactive interface and stores the acquired mappings in the database.

In an embodiment, the multimodal communication assist application generates 1001 one or more learning components and testing components for the user, for example, using one or more of mappings of the modal input in one of the modes into the modal output in another one or more of the modes, the characteristic information of the user, the determined delay factor, the user's proficiency level, predetermined test information, previous performance reports, etc., stored in the database. As used herein, the term "learning components" refers to lessons generated by the multimodal communication assist application for the user based on the user's proficiency level for assisting the user to learn and/or communicate in the visual communication language in one or more modes. Also, as used herein, the term "testing components" refers to tests generated by the multimodal communication assist application that are adapted to the user based on the user's proficiency level for testing the user on the visual communication language in one or more modes. The multimodal communication assist application randomizes the gestures in the testing components and even repeatedly present those gestures that the user has a propensity to err on in the testing components. In an embodiment, the learning components are linked with the testing components to allow the user to be tested on gestures that the user has learned using the learning components.

The multimodal communication assist application presents 1002 the generated learning components or the generated testing components in one or more modes to the user via the interactive interface based on the determined delay factor. For example, the multimodal communication assist application presents text elements, or audio elements, or a combination of text elements and audio elements via the interactive interface based on the determined delay factor for conversion into gestures. The multimodal communication assist application captures 1003 a modal input in another one of the modes, for example, a visual mode in the form of a gesture from the user based on the determined delay factor using an input device, for example, a camera for the presented text elements and/or audio elements. The multimodal communication assist application evaluates 1004 the captured modal input in the visual mode based on a mapping of the modal input in the text mode and/or audio mode to the modal output in the visual mode stored in the database. The multimodal communication assist application generates 1005 a performance report based on the evaluation and renders 1006 the performance report to the user via the interactive interface. The performance report comprises, for example, a learning curve, analytics for consistently misidentified gestures or mistaken gestures, etc., for the user. In an embodiment, the multimodal communication assist application tracks performance of the user who engages with the generated learning components and the generated testing components to select the generated learning components and the generated testing components to be presented to the user via the interactive interface for assisting the user to learn and/or communicate in the visual communication language in one or more modes.

In another example, the multimodal communication assist application presents the generated learning components and the generated testing components in a visual mode to the user via the interactive interface. The multimodal communication assist application presents gestures in the visual mode based on the delay factor of the user. The multimodal communication assist application captures the modal input in the text mode entered by the user using the keyboard for the presented gestures. The multimodal communication assist application may also capture the modal input in the audio mode spoken by the user using a microphone, for the presented gestures. The multimodal communication assist application evaluates the received modal input in the text mode and/or audio mode based on a mapping of the gestures to text elements and/or audio elements stored in the database. The multimodal communication assist application records the generated learning components and the generated testing components and the responses of the user in a log file in the database for subsequent generation and adaptation of the learning components and the testing components to the user.

In an embodiment, the multimodal communication assist application communicates with a central adaptive learning system via a communication network for generating the learning components and the testing components. The central adaptive learning system gathers performance data, for example, responses to the learning components and the testing components, proficiency levels defined by delay factors, etc., of multiple users for enhancing the generation of the learning components and the testing components. In an example, the central adaptive learning system gathers the previous performance reports, the proficiency levels defined by delay factors, one or more mappings of multiple users, etc., stored in log files anonymously to improve generation of the learning components and the testing components. The central adaptive learning system provides system updates from time to time to the user via the communication network, for example, the internet, to update the learning components and the testing components generated on the user's computing device.

Figure 11A:
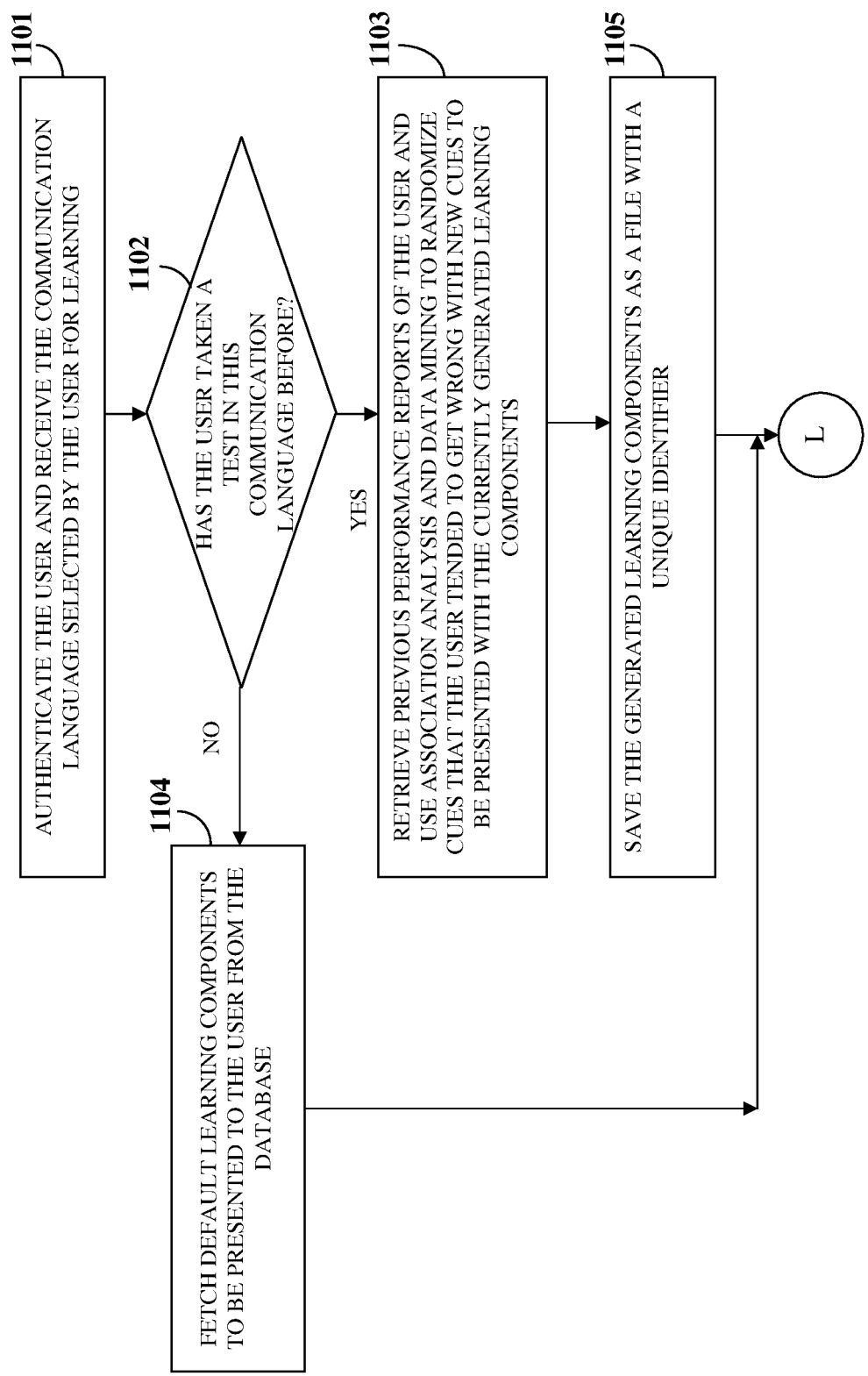
FIGS. 11A-11B exemplarily illustrate a flowchart comprising the steps for generating and utilizing learning components for assisting a user to learn and/or communicate in the visual communication language in one or more of multiple modes.
Figure 11B:
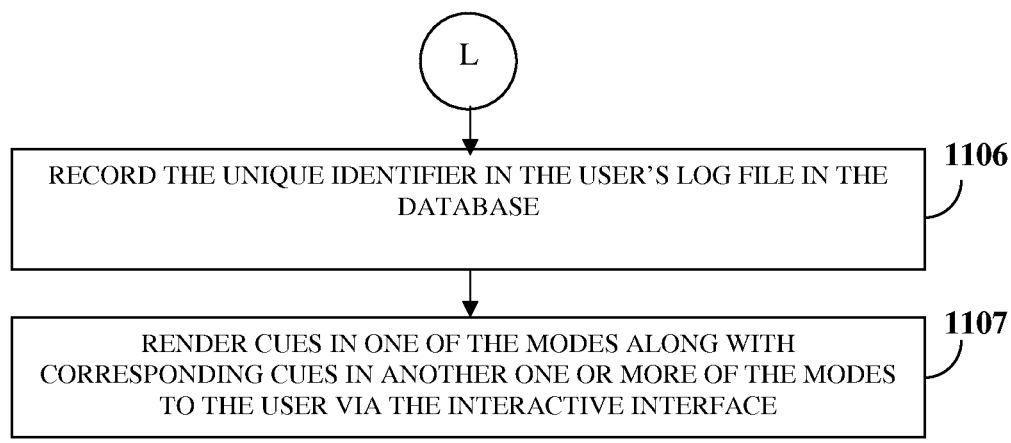

FIGS. 11A-11B exemplarily illustrate a flowchart comprising the steps for generating and utilizing learning components for assisting a user to learn and/or communicate in the visual communication language in one or more of multiple modes. In an embodiment, a user registers to access the multimodal communication assist application via a communication network, for example, the internet. The user logs in to access the multimodal communication assist application and selects a communication language for learning the visual communication language. The multimodal communication assist application authenticates the user and receives 1101 the communication language selected by the user for learning the visual communication language via the interactive interface. The multimodal communication assist application generates the learning components and the testing components in the communication language selected by the user. The multimodal communication assist application checks 1102 whether the user has taken a test in the selected communication language before.

If the multimodal communication assist application has not taken the test in the selected communication language before, then the multimodal communication assist application fetches 1104 default learning components to be presented to the user from the database for assisting the user to learn the visual communication language. If the user has taken the test in the selected communication language before, the multimodal communication assist application detects previous records of the user associated with the test and retrieves 1103 previous performance reports of the user. The multimodal communication assist application uses association analysis and data mining 1103 to randomize cues that the user tended to get wrong with new cues to be presented with the currently generated learning components. The multimodal communication assist application saves 1105 the generated learning components as a file with a unique identifier. The multimodal communication assist application records 1106 the unique identifier in the user's log file in the database. The multimodal communication assist application renders 1107 the cues in one of the modes of the visual communication language along with corresponding cues in another one or more of the modes of the visual communication language to the user via the interactive interface. In an embodiment, the multimodal communication assist application renders the cues to the user based on the determined delay factor that defines the user's proficiency level.

Figure 12A:
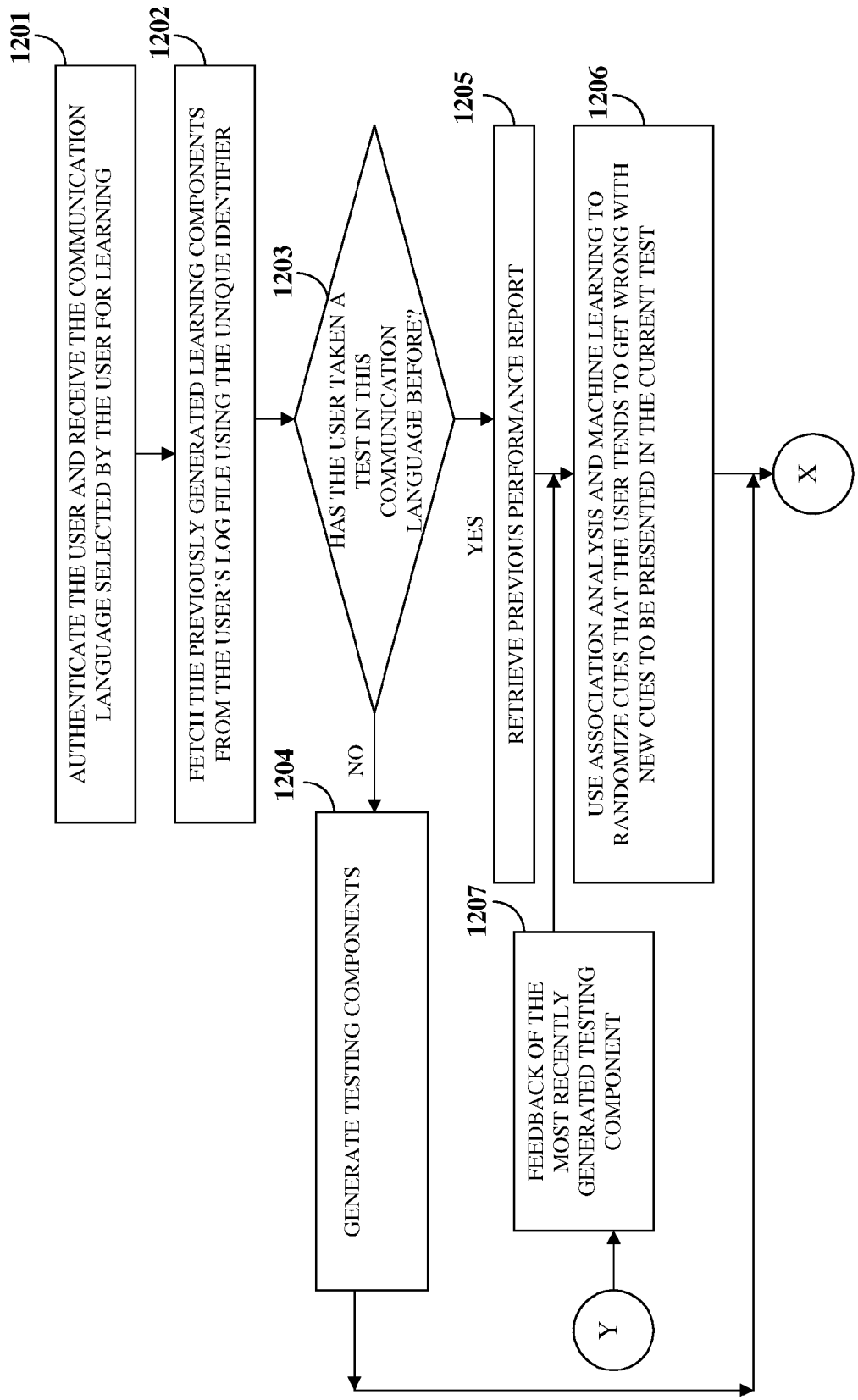
FIGS. 12A-12B exemplarily illustrate a flowchart comprising the steps for generating and administering testing components to a user for creating a learning curve for the user.
Figure 12B:
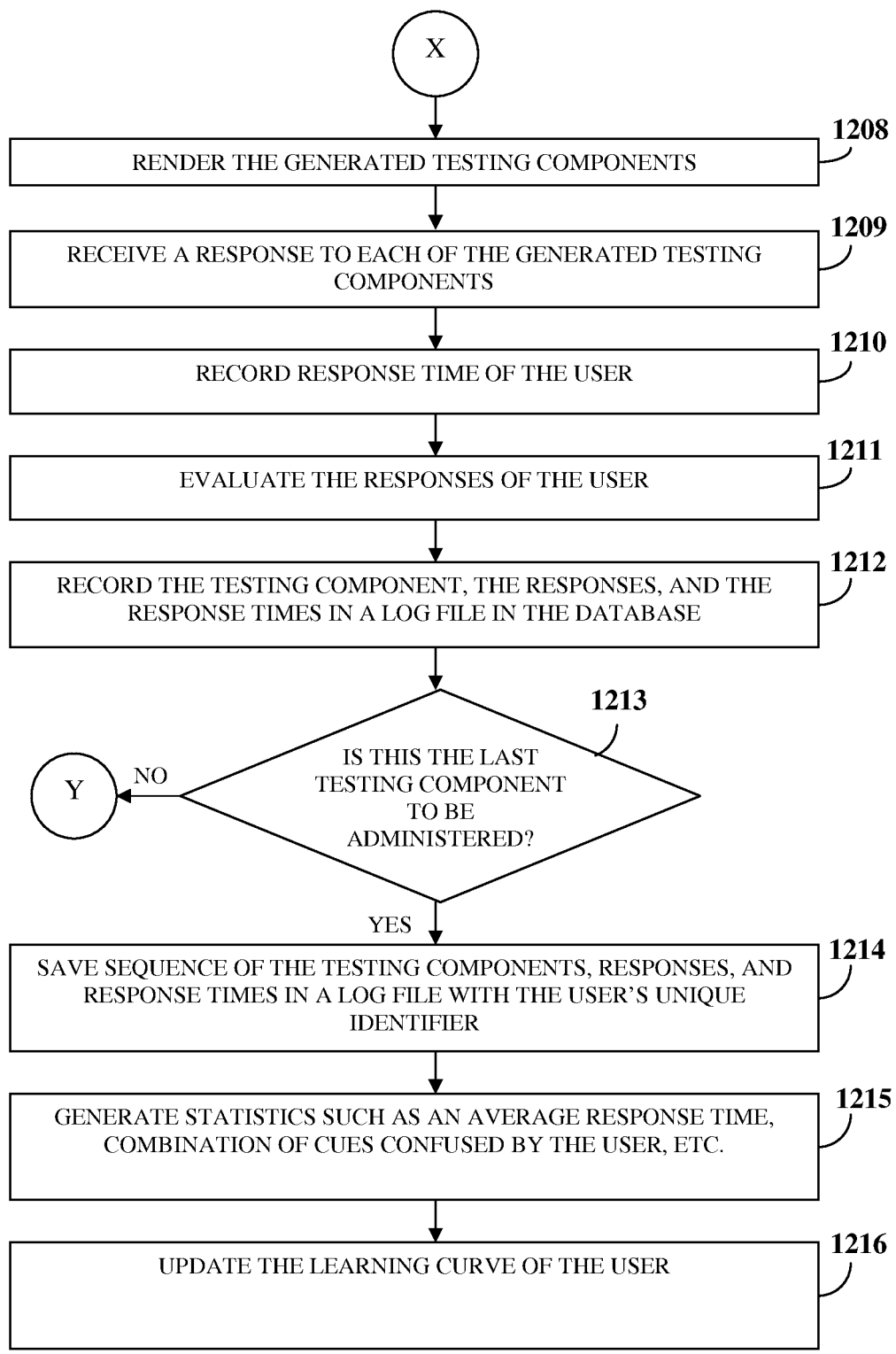

FIGS. 12A-12B exemplarily illustrate a flowchart comprising the steps for generating and administering testing components to a user for creating a learning curve for the user. A user logs in to access the multimodal communication assist application and selects a communication language for learning the visual communication language. The multimodal communication assist application authenticates the user and receives 1201 the communication language selected by the user via the interactive interface for learning the visual communication language. The multimodal communication assist application fetches 1202 the previously generated learning components from the user's log file in the database using the unique identifier.

The multimodal communication assist application checks 1203 whether the user has taken a test in the selected communication language before. If the multimodal communication assist application has not taken the test in the selected communication language before, the multimodal communication assist application generates 1204 testing components based on the delay factor of the user. The testing components comprise, for example, a sequence of gesture cues and text cues, or a sequence of gesture cues and audio cues based on the learning components. If the user has taken the test in the selected communication language before, the multimodal communication assist application detects previous records of the user and retrieves 1205 the previous performance reports. The multimodal communication assist application uses association analysis and machine learning 1206 to randomize cues that the user tends to get wrong with new cues to be presented in the current test.

The multimodal communication assist application renders 1208 the generated testing components to the user via the interactive interface. In an embodiment, the multimodal communication assist application renders the generated testing components to the user based on the determined delay factor that defines the user's proficiency level. The multimodal communication assist application receives 1209 a response from the user to each of the generated testing components. The multimodal communication assist application records 1210 the response time of the user for each of the generated testing components. The multimodal communication assist application evaluates 1211 the responses of the user to the generated testing components. The multimodal communication assist application records 1212 the generated testing components, the responses of the user, and the response times of the user in the user's log file in the database.

The multimodal communication assist application checks 1213 whether the last testing component has been administered to the user. If the last testing component has not been administered to the user, the multimodal communication assist application obtains feedback 1207 of the most recently generated testing component and continues to perform association analysis and machine learning 1206. If the last testing component is to be administered to the user, then the multimodal communication assist application saves 1214 sequence of the testing components, the responses of the user, and the response times of the user in the user's log file with the unique identifier in the database. The multimodal communication assist application generates 1215 statistics such as an average response time, combination of cues confused by the user, etc. The multimodal communication assist application updates 1216 the learning curve of the user based on the generated statistics.

In an example, the multimodal communication assist application presents the testing components in two phases. In a first phase, the multimodal communication assist application presents a set of gestures one at a time to the user via the interactive interface. In a second phase, the multimodal communication assist application presents a set of text cues and/or audio cues one at a time to the user via the interactive interface. In the first phase, the multimodal communication assist application expects the user to identify a gesture, while in the second phase, the multimodal communication assist application expects the user to respond with a gesture that corresponds to a text cue and/or an audio cue. The multimodal communication assist application then evaluates the accuracy of the gesture performed by the user. Apart from the specific set of inputs to be presented, the multimodal communication assist application presents the cues with a time delay based on the user's delay factor. The multimodal communication assist application records the set of cues and the user's responses in a log file to better adapt to the user's requirement.

Figure 13:
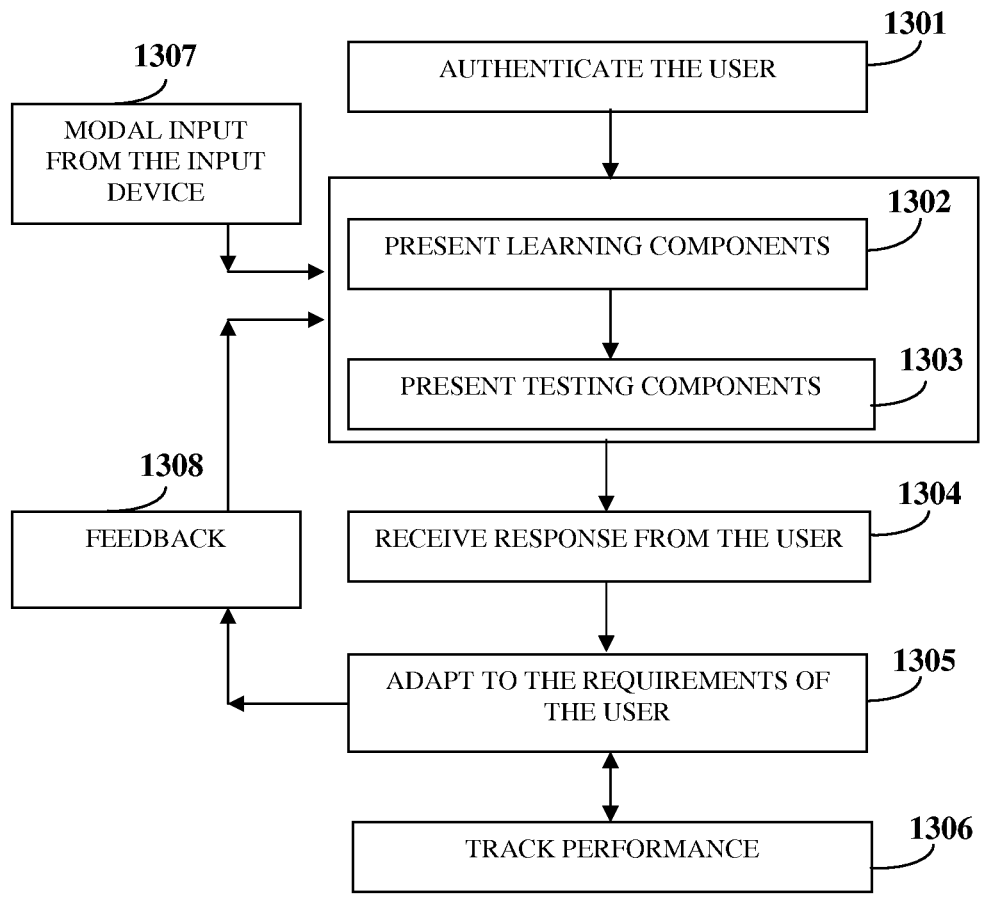
FIG. 13 exemplarily illustrates a flow diagram comprising the steps for tracking performance of the user during learning of the visual communication language in one or more of multiple modes.

FIG. 13 exemplarily illustrates a flow diagram comprising the steps for tracking performance of the user during learning of the visual communication language in one or more of multiple modes. A user logs in to access the multimodal communication assist application. The multimodal communication assist application authenticates 1301 the user and initiates tracking of the proficiency level of the user and progress in learning the visual communication language in one or more modes. The multimodal communication assist application determines the delay factor that defines the proficiency level of the user to generate or update learning components for the user. The multimodal communication assist application calibrates the proficiency level of the user based on the user's previous performances.

In an embodiment, the multimodal communication assist application provides an option to the user to select the proficiency level for engaging with the learning components, for example, as a beginner, an expert, a past master, etc. The multimodal communication assist application then re-calibrates the proficiency level of the user based on the user's performance while engaging with the learning components. The user may also reset the defined proficiency level and start learning the visual communication language as a beginner. In an embodiment, the multimodal communication assist application initiates a new session every time the user operates the generated learning components, thereby eliminating a requirement for long term storage of the user's performance in the database. In an embodiment, the multimodal communication assist application presents multiple internal proficiency levels to provide accurate and adaptive support to the user.

The multimodal communication assist application presents 1302 the generated learning components to the user based on the delay factor of the user. Furthermore, the multimodal communication assist application presents 1303 the generated testing components and also repeatedly presents the gestures on which the user has a propensity to err. The multimodal communication assist application randomizes the gestures adaptive to the user's proficiency level that is defined based on the delay factor of the user. The multimodal communication assist application associates the generated learning components and the generated testing components to present appropriate learning components to the user. The multimodal communication assist application receives 1304 the responses to the presented learning components and the presented testing components from the user via a modal input 1307 from an input device. The multimodal communication assist application tracks the generated learning components and the generated testing components presented to the user in the user's log file in the database to correlate them with the performance of the user, thereby adapting 1305 the learning components and the testing components to the requirements of the user. The multimodal communication assist application utilizes these adaptations as feedback 1308 for generating and presenting learning components and testing components to the user. In an embodiment, when the basic learning components are mastered by the user, the multimodal communication assist application presents, for example, cues that unravel a story through different iterations to provide an incentive for the user to undertake adaptive tests and perform well in them.

The multimodal communication assist application generates adaptive learning components based on statistical machine learning and multimodal data mining. Based on the presented learning components, the presented testing components, and the user's responses, the multimodal communication assist application determines the user's proficiency level and hence the time delay for presenting the cues in the lessons and tests. The multimodal communication assist application correlates lesson logs and corresponding test performance logs of the user in the database for generating subsequent learning components for the user.

In an embodiment, the user invokes communication between the multimodal communication assist application on the user's computing device with the central adaptive learning system via the communication network for generating learning components and testing components for the user. The central adaptive learning system gathers data from various users anonymously to improve the generated learning components and the generated testing components. The central adaptive learning system provides updates from time to time to the user over the communication network, for example, the internet, to update the generated learning components and the generated testing components on the user's computing device. In an embodiment, the multimodal communication assist application updates the generated learning components and the generated testing components independent of the central adaptive learning system. In this embodiment, the multimodal communication assist application adaptively learns and updates the generated learning components and the generated testing components using data gathered locally through multiple users of the computing device.

The multimodal communication assist application tracks 1306 performance of the user in response to the generated learning components and the generated testing components. The multimodal communication assist application retrieves a learning curve, performance analytics, for example, gestures consistently misidentified, mistaken or misrepresented by the user, etc., based on the tracked performance of the user. The multimodal communication assist application utilizes the learning curve for generating the learning components and the testing components for the user. The multimodal communication assist application therefore assists the user to track the performance through multiple lessons and thus levels of proficiency and also enables adaptive learning by the multimodal communication assist application. The multimodal communication assist application can infer, for example, the gestures that are difficult and combinations of gestures that users often struggle with to improve the design of the learning components and the testing components.

Figure 14:
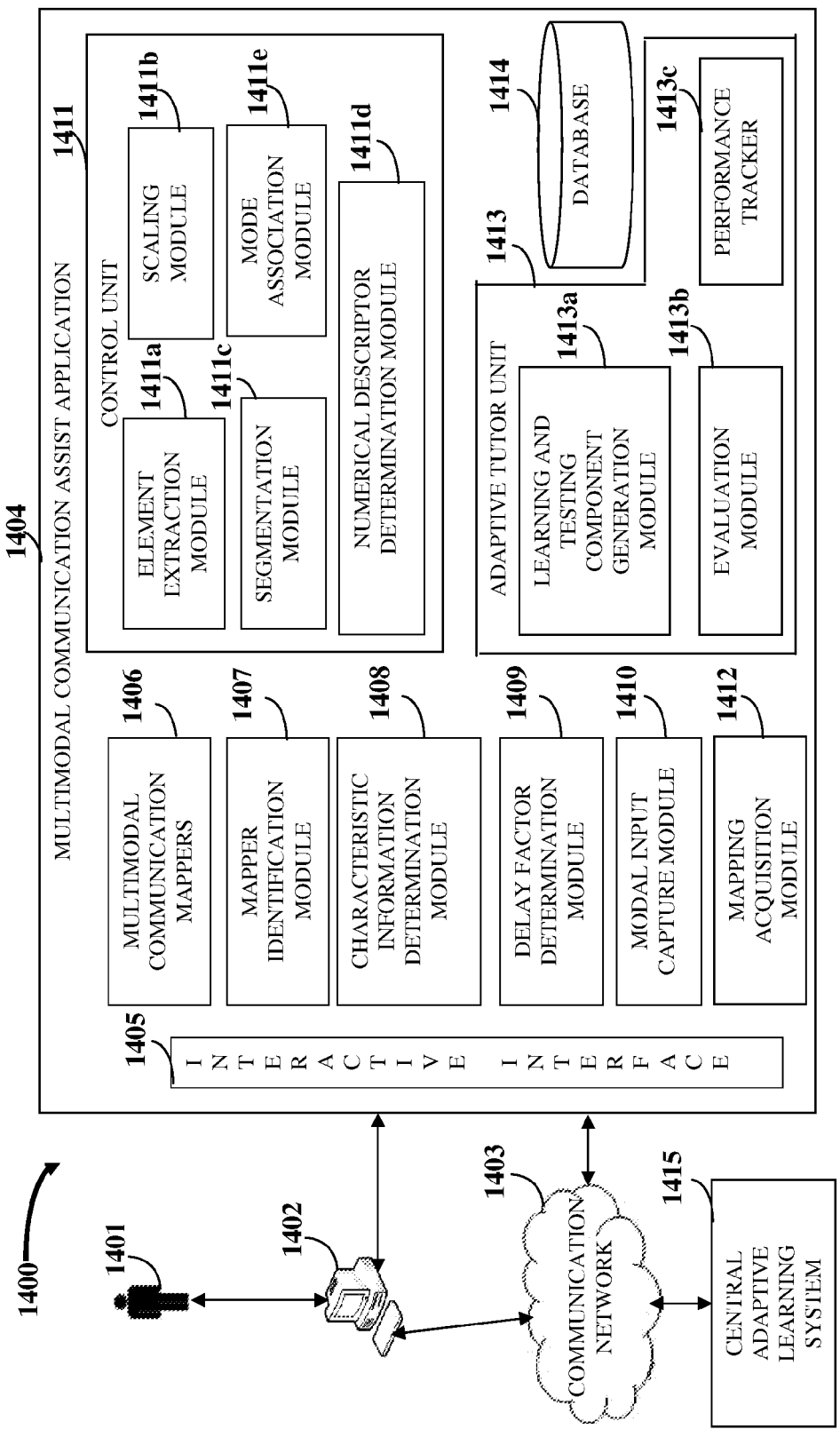
FIG. 14 illustrates a computer implemented system for assisting a user to learn and/or communicate in the visual communication language in one or more of multiple modes.

FIG. 14 illustrates a computer implemented system 1400 for assisting a user 1401 to learn and/or communicate in the visual communication language in one or more of multiple modes. The computer implemented system 1400 disclosed herein comprises the multimodal communication assist application 1404 on the computing device 1402 of the user 1401. The user's 1401 computing device 1402 is, for example, a cellular phone, a personal computer, a laptop, a mobile phone, a personal digital assistant, a tablet computing device, an internet-enabled mobile device, a digital notebook, a network-enabled computing device, a portable communication device, other communication devices, etc. The multimodal communication assist application 1404 comprises an interactive interface 1405, multiple multimodal communication mappers 1406, a mapper identification module 1407, a characteristic information determination module 1408, a delay factor determination module 1409, a modal input capture module 1410, a control unit 1411, a mapping acquisition module 1412, an adaptive tutor unit 1413, and a database 1414.

The multimodal communication assist application 1404 provides the interactive interface 1405 to the user 1401 to assist the user 1401 to learn and/or communicate in the visual communication language in multiple modes, for example, a video mode, a text mode, an audio mode, etc., and any combination thereof. The interactive interface 1405 is the front end of the multimodal communication assist application 1404 and enables communication of the visual communication language in multiple modes. The modules, for example, 1406, 1407, 1408, 1409, 1410, 1411, 1412, 1413, and 1414 form the back end of the multimodal communication assist application 1404.

The multimodal communication mappers 1406 are accessible to the user 1401 via the interactive interface 1405. The user 1401 can select one or more of the multimodal communication mappers 1406 displayed to the user 1401 via the interactive interface 1405. The multimodal communication mappers 1406 map a modal input in one of the modes to a modal output in another one or more of the modes. The multimodal communication mappers 1406 comprise a visual to text and/or audio mapper 1406*a*, a text to visual and/or audio mapper 1406*b*, and an audio to text and/or visual mapper 1406*c* as exemplarily illustrated in FIG. 15.

The mapper identification module 1407 identifies the multimodal communication mappers 1406 selected by the user 1401 via the interactive interface 1405. The characteristic information determination module 1408 determines the user's 1401 characteristic information comprising, for example, one or more of the skin color of the user 1401, the position of the hands of the user 1401, the communication language of the user 1401, the response time of the user 1401, for example, for mapping the text mode to the visual mode, the accessories of the user 1401 used as markers, etc., based on the identified multimodal communication mappers 1406.

The delay factor determination module 1409 determines a delay factor for the user 1401 based on the determined characteristic information, for example, the response time of the user 1401 as disclosed in the detailed description of FIGS. 2A-2D. For example, the modal input capture module 1410 captures a modal input in the visual mode from the user 1401 via the interactive interface 1405 at a predefined sampling rate, where the modal input is a simulation of visual elements corresponding to one or more text elements presented to the user 1401 via the interactive interface 1405. The control unit 1411 matches the captured modal input in the visual mode with multiple modal outputs in the visual mode stored in the database 1414. For example, a mode association module 1411e of the control unit 1411 matches the captured modal input in the visual mode with multiple modal outputs in the visual mode stored in the database 1414. The delay factor determination module 1409, in communication with the interactive interface 1405, the modal input capture module 1410, and the control unit 1411 determines a response time of the user 1401 for each of the presented text elements during the capture of the matched modal input and utilizes the response time to determine the delay factor for the user 1401. The delay factor determination module 1409 defines a proficiency level for the user 1401 based on the determined delay factor as disclosed in the detailed description of FIGS. 2A-2D. For example, the delay factor determination module 1409 defines the user's 1401 proficiency level, for example, a beginner level, an advanced beginner level, a competent level, a professional level, an expert level, etc., using the determined delay factor.

The modal input capture module 1410 captures a modal input in one of the modes from the user 1401 via the interactive interface 1405 based on the determined delay factor and one or more of the user's 1401 characteristic information. The modal input capture module 1410 communicates with an input device 1402a, for example, a keyboard or a touchpad for the text mode, a microphone for the audio mode, an image recording device for the visual mode, etc., for capturing the modal input in one of the modes from the user 1401 based on the determined delay factor via the interactive interface 1405. The modal input capture module 1410 initiates the capture of the modal input in one of the modes from the user 1401 via the interactive interface 1405 based on one of multiple options selected by the user 1401 on the interactive interface 1405. The options represent, for example, the multimodal communication mappers 1406, the learning components, the testing components, etc.

The control unit 1411 processes and transforms the captured modal input in one of the modes into a modal output in another one or more of the modes using the identified multimodal communication mappers 1406. The interactive interface 1405 renders the modal output in another one or more of the modes to the user 1401 for assisting the user 1401 to learn and/or communicate in the visual communication language in one or more of the modes.

Figure 15:
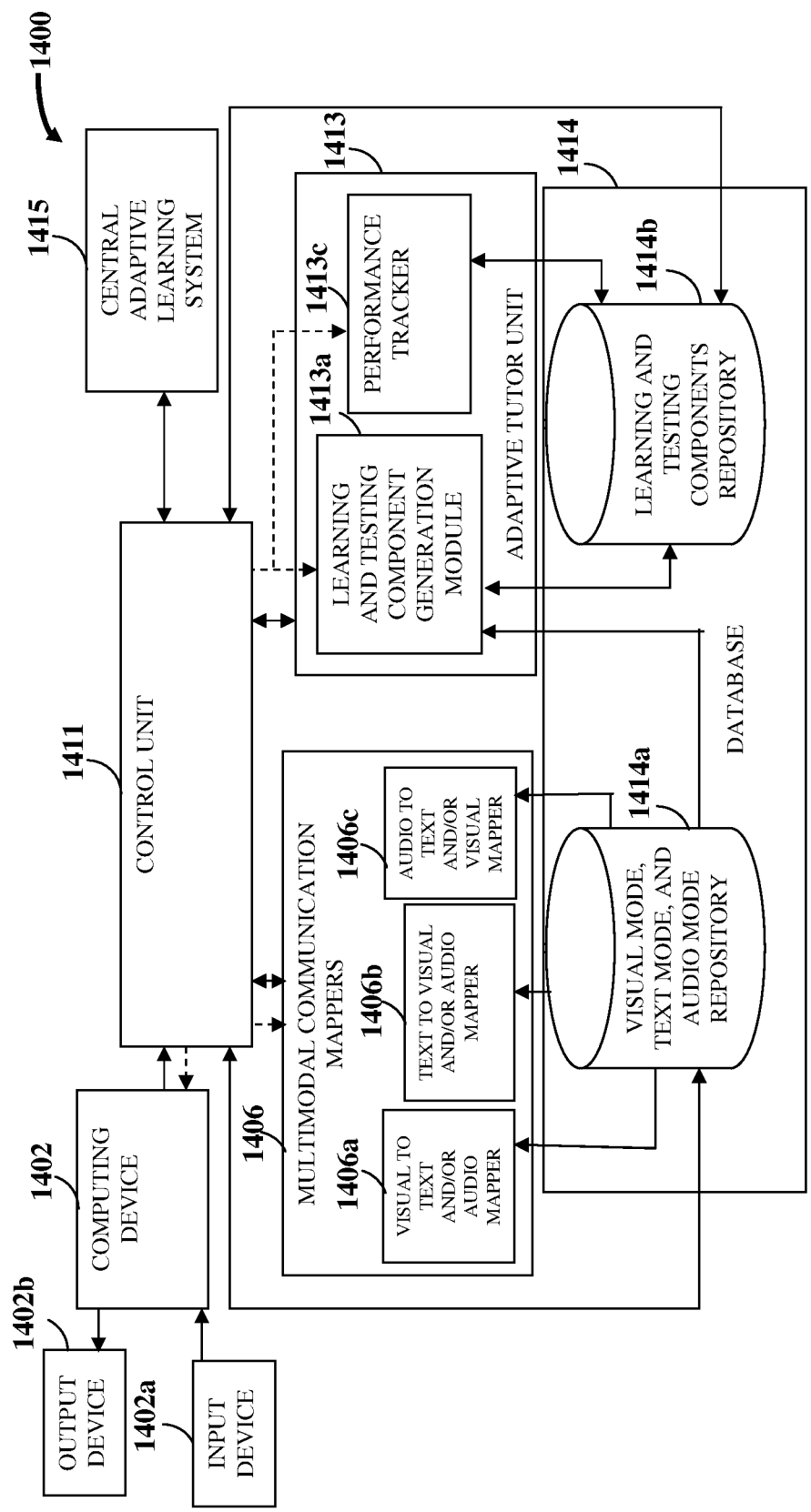
FIG. 15 exemplarily illustrates interaction between components of the computer implemented system for assisting the user to learn and/or communicate in the visual communication language in one or more of multiple modes.

In an embodiment, the control unit 1411, in communication with one of the multimodal communication mappers 1406, for example, the visual to text and/or audio mapper 1406a exemplarily illustrated in FIG. 15, maps a modal input in the visual mode to a modal output in the text mode and/or the audio mode. The control unit 1411 comprises an element extraction module 1411a, a scaling module 1411b, a segmentation module 1411c, a numerical descriptor determination module 1411d, and a mode association module 1411e. The element extraction module 1411a detects and extracts one or more visual elements, for example, hand regions that express a gesture from the captured modal input in the visual mode based on the characteristic information of the user 1401. The scaling module 1411b scales the extracted visual elements to the predetermined scale. The segmentation module 1411c segments each of the scaled visual elements into a predetermined number of blocks. The numerical descriptor determination module 1411d determines a numerical descriptor for each of the scaled visual elements based on number of highlighted visual constituents, for example, highlighted pixels, in each of the predetermined number of the blocks. The mode association module 1411e, in communication with the visual to text and/or audio mapper 1406a, recognizes a gesture from multiple gestures stored in the database 1414 based on the determined numerical descriptor.

The database 1414 stores the mappings of the modal input in one or more of the modes to the modal output in another one or more of the modes, the characteristic information of the user 1401, the determined delay factor for the user 1401, the defined proficiency level of the user 1401, etc. The mode association module 1411e associates the recognized gesture with one or more text elements and/or one or more audio elements stored in the database 1414 to generate the modal output in the text mode and/or the audio mode respectively, that corresponds to the captured modal input in the visual mode. The interactive interface 1405 renders the generated modal output in the text mode and/or the audio mode to the user 1401 for assisting the user 1401 to learn and/or communicate in the visual communication language.

In an embodiment, the mode association module 1411e, in communication with one of the multimodal communication mappers 1406, for example, the text to visual and/or audio mapper 1406b exemplarily illustrated in FIG. 15, associates the generated modal output in the text mode with one or more audio elements stored in the database 1414 to generate the modal output in the audio mode when the user 1401 opts to receive the modal outputs in the text mode and/or the audio mode. The control unit 1411 communicates the modal output in the audio mode to the user 1401 via the interactive interface 1405. The interactive interface 1405 renders the modal output in the text mode and/or the audio mode to the user 1401 for assisting the user 1401 to learn and/or communicate in the visual communication language.

In an embodiment, the control unit 1411, in communication with one of the multimodal communication mappers 1406, for example, the text to visual and/or audio mapper 1406b exemplarily illustrated in FIG. 15, maps a modal input in the text mode to a modal output in the visual mode. The element extraction module 1411a of the control unit 1411 extracts one or more text elements from the captured modal input in the text mode. The mode association module 1411e retrieves one or more modal outputs in the visual mode and/or the audio mode for the extracted text elements from the database 1414. The database 1414 archives the retrieved modal outputs in the visual mode and/or the audio mode. The interactive interface 1405 renders the archived modal outputs in the visual mode and/or the audio mode to the user 1401 for assisting the user 1401 to learn and/or communicate in the visual communication language.

The mapping acquisition module 1412 acquires one or more mappings of a modal input in one or more of the modes to a modal output in another one or more of the modes from the user 1401 via the interactive interface 1405 and stores the mappings in the database 1414. For example, the mapping acquisition module 1412 acquires the mappings of modal inputs in the visual mode to modal outputs in the text mode from the user 1401 and stores the mappings in the database 1414. The mapping acquisition module 1412 therefore allows the user 1401 to provide a user defined dictionary by defining his/her own gestures, which either augments or entirely replaces the working set of gestures stored in the database 1414.

The adaptive tutor unit 1413 comprises a learning and testing component generation module 1413*a*, an evaluation module 1413*b*, and a performance tracker 1413*c*. The learning and testing component generation module 1413*a* adaptively generates learning components and testing components for the user 1401, for example, using one or more of mappings of a modal input in one of the modes to a modal output in another one or more of the modes, the characteristic information of the user 1401, the determined delay factor for the user 1401, the defined proficiency level of the user 1401, predetermined test information, and the previous performance reports stored in the database 1414. The learning and testing component generation module 1413*a* therefore adapts the learning components and the testing components to users 1401 to address their individual needs. The learning and testing component generation module 1413*a* presents the generated learning components or the generated testing components in one or more of the modes to the user 1401 via the interactive interface 1405 based on the determined delay factor. In an embodiment, the learning and testing component generation module 1413*a* presents pre-recorded learning components and testing components to the user 1401 via the interactive interface 1405.

The evaluation module 1413*b* evaluates the modal input in the other one of the modes captured from the user 1401 by the modal input capture module 1410 based on the determined delay factor, based on the mappings of the modal input to the modal output stored in the database 1414. The evaluation module 1413*b* generates a performance report based on the evaluation. The interactive interface 1405 renders the performance report to the user 1401. The performance tracker 1413*c* tracks performance of the user 1401 who engages with the generated learning components and the generated testing components to select the generated learning components and the generated testing components to be presented to the user 1401 via the interactive interface 1405 for assisting the user 1401 to learn and/or communicate in the visual communication language in one or more modes.

The adaptive tutor unit 1413 allows the user 1401 to learn mapping of one of the modes to another one or more of the modes for a subset or an entire set of gestures stored in the database 1414 using the learning components and then presents the user 1401 with testing components to help the user 1401 evaluate his/her proficiency level. Through active learning, the adaptive tutor unit 1413 adapts the learning components to the user 1401 to be more useful in improving the user's 1401 performance.

In an embodiment, the computer implemented system 1400 disclosed herein further comprises a central adaptive learning system 1415 that communicates with the multimodal communication assist application 1404 on the user's 1401 computing device 1402 via the communication network 1403. The adaptive tutor unit 1413 communicates with the central adaptive learning system 1415 via the communication network 1403 for generating the learning components and the testing components. The central adaptive learning system 1415 gathers performance data of multiple users for enhancing the generation of the learning components and the testing components.

FIG. 15 exemplarily illustrates interaction between components of the computer implemented system 1400 for assisting the user 1401 to learn and/or communicate in the visual communication language in one or more of multiple modes. FIG. 15 exemplarily illustrates the interaction between the multimodal communication mappers 1406, the control unit 1411, the adaptive tutor unit 1413, and the database 1414 of the multimodal communication assist application 1404 exemplarily illustrated in FIG. 14. FIG. 15 also exemplarily illustrates the interaction between the control unit 1411 and the central adaptive learning system 1415. The multimodal communication assist application 1404 is provided on the user's 1401 computing device 1402. The multimodal communication assist application 1404 captures a modal input in one or more of the modes based on the determined delay factor via an input device 1402*a*, for example, a camera for the visual mode, a keyboard or a touchpad for the text mode, a microphone for the audio mode, etc. The user 1401 may enter the modal input in the text mode, for example, through a text box displayed on the interactive interface 1405 of the multimodal communication assist application 1404. The input device 1402*a* transmits the modal input in the visual mode, the text mode, and/or the audio mode to the control unit 1411. If the user 1401 inputs, for example, gestures to augment or replace a default vocabulary stored in the database 1414, these gestures and their corresponding text elements and audio elements are stored in a visual mode, text mode, and audio mode repository 1414*a* of the database 1414 through the control unit 1411.

The multimodal communication mappers 1406 comprise, for example, a visual to text and/or audio mapper 1406*a*, a text to visual and/or audio mapper 1406*b*, and an audio to text and/or visual mapper 1406*c*, for mapping a modal input in one or more of the modes to a modal output in another one or more of the modes. For example, the visual to text and/or audio mapper 1406*a* receives the modal input as frames of video pictures captured by the input device 1402*a*, for example, the camera from the control unit 1411. The control unit 1411, in communication with the visual to text and/or audio mapper 1406*a*, processes the modal input in the visual mode into a modal output in the text mode and/or the audio mode corresponding to the modal input in the visual mode. The mapping of the modal input in the visual mode to the modal output in the text mode and/or the audio mode corresponding to the modal input in the visual mode is rendered to the user 1401 on the interactive interface 1405 via an output device 1402*b*, for example, a monitor screen of the user's 1401 computing device 1402.

The data flow from the input device 1402*a* to the visual to text and/or audio mapper 1406*a*, and from the visual to text and/or audio mapper 1406*a* to the output device 1402*b* are routed through the control unit 1411. Since the modal input and the modal output are moderated based on the user's 1401 delay factor and hence proficiency level, the additional demand of an input-output buffer on the peripheral devices is not placed. The visual to text and/or audio mapper 1406*a* also accesses the visual mode, text mode, and audio mode repository 1414*a* that stores vocabulary in multiple modes and formats. In an embodiment, the visual to text and/or audio mapper 1406*a* directly accesses the visual mode, text mode, and audio mode repository 1414*a* bypassing the control unit 1411.

The text to visual and/or audio mapper 1406*b* receives the modal input in the text mode from the input device 1402*a*, for example, a keyboard, a touchpad, etc., via the control unit 1411 and retrieves the corresponding modal outputs in the visual mode and/or the audio mode from the visual mode, text mode, and audio mode repository 1414a. The text to visual and/or audio mapper 1406b presents the modal output in the visual mode, for example, the gestures as a sequence of images or an animated video, and the modal output in the audio mode, for example, as sound cues, to the user 1401 via the interactive interface 1405. The data flow from the input device 1402a to the text to visual and/or audio mapper 1406b, and from the text to visual and/or audio mapper 1406b to the output device 1402b are routed through the control unit 1411. The control unit 1411 may store some of the modal output in the visual mode, for example, the images of gestures in a buffer to ensure that the modal output is presented to the user 1401 at a pace that is comfortable to the user 1401 based on the delay factor of the user 1401. The text to visual and/or audio mapper 1406b also accesses the visual mode, text mode, and audio mode repository 1414a comprising vocabulary in multiple modes and formats without the intervention of the control unit 1411.

The audio to text and/or visual mapper 1406c maps a modal input in an audio mode to a modal output in the text mode and/or the visual mode. The audio to text and/or visual mapper 1406c receives the modal input in the audio mode, for example, voice messages, from the input device 1402a, for example, a microphone, via the control unit 1411 and retrieves the corresponding modal outputs in the text mode and/or the visual mode from the visual mode, text mode, and audio mode repository 1414a. The audio to text and/or visual mapper 1406c presents the modal output in the visual mode, for example, the gestures as a sequence of images or an animated video, and the modal output in the text mode, for example, as a list of words to the user 1401, via the interactive interface 1405. The data flow from the input device 1402a to the audio to text and/or visual mapper 1406c, and from the audio to text and/or visual mapper 1406c to the output device 1402b are routed through the control unit 1411. The control unit 1411 stores some of the modal output in the visual mode, for example, the images of gestures in a buffer to ensure that the modal output is presented to the user 1401 at a pace that is comfortable to the user 1401 based on the delay factor of the user 1401. The audio to text and/or visual mapper 1406c also accesses the visual mode, text mode, and audio mode repository 1414a comprising vocabulary in multiple modes and formats without the intervention of the control unit 1411.

The multimodal communication mappers 1406 map the modal input in one of the modes to the modal output in another one or more of the modes. The multimodal communication assist application 1404 stores the mappings of the modal input in one of the modes to the modal output in another one or more of the modes, the characteristic information of the user 1401, the delay factor of the user 1401, and the determined proficiency level for the user 1401 in the database 1414. The multimodal communication assist application 1404 organizes the database 1414 in an efficient and easily retrievable manner for processing and transforming the modal input in one of the modes to the modal output in another one or more of the modes. The multimodal communication assist application 1404 classifies the mappings in the database 1414 based on the characteristic information of the user 1401.

The database 1414 comprises the visual mode, text mode, and audio mode repository 1414a and a learning and testing components repository 1414b. The visual mode, text mode, and audio mode repository 1414a is a data store of the multimodal communication assist application 1404 and contains the vocabulary of the visual communication language in multiple modes and formats. The visual mode, text mode, and audio mode repository 1414a organizes the data for easy retrieval and processing. The visual mode, text mode, and audio mode repository 1414a also contains representative features of the vocabulary that facilitate classification, if the user 1401 opts to augment the vocabulary with words or groups of words of their own. The learning and testing components repository 1414b stores learning components and testing components generated by the learning and testing component generation module 1413a of the adaptive tutor unit 1413.

The control unit 1411 processes and transforms the captured modal input in one of the modes into the modal output in another one or more of the modes using the multimodal communication mappers 1406 selected by the user 1401. The control unit 1411 is implemented on the user's 1401 computing device 1402 or on the input device 1402a, for example, the camera, and contains an operating system. The operating system of the control unit 1411 comprises device drivers that interact with the input device 1402a and the output device 1402b of the user's 1401 computing device 1402 for capturing the modal input from the user 1401 and rendering the modal output to the user 1401 via the interactive interface 1405 respectively. The control unit 1411 accepts a modal input in one or more modes from the input device 1402a, processes, and relays the modal output in another one or more of the modes to the output device 1402b.

The control unit 1411 controls the flow of data and processing between the multimodal communication mappers 1406, the adaptive tutor unit 1413, and optionally the central adaptive learning system 1415 via the communication network 1403, for example, the internet. The control unit 1411 includes only one thread of processing at any given time, and controls the data flow, switching between working modes, and the transfer of data between, for example, the input device 1402a to the visual mode, text mode, and audio mode repository 1414a or between the central adaptive learning system 1415 to the learning and testing components repository 1414b of the database 1414. The control unit 1411 comprises a buffer that ensures that the modal output is streamed to the output device 1402b at an optimal speed. The control unit 1411 forms a link between the modules, for example, 1406, 1413, etc., of the multimodal communication assist application 1404 which must cooperate but do not directly communicate with each other.

In an embodiment, the multimodal communication assist application 1404 implements multithreaded processing that allows updating, for example, the learning and testing components repository 1414b of the database 1414 in the background while processing and transformation of the modal input in one or more of the modes into the modal output in another one or more of the modes is being performed in the foreground. For example, the learning and testing component generation module 1413a generates learning components and testing components in the background, while the control unit 1411 in communication with the multimodal communication mappers 1406 processes and transforms the modal input in one or more of the modes into a modal output in another one or more of the modes in the foreground. In another example, the multithreaded processing allows the input device 1402a to write modal inputs in one or more modes and their corresponding modal outputs in another one or more of the modes directly into the visual mode, text mode, and audio mode repository 1414a instead of writing the modal inputs and their corresponding modal outputs into the visual mode, text mode, and audio mode repository 1414a via the control unit 1411.

The output device 1402b of the user's 1401 computing device 1402 renders the modal output in another one or more of the modes to the user 1401 via the interactive interface 1405 for assisting the user 1401 to learn and/or communicate in the visual communication language in one or more modes. The output device 1402b, for example, a monitor of the user's 1401 computing device 1402 renders the modal output, for example, in the text mode and the visual mode. The output device 1402b, for example, a speaker, communicates the modal output in the audio mode to the user 1401. The control unit 1411 provides the modal outputs in one or more modes for display on the output device 1402b via the interactive interface 1405.

The adaptive tutor unit 1413 comprises the learning and testing component generation module 1413a and a performance tracker 1413c. The learning and testing component generation module 1413a generates the learning components and the testing components for the user 1401 using the mappings of the modal input in one of the modes to the modal output in another one or more of the modes, the characteristic information of the user 1401, the determined delay factor for the user 1401, and the defined proficiency level of the user 1401 stored in the visual mode, text mode, audio mode repository 1414a, and predetermined test information and previous performance reports stored in the learning and testing components repository 1414b.

The multimodal communication mappers 1406 manage training of the multimodal communication assist application 1404 by the adaptive tutor unit 1413. The multimodal communication mappers 1406 contain algorithmic machinery necessary to update the visual mode, text mode, and audio mode repository 1414a. The control unit 1411 triggers training of the multimodal communication assist application 1404. During training, the multimodal communication mappers 1406 are dedicated entirely to updating the visual mode, text mode, and audio mode repository 1414a. For example, the visual to text and/or audio mapper 1406a does not accept gestures from the user 1401 to convert to a modal output in the text mode and/or the audio mode until the training is completed. The control unit 1411 prevents the visual to text and/or audio mapper 1406a, the text to visual and/or audio mapper 1406b, and the audio to text and/or visual mapper 1406c from accessing the visual mode, text mode, and audio mode repository 1414a until the training is completed, to curtail problems arising from simultaneous read, write operations.

Based on the user's 1401 proficiency level as well as their performance track records, the learning and testing component generation module 1413a strings together the cues and the order of presentation of the cues to the user 1401 to assist the user 1401 in learning and/or communicating in the visual communication language in one or more modes and to evaluate the user's 1401 performance. The learning and testing component generation module 1413a accesses the learning and testing components repository 1414b for selecting, expanding, and stringing together data in an encoded form for generating the learning components and the testing components. The learning and testing component generation module 1413a also accesses the visual mode, text mode, and audio mode repository 1414a, for example, using a read operation without the intervention of the control unit 1411.

To adapt to the user's 1401 specific needs, the learning and testing component generation module 1413a also exchanges data with the performance tracker 1413c. In an embodiment, the communication between the learning and testing component generation module 1413a and the performance tracker 1413c as well as access to the learning and testing components repository 1414b are not routed through the control unit 1411. However, the control unit 1411 routes the generated learning components and the generated testing components to the user 1401 and routes the responses to the generated learning components and the generated testing components from the user 1401 to the learning and testing component generation module 1413a and the performance tracker 1413c.

The performance tracker 1413c correlates the generated learning components and the generated testing components presented to the user 1401 and generates analytics. These analytics help the user 1401 trace a learning curve and understand, for example, what gestures are challenging for them. If the user 1401 chooses to connect the multimodal communication assist application 1404 on the user's 1401 computing device 1402 to the central adaptive learning system 1415 via the communication network 1403, then an individual user's 1401 performance is also linked with other users' 1401 performances and the user 1401 can determine the time taken by different users at various phases, understand the gestures that are easiest to master and those that are more challenging, etc. If the user 1401 chooses not to connect the multimodal communication assist application 1404 to the central adaptive learning system 1415, the performance tracker 1413c of the multimodal communication assist application 1404 collates and presents performances of the users who operate the user's 1401 computing device 1402 to the user 1401. In these analytics, the multimodal communication assist application 1404 maintains anonymity of the other users and reflects only their performance and proficiency levels to allow the user 1401 to gain insight to the learning process. Data and control is shared between the learning and testing component generation module 1413a and the performance tracker 1413c in real time to allow the user 1401 to see their performance in real time. The performance tracker 1413c accesses the learning and testing components repository 1414b to read data directly. The performance tracker 1413c can write into the learning and testing components repository 1414b through the control unit 1411.

The learning and testing components repository 1414b contains a sequence of generated learning components and the generated testing components presented to each user 1401 as well as such data of other anonymous users to facilitate processing by the adaptive tutor unit 1413. The learning and testing components repository 1414b stores the data in shorthand notation that is expanded to a set of cues by the learning and testing component generation module 1413a to minimize storage space required in the database 1414. The learning and testing component generation module 1413a and the performance tracker 1413c access the learning and testing components repository 1414b directly for both read and write operations. The learning and testing components repository 1414b is also updated with data from other users through the control unit 1411, if the users of the multimodal communication assist application 1404 wish to connect to the central adaptive learning system 1415.

In an embodiment, since the adaptivity of the multimodal communication assist application 1404 depends on mining of a large variety and number of learning components and testing components, the user 1401 can connect to the central adaptive learning system 1415 via the communication network 1403. In this embodiment, the multimodal communication assist application 1404 running locally on the user's 1401 computing device 1402 communicates the gathered data to the central adaptive learning system 1415 anonymously without sending any personal details of the user 1401. The multimodal communication assist application 1404 running locally on the user's 1401 computing device 1402 can also update its adaptive tutor unit 1413 and download data gathered from other users via the central adaptive learning system

1415. The central adaptive learning system 1415 is, for example, provided for standard gestures and not for the user defined vocabulary, since each user 1401 may have a different working vocabulary. If the user 1401 chooses not to connect to the central adaptive learning system 1415, the multimodal communication assist application 1404 still executes; however the adaptive tutor unit 1413 of the multimodal communication assist application 1404 will not have the benefit of learning from a large spectrum of learning components and testing components gathered from the central adaptive learning system 1415.

The multimodal communication assist application 1404 running locally on the user's 1401 computing device 1402 communicates with the central adaptive learning system 1415 for transferring data, for example, usage patterns without transmitting any identification information of the user 1401 from the multimodal communication assist application 1404 to the central adaptive learning system 1415 and vice versa. The adaptive tutor unit 1413 communicates with the central adaptive learning system 1415 via the communication network 1403 for generating and updating learning components and testing components for the user 1401. The adaptive tutor unit 1413 updates and downloads test information gathered from multiple users the world over using the central adaptive learning system 1415. In another embodiment, the adaptive tutor unit 1413 exchanges predetermined test information stored in the database 1414 with test information of the central adaptive learning system 1415.

Figure 16:
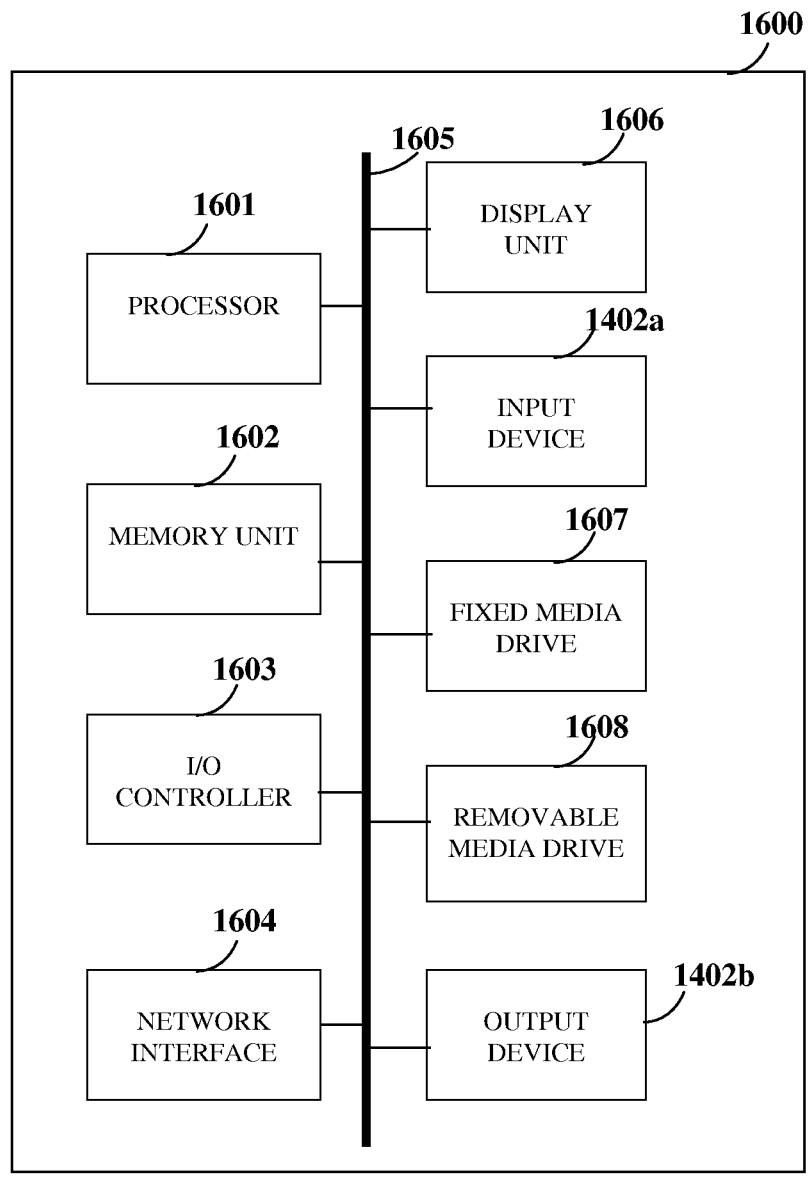
FIG. 16 exemplarily illustrates the architecture of a computer system employed by the multimodal communication assist application for assisting the user to learn and/or communicate in the visual communication language in one or more of multiple modes.

FIG. 16 exemplarily illustrates the architecture of a computer system 1600 employed by the multimodal communication assist application 1404 exemplarily illustrated in FIG. 14, for assisting the user 1401 to learn and/or communicate in the visual communication language in one or more of multiple modes. The computer system 1600 comprises, for example, a processor 1601, a memory unit 1602 for storing programs and data, an input/output (I/O) controller 1603, a network interface 1604, a data bus 1605, a display unit 1606, an input device 1402a, a fixed media drive 1607, a removable media drive 1608 for receiving removable media, an output device 1402b, for example, a monitor screen, etc.

The processor 1601 is an electronic circuit that can execute computer programs. The memory unit 1602 is used for storing programs, applications, and data. For example, the multimodal communication assist application 1404 is stored in the memory unit 1602 of the computer system 1600. The memory unit 1602 is, for example, a random access memory (RAM) or another type of dynamic storage device that stores information and instructions for execution by the processor 1601. The memory unit 1602 also stores temporary variables and other intermediate information used during execution of the instructions by the processor 1601. The computer system 1600 further comprises a read only memory (ROM) or another type of static storage device that stores static information and instructions for the processor 1601.

The network interface 1604 enables connection of the computer system 1600 to the communication network 1403. The communication network 1403 is, for example, the internet, a local area network (LAN), a wide area network, a mobile communication network, etc. The computer system 1600 employed by the multimodal communication assist application 1404 communicates with the central adaptive learning system 1415 through the network interface 1604. The network interface 1604 comprises, for example, an infrared (IR) interface, an interface that implements Wi-Fi™ of the Wireless Ethernet Compatibility Alliance, Inc., a universal serial bus (USB) interface, a local area network (LAN) interface, a wide area network (WAN) interface, etc. The I/O controller 1603 controls the input and output actions performed by the user 1401, for example, while providing modal inputs in one or more modes or receiving the modal outputs in another one or more of the modes. The data bus 1605 permits communication between the modules, for example, 1405, 1406, 1407, 1408, 1409, 1410, 1411, 1412, 1413, and 1414 of the multimodal communication assist application 1404.

The display unit 1606 displays, via the interactive interface 1405, the operations computed by the multimodal communication assist application 1404 to the user 1401. The input device 1402a is used for inputting data into the computer system 1600. The input device 1402a is, for example, a keyboard such as an alphanumeric keyboard, a joystick, a mouse, a touch pad, a light pen, a camera, a microphone, etc., utilized by the user 1401 for providing modal inputs in one or more modes. The output device 1402b outputs the results of the actions performed by the multimodal communication assist application 1404. For example, the output device 1402b, for example, a monitor screen of the user's 1401 computing device 1402 renders the modal output in one or more modes after processing and transformation of the modal input in one or more modes.

Computer applications and programs are used for operating the computer system 1600. The programs are loaded onto the fixed media drive 1607 and into the memory unit 1602 of the computer system 1600 via the removable media drive 1608. Computer applications and programs are executed by double clicking a related icon associated with the multimodal communication assist application 1404 displayed on the display unit 1606 using the input device 1402a.

The computer system 1600 employs an operating system for performing multiple tasks. The operating system is responsible for management and coordination of activities and sharing of resources of the computer system 1600. The operating system further manages security of the computer system 1600, peripheral devices connected to the computer system 1600, and network connections. The operating system recognizes keyboard inputs and other input device inputs of the user 1401, output display, files, and directories stored locally on the fixed media drive 1607, for example, a hard drive. The processor 1601 retrieves the instructions for executing the modules, for example, 1405, 1406, 1407, 1408, 1409, 1410, 1411, 1412, 1413, and 1414 of the multimodal communication assist application 1404 from the memory unit 1602 in the form of signals. A program counter determines the location of the instructions in the memory unit 1602. The program counter stores a number that identifies the current position in the program of the modules, for example, 1405, 1406, 1407, 1408, 1409, 1410, 1411, 1412, 1413, and 1414 of the multimodal communication assist application 1404.

The instructions fetched by the processor 1601 from the memory unit 1602 after being processed are decoded. The instructions are placed in an instruction register in the processor 1601. After processing and decoding, the processor 1601 executes the instructions. For example, the multimodal communication mappers 1406 define instructions for mapping a modal input in one of the modes to a modal output in another one or more of the modes. The mapper identification module 1407 defines instructions for identifying the multimodal communication mappers 1406 selected by the user 1401 via the interactive interface 1405. The characteristic information determination module 1408 defines instructions for determining the characteristic information of the user 1401 based on the multimodal communication mappers 1406 selected by the user 1401. The delay factor determination module 1409 defines instructions for determining the delay factor for the user 1401 based on the determined characteristic information, which defines the proficiency level of the user 1401. The modal input capture module 1410 defines instructions for capturing the modal input in one of the modes from the user 1401 via the interactive interface 1405 based on the determined delay factor and one or more of the characteristic information, for example, the response time. The modal input capture module 1410 defines instructions for initiating the capture of the modal input in one of the modes from the user 1401 via the interactive interface 1405 based on one of multiple options selected by the user 1401 on the interactive interface 1405, where the options represent, for example, the multimodal communication mappers 1406, the learning components, the testing components, etc. The control unit 1411 defines instructions for processing and transforming the captured modal input in one of the modes into a modal output in another one or more of the modes using the selected multimodal communication mappers 1406, and rendering the modal output in the other one or more of the modes to the user 1401 via the interactive interface 1405 for assisting the user 1401 to learn and/or communicate in the visual communication language in one or more of the modes.

For determining the delay factor for the user 1401, the modal input capture module 1410 defines instructions for capturing a modal input in the visual mode from the user 1401 via the interactive interface 1405 at a predefined sampling rate, where the modal input is a simulation of visual elements corresponding to one or more text elements presented to the user 1401 via the interactive interface 1405. The mode association module 1411e of the control unit 1411 defines instructions for matching the captured modal input in the visual mode with multiple modal outputs in the visual mode stored in the database 1414. The delay factor determination module 1409 defines instructions for determining a response time of the user 1401 for each of the presented text elements during the capture of the matched modal input and for utilizing the response time to determine the delay factor for the user 1401. The delay factor determination module 1409 also defines instructions for defining a proficiency level for the user 1401 based on the determined delay factor as disclosed in the detailed description of FIGS. 2A-2D.

The element extraction module 1411a of the control unit 1411 defines instructions for detecting and extracting one or more visual elements, text elements, or audio elements from the captured modal input based on the characteristic information of the user 1401 and the modal input. The mode association module 1411e of the control unit 1411 defines instructions for retrieving the modal outputs for the extracted elements from the database 1414 based on the selected multimodal communication mappers 1406. The database 1414 defines instructions for archiving the retrieved modal outputs in the visual mode, the text mode, and/or the audio mode, and rendering the archived modal outputs to the user 1401 via the interactive interface 1405.

For transforming a modal input in the text mode to a modal output in the visual mode and/or the audio mode, the element extraction module 1411a of the control unit 1411 defines instructions for extracting one or more text elements from the captured modal input in the text mode. The mode association module 1411e defines instructions for retrieving one or more modal outputs in the visual mode and/or the audio mode for the extracted text elements from the database 1414. The database 1414 defines instructions for archiving the retrieved modal outputs in the visual mode and/or the audio mode.

For transforming a modal input in the visual mode to a modal output in the text mode and/or the audio mode, the element extraction module 1411a of the control unit 1411 defines instructions for detecting and extracting one or more visual elements, for example, hand regions that express a gesture from the captured modal input in the visual mode based on the characteristic information of the user 1401. The scaling module 1411b of the control unit 1411 defines instructions for scaling the extracted visual elements to the predetermined scale. The segmentation module 1411c of the control unit 1411 defines instructions for segmenting each of the scaled visual elements into a predetermined number of blocks. The numerical descriptor determination module 1411d of the control unit 1411 defines instructions for determining a numerical descriptor for each of the scaled visual elements based on number of highlighted visual constituents in each of the predetermined number of blocks. The mode association module 1411e, in communication with the multimodal communication mappers 1406, defines instructions for recognizing a gesture from multiple gestures stored in the database 1414 based on the determined numerical descriptor. The mode association module 1411e also defines instructions for associating the recognized gesture with one or more text elements and/or one or more audio elements stored in the database 1414 to generate the modal output in the text mode and/or the audio mode respectively, that corresponds to the captured modal input in the visual mode. The mode association module 1411e, in communication with the multimodal communication mappers 1406, also defines instructions for associating the generated modal output in the text mode with one or more audio elements stored in the database 1414 to generate the modal output in the audio mode when the user 1401 opts to receive the modal outputs in the text mode and audio mode.

The learning and testing component generation module 1413a of the adaptive tutor unit 1413 defines instructions for generating learning components and testing components for the user 1401 using the mappings of the modal input in one of the modes to the modal output in another one or more of the modes, the characteristic information of the user 1401, the determined delay factor for the user 1401, the defined proficiency level of the user 1401, predetermined test information, and previous performance reports stored in the database 1414. The learning and testing component generation module 1413a also defines instructions for presenting the generated learning components or the generated testing components in one or more of the modes to the user 1401 via the interactive interface 1405 based on the determined delay factor. The evaluation module 1413b of the adaptive tutor unit 1413 defines instructions for evaluating the modal input in another one of the modes captured from the user 1401 based on the mappings of the modal input to the modal output stored in the database 1414. The evaluation module 1413b also defines instructions for generating a performance report based on the evaluation and rendering the performance report to the user 1401 via the interactive interface 1405.

The performance tracker 1413c of the adaptive tutor unit 1413 defines instructions for correlating the generated learning components and the generated testing components presented to the user 1401 and for generating analytics. The performance tracker 1413c defines instructions for tracking performance of the user 1401 who engages with the generated learning components and the generated testing components to select the generated learning components and the generated testing components to be presented to the user 1401 via the interactive interface 1405 for assisting the user 1401 to learn and/or communicate in the visual communication language in one or more modes. The adaptive tutor unit 1413 defines instructions for communicating with the central adaptive learning system 1415 via the communication network 1403 for generating the learning components and the testing components using performance data of multiple users.

The mapping acquisition module 1412 defines instructions for acquiring one or more mappings of a modal input in one or more of the modes to a modal output in another one or more of the modes from the user 1401 via the interactive interface 1405 and storing the acquired mappings in the database 1414. The database 1414 defines instructions for storing the mappings of the modal input in one of the modes to the modal output in another one or more of the modes, the characteristic information of the user 1401, the delay factor for the user 1401, and the defined proficiency level of the user 1401.

The processor 1601 of the multimodal communication assist application 1404 retrieves the instructions defined by the multimodal communication mappers 1406, the mapper identification module 1407, the characteristic information determination module 1408, the delay factor determination module 1409, the modal input capture module 1410, the modules of 1411a, 1411b, 1411c, 1411d, and 1411e of the control unit 1411, the mapping acquisition module 1412, the modules 1413a, 1413b, and 1413c of the adaptive tutor unit 1413, and the database 1414 and executes the instructions.

At the time of execution, the instructions stored in the instruction register are examined to determine the operations to be performed. The processor 1601 then performs the specified operations. The operations include arithmetic operations and logic operations. The operating system performs multiple routines for performing a number of tasks required to assign the input device 1402a, the output device 1402b, and memory for execution of the modules, for example, 1405, 1406, 1407, 1408, 1409, 1410, 1411, 1412, 1413, 1414, etc., of the multimodal communication assist application 1404. The tasks performed by the operating system comprise assigning memory to the modules, for example, 1405, 1406, 1407, 1408, 1409, 1410, 1411, 1412, 1413, 1414, etc., of the multimodal communication assist application 1404, moving data between the memory unit 1602 and disk units and handling input/output operations. The operating system performs the tasks on request by the operations and after performing the tasks, the operating system transfers the execution control back to the processor 1601. The processor 1601 continues the execution to obtain one or more outputs. The outputs of the execution of the modules, for example, 1405, 1406, 1407, 1408, 1409, 1410, 1411, 1412, 1413, 1414, etc., of the multimodal communication assist application 1404 are rendered to the user 1401 via the interactive interface 1405.

Disclosed herein is also a computer program product comprising computer executable instructions embodied in a non-transitory computer readable storage medium. As used herein, the term "non-transitory computer readable storage medium" refers to all computer readable media, for example, non-volatile media such as optical disks or magnetic disks, volatile media such as a register memory, processor cache, etc., and transmission media such as wires that constitute a system bus coupled to the processor 1601, except for a transitory, propagating signal.

The computer program product disclosed herein comprises multiple computer program codes for assisting the user 1401 to learn and/or communicate in the visual communication language in one or more of multiple modes. For example, the computer program product disclosed herein comprises a first computer program code for providing a multimodal communication assist application 1404 on the user's 1401 computing device 1402; a second computer program code for providing multiple multimodal communication mappers 1406 to the user 1401 by the multimodal communication assist application 1404 via the interactive interface 1405; a third computer program code for determining characteristic information of the user 1401 by the multimodal communication assist application 1404 based on one or more of the multimodal communication mappers 1406 selected by the user 1401 via the interactive interface 1405; a fourth computer program code for determining a delay factor for the user 1401 based on the determined characteristic information by the multimodal communication assist application 1404; a fifth computer program code for capturing the modal input in one of the modes from the user 1401 via the interactive interface 1405 based on the determined delay factor and one or more of the characteristic information by the multimodal communication assist application 1404; and a sixth computer program code for processing and transforming the captured modal input in one of the modes into the modal output in another one or more of the modes using the selected multimodal communication mappers 1406 by the multimodal communication assist application 1404.

The computer program product disclosed herein further comprises a seventh computer program code for detecting and extracting one or more visual elements from the captured modal input in the visual mode based on the characteristic information of the user 1401; an eighth computer program code for scaling the extracted visual elements to a predetermined scale; a ninth computer program code for segmenting each of the scaled visual elements into a predetermined number of blocks; a tenth computer program code for determining a numerical descriptor for each of the scaled visual elements based on number of highlighted visual constituents in each of the predetermined number of blocks; an eleventh computer program code for recognizing a gesture from multiple gestures stored in the database 1414 based on the determined numerical descriptor; and a twelfth computer program code for associating the recognized gesture with one or more text elements and/or one or more audio elements stored in the database 1414 to generate the modal output in the text mode and/or the audio mode respectively, that corresponds to the captured modal input in the visual mode, where the generated modal output in the text mode and/or the audio mode is rendered to the user 1401 via the interactive interface 1405 for assisting the user 1401 to learn and/or communicate in the visual communication language.

The computer program product disclosed herein further comprises a thirteenth computer program code for generating learning components and testing components for the user 1401, for example, using one or more of the mappings of the modal input in one of the modes into the modal output in another one or more of the modes, the characteristic information of the user 1401, the determined delay factor for the user 1401, the defined proficiency level of the user 1401, predetermined test information, and previous performance reports stored in the database 1414. The computer program product disclosed herein further comprises additional computer program codes for performing additional steps that may be required and contemplated for assisting the user 1401 to learn and/or communicate in the visual communication language in one or more of multiple modes.

The computer program codes comprising the computer executable instructions are embodied on the non-transitory computer readable storage medium. The processor 1601 of the computer system 1600 retrieves these computer executable instructions and executes them. When the computer executable instructions are executed by the processor 1601, the computer executable instructions cause the processor 1601 to perform the method steps for assisting the user 1401 to learn and/or communicate in the visual communication language in one or more of multiple modes. In an embodiment, a single piece of computer program code comprising computer executable instructions performs one or more steps of the computer implemented method disclosed herein for assisting the user 1401 to learn and/or communicate in the visual communication language in one or more of multiple modes.

For purposes of illustration, the detailed description refers to the multimodal communication assist application 1404 being run locally on a computer system 1600; however the scope of the computer implemented method and system 1400 disclosed herein is not limited to the multimodal communication assist application 1404 being run locally on the computer system 1600 via the operating system and the processor 1601, but may be extended to run remotely over the communication network 1403, for example, by employing a web browser and a remote server, a mobile phone, or other electronic devices.

FIG. 17 exemplarily illustrates a screenshot of an interactive interface 1405 provided by the multimodal communication assist application 1404 exemplarily illustrated in FIG. 14, for enabling a user 1401 to create an account for logging in to the multimodal communication assist application 1404. The interactive interface 1405 provides an account creation screen 1405a for enabling the user 1401 to create an account for logging in to the multimodal communication assist application 1404. The account creation screen 1405a presents the user 1401 with input boxes 1701 for entering, for example, an electronic mail (email) address, a username, a password, a secret question, and an answer to the secret question. The multimodal communication assist application 1404 compares the password with the confirmed password for validation. The multimodal communication assist application 1404 stores the username, the password, the secret question, and the answer to the secret question in the database 1414. On clicking a submit button 1702 on the account creation screen 1405a, the multimodal communication assist application 1404 creates the account for the user 1401. The account creation screen 1405a also presents the user 1401 with an option to cancel 1703 the creation of the account.

FIG. 18 exemplarily illustrates a screenshot of the interactive interface 1405 provided by the multimodal communication assist application 1404 for enabling a user 1401 to log in to the multimodal communication assist application 1404. The interactive interface 1405 provides a login screen 1405b for enabling the user 1401 to log in to the multimodal communication assist application 1404. The login screen 1405b presents the user 1401 with input boxes 1801 for entering the username and the password. On clicking a login button 1802, the multimodal communication assist application 1404 authenticates the user 1401. The login screen 1405b presents the user 1401 with options to retrieve a password 1803 of the user 1401 stored in the database 1414, to create an account 1804, to access the multimodal communication assist application 1404 without logging in 1805, and to exit 1806 from the multimodal communication assist application 1404.

Figure 19A:
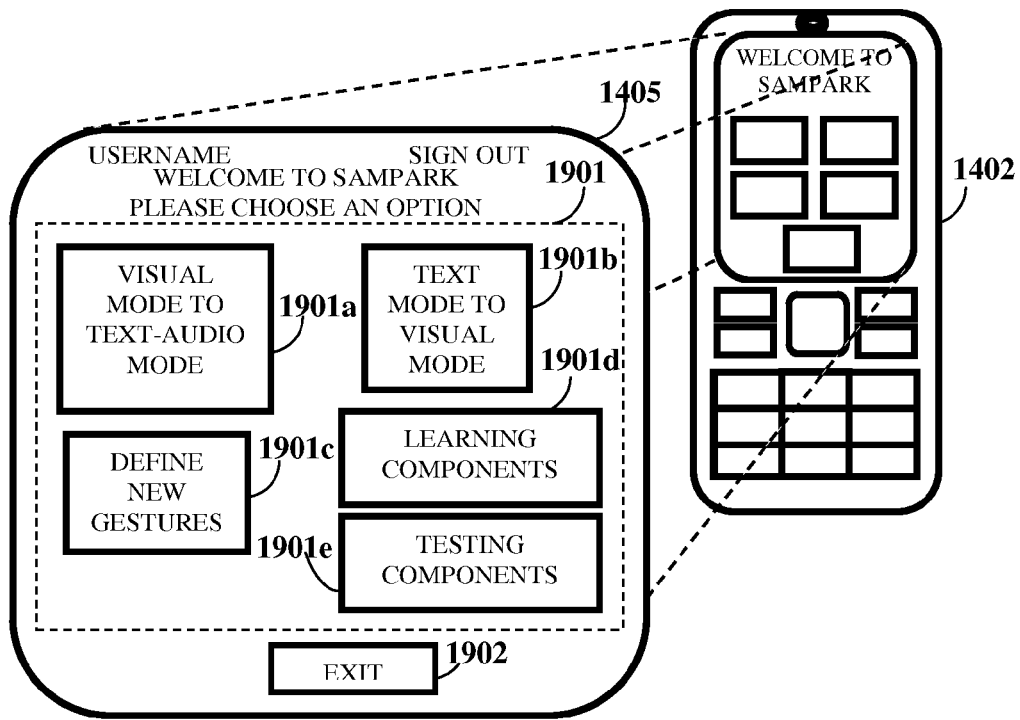
FIGS. 19A-19B exemplarily illustrate screenshots of the interactive interface provided by the multimodal communication assist application for enabling a user to select one of the multimodal communication mappers, the learning components, or the testing components displayed by the multimodal communication assist application for learning and/or communicating in the visual communication language in one or more of multiple modes.
Figure 19B:
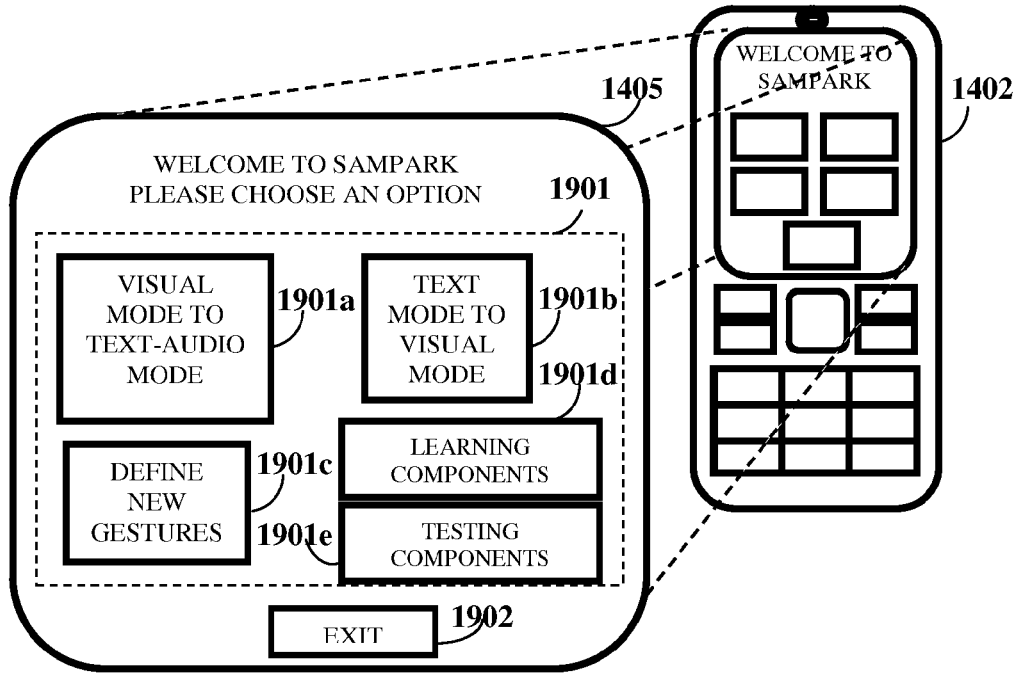

FIGS. 19A-19B exemplarily illustrate screenshots of the interactive interface 1405 provided by the multimodal communication assist application 1404 exemplarily illustrated in FIG. 14, for enabling a user 1401 to select one of the multimodal communication mappers 1406, the learning components, or the testing components displayed by the multimodal communication assist application 1404 for learning and/or communicating in the visual communication language in one or more of multiple modes. The interactive interface 1405 displays a representation 1901 of the multimodal communication mappers 1406 exemplarily illustrated in FIG. 15, comprising, for example, a visual mode to text mode and audio mode mapper 1901a, a text mode to visual mode mapper 1901b, an option to define new gestures 1901c in the visual mode, learning components 1901d, and testing components 1901e to the registered user 1401 for selection. The interactive interface 1405 also displays an option for a registered user 1401 to sign out from the multimodal communication assist application 1404 on the user's 1401 computing device 1402 as exemplarily illustrated in FIG. 19A, and to exit 1902 from the multimodal communication assist application 1404. In the case of an unregistered user 1401, the interactive interface 1405 only displays options for the unregistered user 1401 to exit 1902 from the multimodal communication assist application 1404 as exemplarily illustrated in FIG. 19B.

Figure 20:
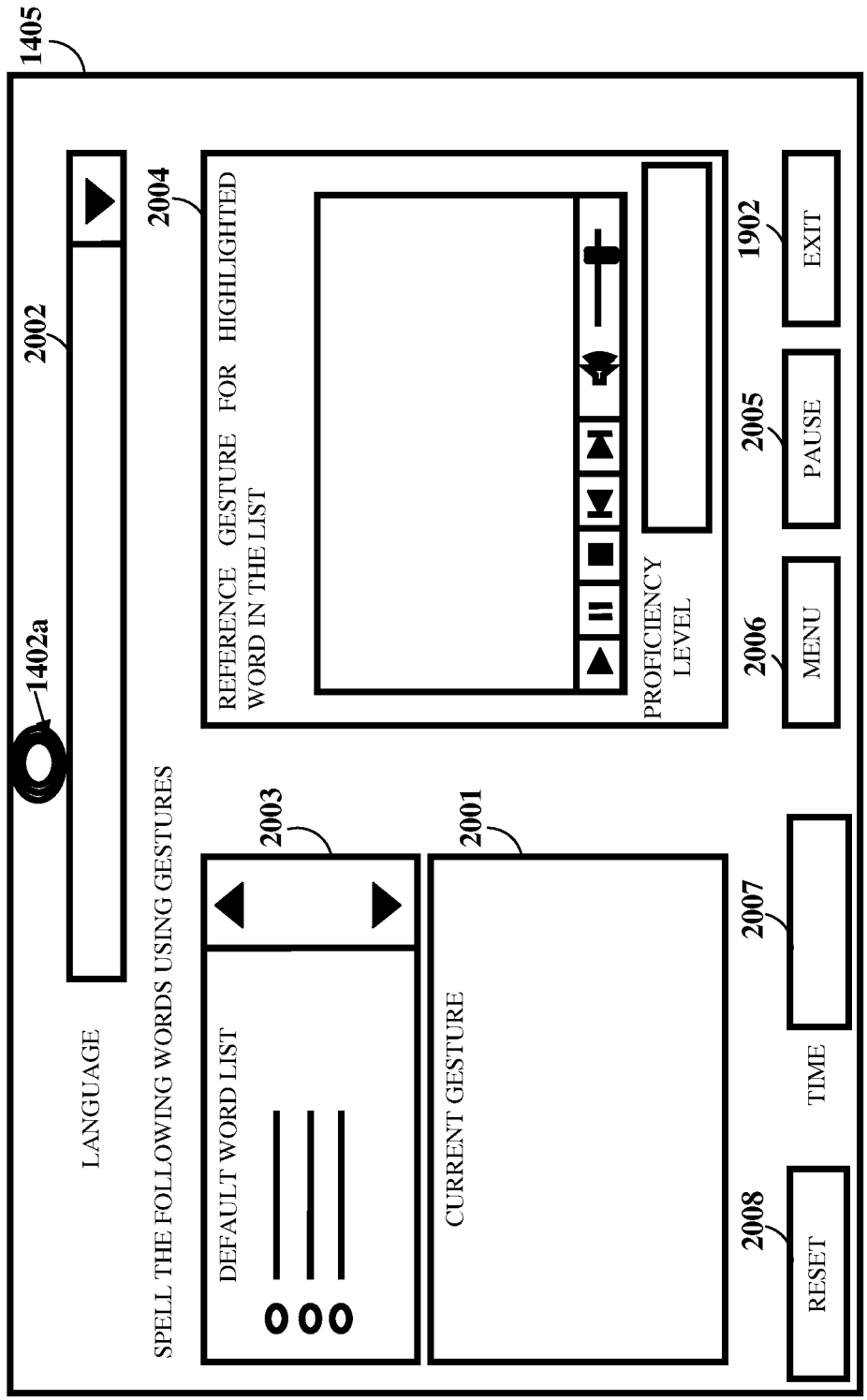
FIG. 20 exemplarily illustrates a screenshot of the interactive interface provided by the multimodal communication assist application for determining a delay factor that defines a proficiency level for the user.

FIG. 20 exemplarily illustrates a screenshot of the interactive interface 1405 provided by the multimodal communication assist application 1404 exemplarily illustrated in FIG. 14, for determining a delay factor that defines a proficiency level for the user 1401. The interactive interface 1405 presents the user 1401 with an option to select a communication language for learning the visual communication language in the visual mode from a drop down list 2002. The interactive interface 1405 presents the user 1401 with a list of words in the text mode in a default word list frame 2003. The interactive interface 1405 also displays reference gestures in the visual mode for the user 1401 to mimic, and the proficiency level of the user 1401 in a side panel 2004 on the interactive interface 1405. The interactive interface 1405 also presents the user 1401 with options to pause 2005, to return to an initial screen using a menu button 2006, and to exit 1902 from the multimodal communication assist application 1404. The interactive interface 1405 displays the gestures performed by the user 1401 via the input device 1402a for the list of words in a visual mode gesture video frame 2001. The interactive interface 1405 also displays the time 2007 taken by the user 1401 for identifying the words in the text mode and performing the gestures. The multimodal communication assist application 1404 provides a reset option 2008 on the interactive interface 1405 to allow the user 1401 to respond to the list of words again to recalculate the delay factor.

Figure 21:
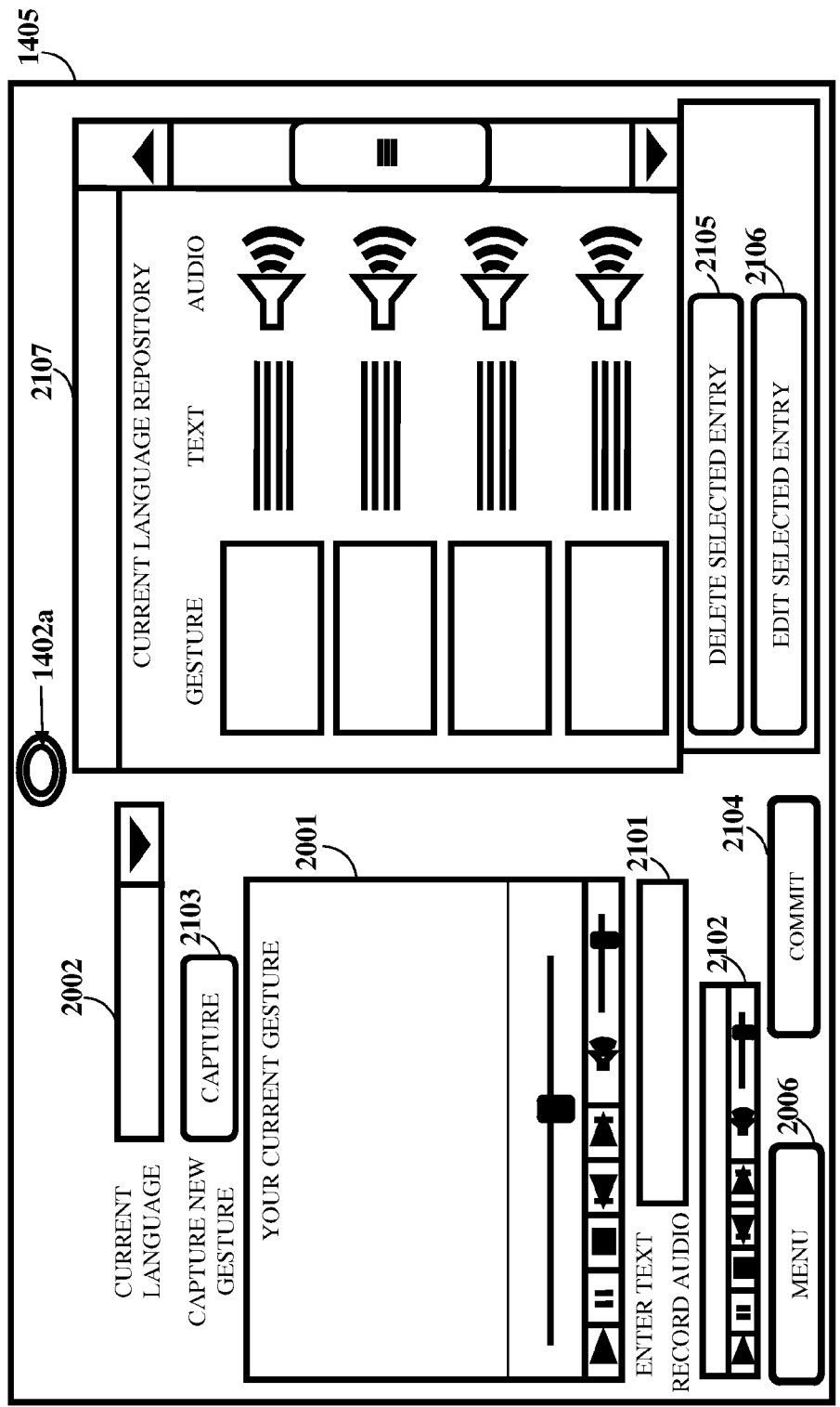
FIG. 21 exemplarily illustrates a screenshot of the interactive interface provided by the multimodal communication assist application for updating a database maintained by the multimodal communication assist application with one or more mappings of a modal input in one or more of the modes to a modal output in another one or more of the modes acquired from the user via the interactive interface.

FIG. 21 exemplarily illustrates a screenshot of the interactive interface 1405 provided by the multimodal communication assist application 1404 exemplarily illustrated in FIG. 14, for updating a database 1414 maintained by the multimodal communication assist application 1404 with one or more mappings of a modal input in one or more of the modes to a modal output in another one or more of the modes acquired from the user 1401 via the interactive interface 1405. The interactive interface 1405 presents the user 1401 with the option to select a communication language for the visual mode from a drop down list 2002. The interactive interface 1405 provides the user 1401 with an option for clicking a capture button 2103 to capture a new gesture provided by the user 1401 via the input device 1402a. The user 1401 can define a mapping of the new gesture in the visual mode to a modal output in the text mode and/or the audio mode. The interactive interface 1405 displays the new gesture performed by the user 1401 in the visual mode gesture video frame 2001. The interactive interface 1405 provides the user 1401 with an option to enter a text element, for example, a word in a text box 2101 and record a corresponding audio element using an audio controller 2102 provided on the interactive interface 1405. The interactive interface 1405 provides a commit button 2104 to the user 1401 for storing the mappings defined by the user 1401 in the database 1414. The interactive interface 1405 provides a delete selected entry button 2105 and an edit selected entry button 2106 to allow the user 1401 to delete a mapping in the database 1414 and edit or replace a mapping in the database 1414 respectively. The interactive interface 1405 also displays a list of previously stored mappings, for example, gestures mapped to their corresponding text elements and audio recordings on a panel 2107 for viewing by the user 1401. The user 1401 may return to an initial screen using a menu button 2006 provided on the interactive interface 1405.

Figure 22:
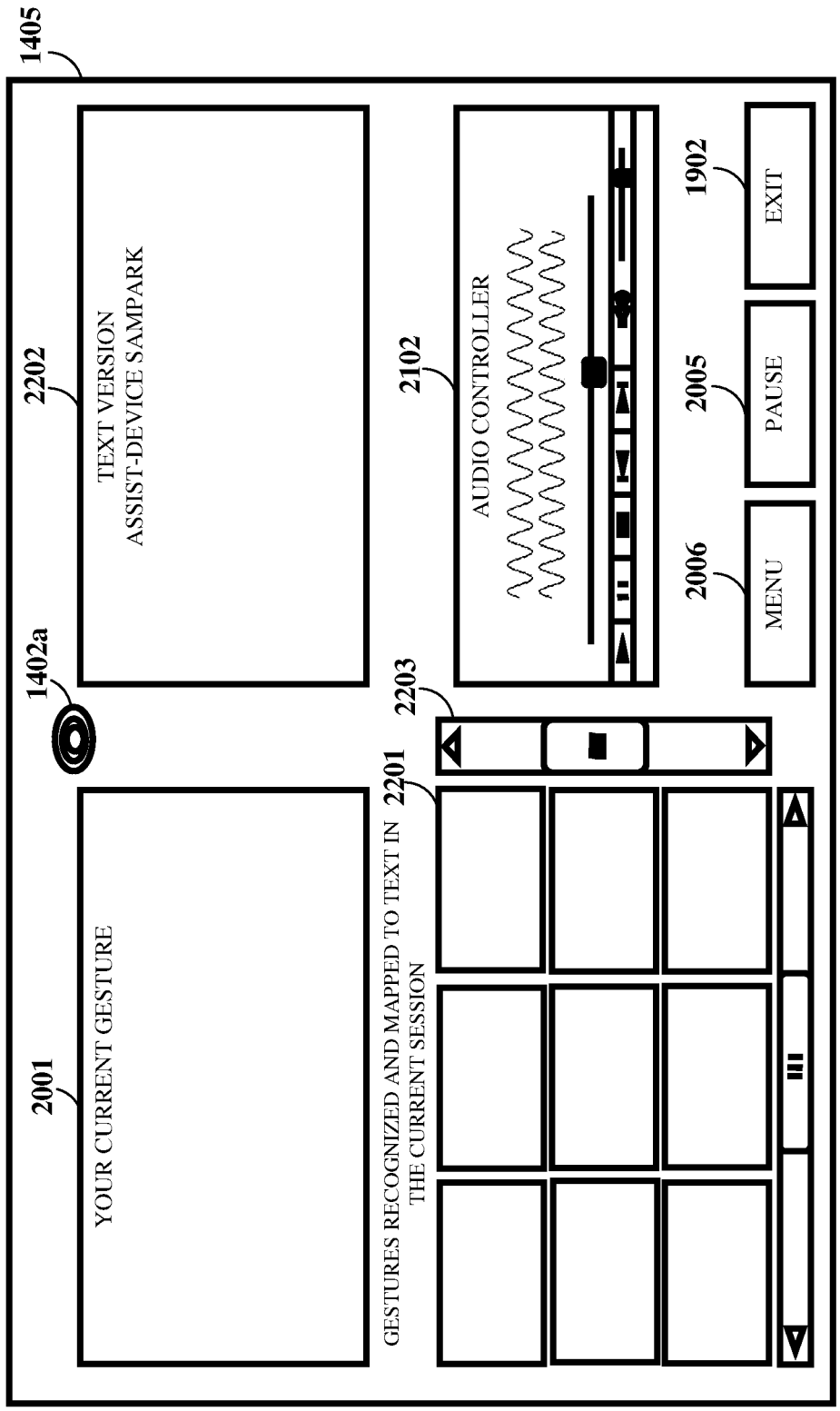
FIG. 22 exemplarily illustrates a screenshot of the interactive interface provided by the multimodal communication assist application for mapping a modal input in a visual mode to a modal output in a text mode and an audio mode.

FIG. 22 exemplarily illustrates a screenshot of the interactive interface 1405 provided by the multimodal communication assist application 1404 exemplarily illustrated in FIG. 14, for mapping a modal input in a visual mode into a modal output in a text mode and an audio mode. The interactive interface 1405 captures gestures in the visual mode from the user 1401 via the input device 1402a. The interactive interface 1405 displays the captured gestures in a visual mode gesture video frame 2001. The interactive interface 1405 displays the corresponding words in the text mode for the gestures in the visual mode in a text panel 2202. The interactive interface 1405 also displays the gestures in the visual mode previously captured in a history panel 2201 to the user 1401. The interactive interface 1405 provides a scroll bar 2203 for the user 1401 to navigate through the history panel 2201. The interactive interface 1405 also provides an audio controller 2102 for the user 1401 to listen to the corresponding audio elements in the audio mode for the displayed gestures. The interactive interface 1405 also presents the user 1401 with options to pause 2005, to return to an initial screen using a menu button 2006, and to exit 1902 from the multimodal communication assist application 1404.

Figure 23:
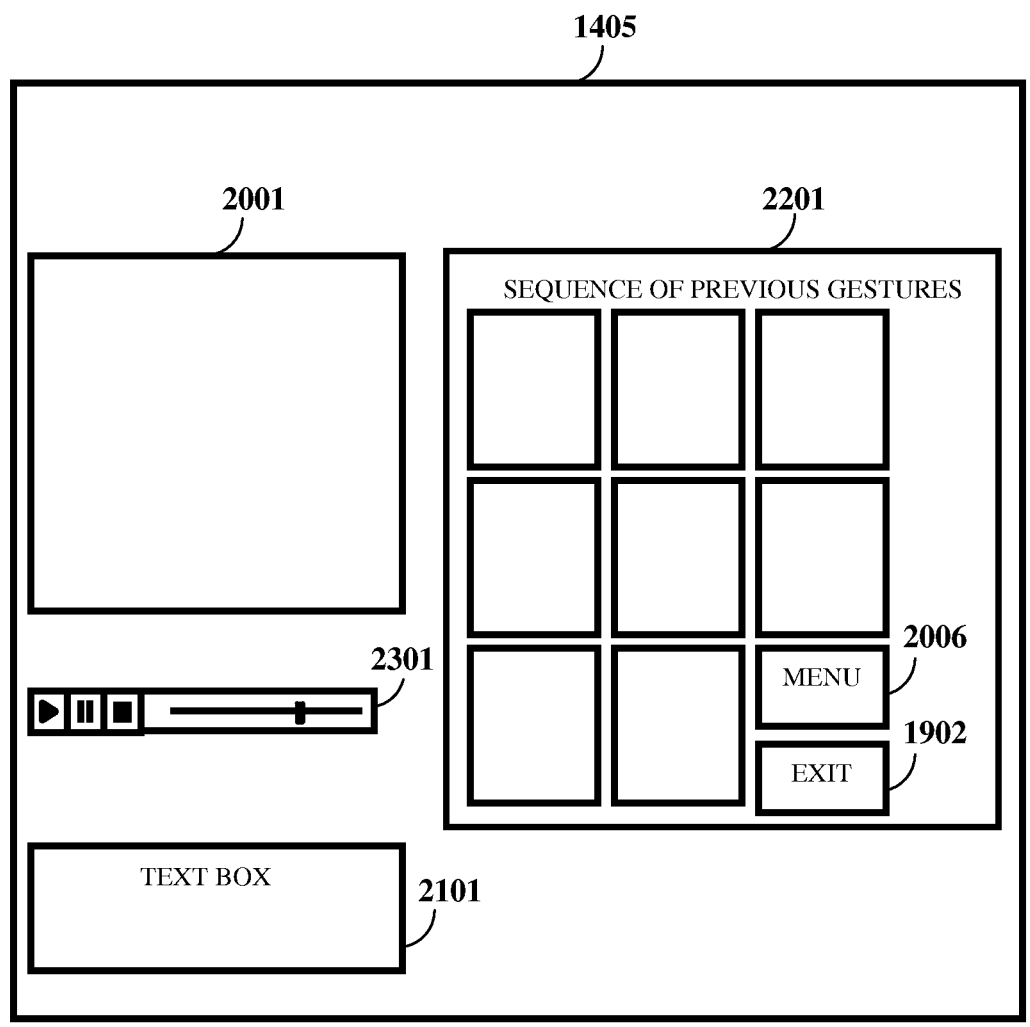
FIG. 23 exemplarily illustrates a screenshot of the interactive interface provided by the multimodal communication assist application for mapping a modal input in a text mode to a modal output in a visual mode.

FIG. 23 exemplarily illustrates a screenshot of the interactive interface 1405 provided by the multimodal communication assist application 1404 exemplarily illustrated in FIG. 14, for mapping a modal input in a text mode to a modal output in a visual mode. The interactive interface 1405 renders words in a text box 2101 for the user 1401. The interactive interface 1405 displays gestures for the corresponding words entered by the user 1401 in a visual mode gesture video frame 2001 using the input device 1402a. The interactive interface 1405 also displays previously transcribed gestures in the visual mode for the reference of the user 1401 in a history panel 2201. The interactive interface 1405 provides the user 1401 with options to return to an initial screen using a menu button 2006 and to exit 1902 from the multimodal communication assist application 1404. Furthermore, the interactive interface 1405 provides the user 1401 with a video controller with a seek bar 2301 to play, pause, and stop the display of the gestures.

Figure 24:
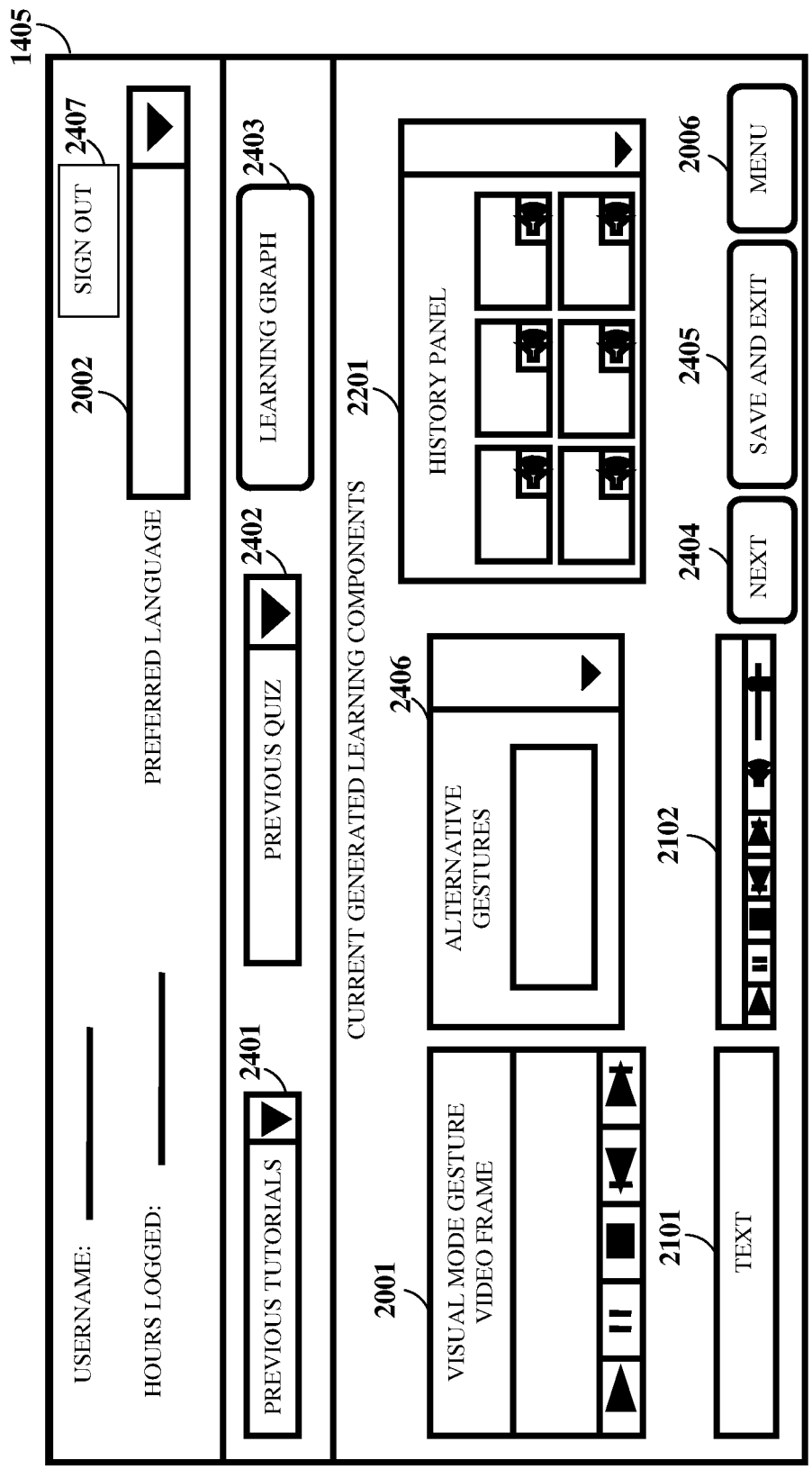
FIG. 24 exemplarily illustrates a screenshot of the interactive interface provided by the multimodal communication assist application for presenting learning components generated by the multimodal communication assist application to the user for assisting the user to learn and/or communicate in a visual communication language in one or more of multiple modes.

FIG. 24 exemplarily illustrates a screenshot of the interactive interface 1405 provided by the multimodal communication assist application 1404 exemplarily illustrated in FIG. 14, for presenting learning components generated by the multimodal communication assist application 1404 to the user 1401 for assisting the user 1401 to learn and/or communicate in a visual communication language in one or more of multiple modes. The interactive interface 1405 identifies the registered user 1401 for presenting the generated learning components. The interactive interface 1405 also keeps track of the time from when the user 1401 logged into the multimodal communication assist application 1404.

The interactive interface 1405 provides the user 1401 with an option to choose a communication language from a drop down list 2002 to undertake the generated learning components. In an example, the interactive interface 1405 presents a list of words in the text mode and in audio mode one at a time to the user 1401. The interactive interface 1405 renders the words in the text mode in the text box 2101 to the user 1401. The interactive interface 1405 provides the audio controller 2102 for the user 1401 to listen to the corresponding audio elements in the audio mode for the words. The interactive interface 1405 displays the gestures in the visual mode for each of the words as performed by the user 1401 via the input device 1402a in a visual mode gesture video frame 2001. The interactive interface 1405 displays alternative gestures in the visual mode for each of the words in an alternative gestures video frame 2406. The interactive interface 1405 provides a previous tutorials drop down list 2401, a previous quiz drop down list 2402, and a learning graph tab 2403 to the user 1401 for displaying the previous performance results of the user 1401. The interactive interface 1405 also displays the gestures in the visual mode previously captured from the user 1401 in the history panel 2201. The interactive interface 1405 displays with options to move to the next learning component using a next button 2404, save the current generated learning component and corresponding responses in the database 1414 and then exit from the multimodal communication assist application 1404 using a save and exit button 2405, and to return to an initial screen using a menu button 2006. The interactive interface 1405 also provides the user 1401 with an option to sign out 2407 from the multimodal communication assist application 1404.

Figure 25:
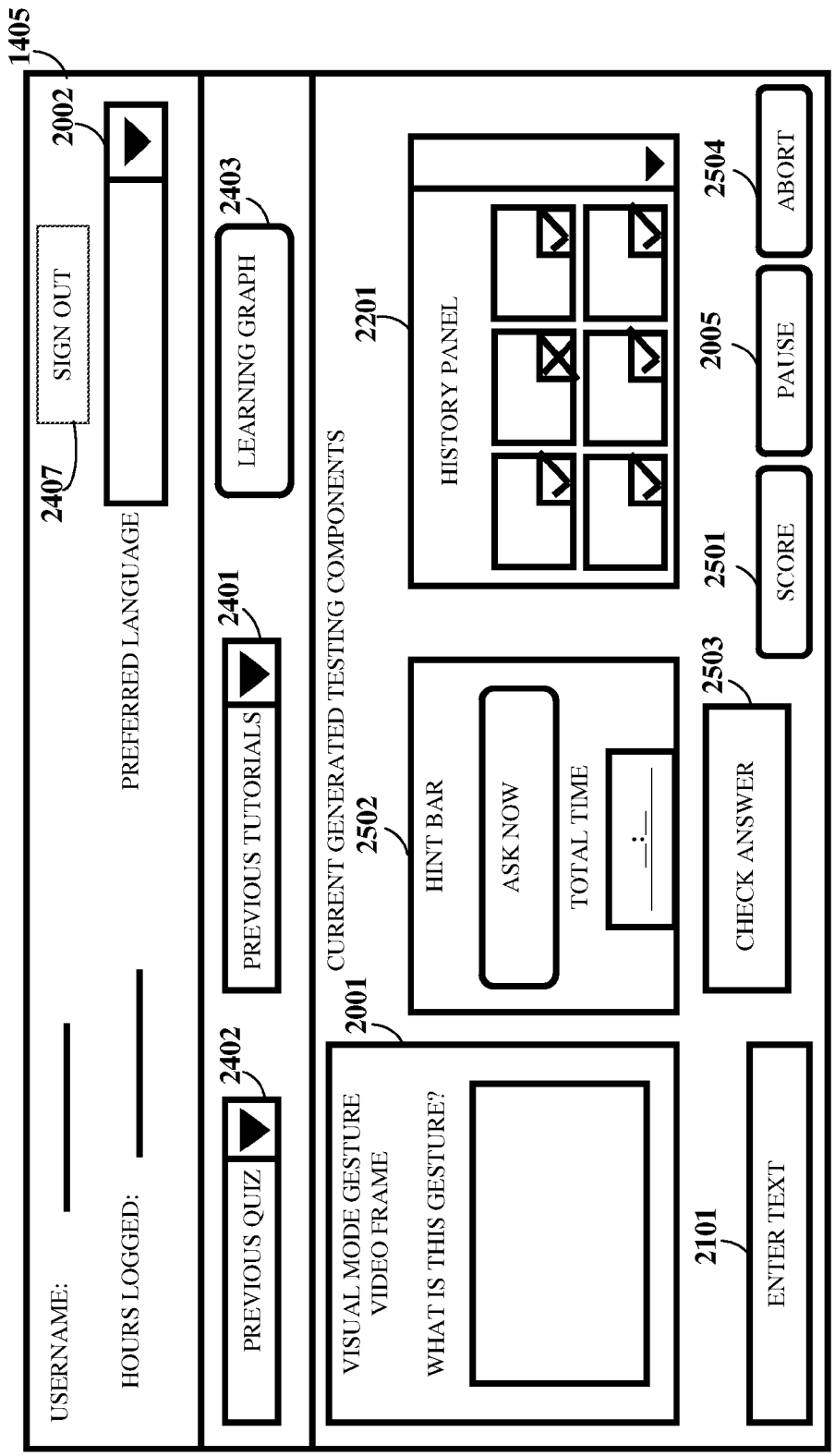
FIG. 25 exemplarily illustrates a screenshot of the interactive interface provided by the multimodal communication assist application for administering testing components generated by the multimodal communication assist application to the user for assisting the user to learn and/or communicate in a visual communication language in one or more of multiple modes.

FIG. 25 exemplarily illustrates a screenshot of the interactive interface 1405 provided by the multimodal communication assist application 1404 exemplarily illustrated in FIG. 14, for administering testing components 1901d generated by the multimodal communication assist application 1404 to the user 1401 for assisting the user 1401 to learn and/or communicate in a visual communication language in one or more of multiple modes. The interactive interface 1405 identifies the user 1401 for presenting the generated testing components. The interactive interface 1405 also keeps track of the time from when the user 1401 logged into the multimodal communication assist application 1404.

The interactive interface 1405 provides the user 1401 with an option to choose a communication language from a drop down list 2002 to undertake the generated testing components. In an example, the interactive interface 1405 presents a list of gestures in the visual mode to the user 1401. The interactive interface 1405 displays the gestures in the visual mode in a visual mode gesture video frame 2001 for the user 1401. The interactive interface 1405 provides text box 2101 for allowing the user 1401 to enter words in the text mode for each of the gestures in the visual mode displayed in the visual mode gesture video frame 2001. The interactive interface 1405 provides a previous tutorials drop down list 2401, a previous quiz drop down list 2402, and a learning graph tab 2403 to the user 1401 for displaying the previous performance results of the user 1401. The interactive interface 1405 also displays the gestures in the visual mode previously captured from the user 1401 in the history panel 2201.

The interactive interface 1405 also provides a hint bar 2502 for enabling the user 1401 to acquire more information for mapping the displayed gesture in the visual mode to one or more words in the text mode. Furthermore, the interactive interface 1405 displays options to check answers 2503 for the generated testing components, check scores 2501 for the generated testing components, to pause 2005 the presentation of the generated testing components, and to abort 2504 the presentation of the generated testing components. The interactive interface 1405 also provides the user 1401 with an option to sign out 2407 from the multimodal communication assist application 1404.

Consider an example where the computer implemented method and system 1400 disclosed herein assists a deaf and mute user 1401 who is versed in the visual communication language in the visual mode to communicate, ask a question, share a hello, etc., with another user 1401, for example, a blind user 1401 or a user 1401 having no hearing impairment or speech disabilities, who is not versed in the visual communication language in the visual mode. The deaf and mute user 1401 can invoke the multimodal communication assist application 1404 on a wearable computing device 1402, for example, a wearable mobile device. If the deaf and mute user 1401 is working with the multimodal communication assist application 1404 for the first time, the deaf and mute user 1401 can get acquainted with various features of the multimodal communication assist application 1404 and its usage by choosing to view or a take a demonstration or a tutorial on the multimodal communication assist application 1404. The multimodal communication assist application 1404 provides options to allow the deaf and mute user 1401 to augment the vocabulary stored in the database 1414 with text elements not present in the database 1414 and provide corresponding gestures in the visual mode.

The deaf and mute user 1401 can select one of the multimodal communication mappers 1406, for example, a visual to text and/or audio mapper 1406a, provided by the multimodal communication assist application 1404. The multimodal communication assist application 1404 identifies the multimodal communication mapper 1406 selected by the deaf and mute user 1401. The multimodal communication assist application 1404 prompts the deaf and mute user 1401 to select a communication language from a list of communication languages to communicate the visual communication language in the visual mode. The multimodal communication assist application 1404 may then prompt the deaf and mute user 1401 to finger-spell alphabets of a test word.

The multimodal communication assist application 1404 captures the gestures of the finger-spelled alphabets for the test word from the deaf and mute user 1401 and validates the gestures against the gestures for the test word stored in the database 1414. If the multimodal communication assist application 1404 has included more alphabets than actually spelled, the multimodal communication assist application 1404 adjusts the sampling rate and prompts the deaf and mute user 1401 to spell another word. If the multimodal communication assist application 1404 failed to recognize any alphabet gestured by the deaf and mute user 1401, the multimodal communication assist application 1404 readjusts the sampling rate and prompts the deaf and mute user 1401 to spell another word. In this manner, the multimodal communication assist application 1404 determines the delay factor and the proficiency level of the deaf and mute user 1401 based on the characteristic information of the deaf and mute user 1401.

The deaf and mute user 1401 may also choose to augment the visual communication language with user defined gestures or define an entirely new vocabulary. The deaf and mute user 1401 can train the multimodal communication assist application 1404 by demonstrating a gesture in the field of view of the input device 1402a, for example, a camera, typically more than once, within the time duration indicated by the multimodal communication assist application 1404 and can also provide the corresponding text elements for each new gesture. The user defined gestures and new vocabulary is stored in the database 1414. Once the multimodal communication assist application 1404 is trained with the user defined gestures, the deaf and mute user 1401 can start to gesticulate and allow the multimodal communication assist application 1404 to map the gestures to modal outputs in the text mode and the audio mode for communicating with another user 1401. The multimodal communication assist application 1404 therefore accepts gestures as the modal input from a user 1401 and provides text cues and/or voice cues to another user 1401 who is not versed in the visual communication language in the visual mode.

The multimodal communication assist application 1404 alerts the deaf and mute user 1401 on failure to detect the deaf and mute user 1401's hand or failure to sense a change in a gesture at any time. If the deaf and mute user 1401 intends to continue to use the multimodal communication assist application 1404, the multimodal communication assist application 1404 provides the deaf and mute user 1401 with an option to reset the multimodal communication assist application 1404 by placing the hand in the field of view of the input device 1402a and allowing the multimodal communication assist application 1404 to recalibrate to detect the hand. Alternatively, the deaf and mute user 1401 may choose to switch off the multimodal communication assist application 1404.

In this example, when the deaf and mute user 1401 who is versed in the visual communication language in the visual mode wishes to communicate with another user 1401, for example, a blind user 1401 at a public place such as a store, a park, etc., the multimodal communication assist application 1404 receives the modal input, for example, the gestures of the deaf and mute user 1401, and speaks out the modal output, for example, in the audio mode, to the blind user 1401.

The blind user 1401 can type in a message into the multimodal communication assist application 1404 via the interactive interface 1405 which can either be directly read by the deaf and mute user 1401 or converted back to gestures for the deaf and mute user 1401 to view. The blind user 1401 may select, for example, a text to visual and/or audio mapper 1406b to reply to the deaf and mute user 1401 via the interactive interface 1405. The multimodal communication assist application 1404 prompts the blind user 1401 to select a communication language from a list of communication languages to communicate the visual communication language in the text mode. The blind user 1401 uses the input device 1402a, for example, a keyboard, in communication with the multimodal communication assist application 1404 to enter the modal input in the text mode via a text box 2101 on the interactive interface 1405 exemplarily illustrated in FIG. 23, to reply to the deaf and mute user 1401. The multimodal communication assist application 1404 either reads out the text message of the other user 1401 or processes and transforms the text message to gestures that can be viewed by the deaf and mute user 1401 via the interactive interface 1405. The multimodal communication assist application 1404 processes and transforms the modal input in the text mode to a modal output in the visual mode, thereby allowing the blind user 1401 to communicate with the deaf and mute user 1401 in a convenient manner.

In this example, the blind user 1401 finds typing the text message using the keyboard easier compared to gesticulating in the visual mode of the visual communication language. The multimodal communication assist application 1404 assists the blind user 1401 to communicate with the deaf and mute user 1401 by allowing the blind user 1401 to type the text message via the input device 1402a. The multimodal communication assist application 1404 transforms the text message of the blind user 1401 into a modal output in the visual mode, for example, as video pictures for the deaf and mute user 1401. The multimodal communication assist application 1404 displays the modal output in the visual mode to the deaf and mute user 1401 via the interactive interface 1405. The multimodal communication assist application 1404 simultaneously displays the gestures of the visual mode to the deaf and mute user 1401 as the blind user 1401 enters the text message using the keyboard. The multimodal communication assist application 1404 therefore permits the blind user 1401 to input non-gesture cues, for example, text and provides the corresponding gestures as the modal output in the visual mode to the deaf and mute user 1401. The multimodal communication assist application 1404 may also transform voice cues input by the blind user 1401 to gestures, which would allow the blind user 1401 to communicate more naturally with the deaf and mute user 1401.

Consider another example where a deaf and mute user 1401 with one or more missing digits in his/her hands faces challenges while communicating in the visual mode of the visual communication language. The multimodal communication assist application 1404 allows the deaf and mute user 1401 with missing digits to modify the vocabulary in the database 1414 and define his/her own gestures in the visual mode in a selected communication language to supplement the gestures stored in the database 1414.

The multimodal communication assist application 1404 also allows the user 1401 to define short hand notations for repetitive phrases or sentences. The multimodal communication assist application 1404 stores the user defined short hand notations in the database 1414. Therefore, the user 1401 does not have to spell out the entire phrase or sentence every time but may use the short hand notations for the repetitive phrases or sentences.

Consider another example where the multimodal communication assist application 1404 acts as a transcription device. The multimodal communication assist application 1404 assists a first user 1401, for example, a deaf and mute user 1401 who is literate in a first visual communication language, for example, Mandarin and not versed in a second visual communication language, for example, Latin, to communicate with a second user 1401, for example, a blind user 1401 who understands the spoken form of Mandarin, but reads only the second visual communication language, for example, the Latin script. The deaf and mute user 1401 switches on a wearable computing device 1402, for example, a wearable mobile device and invokes the multimodal communication assist application 1404 on the wearable computing device 1402. If the deaf and mute user 1401 is working with the multimodal communication assist application 1404 for the first time, the deaf and mute user 1401 gets acquainted with various features of the multimodal communication assist application 1404 and its usage by choosing to view or a take a demonstration or a tutorial.

The multimodal communication assist application 1404 identifies the multimodal communication mapper 1406 selected by the deaf and mute user 1401. The selected multimodal communication mapper 1406 is, for example, a dual mode of a visual to text and/or audio mapper 1406*a* and a text to visual and/or audio mapper 1406*b*. The multimodal communication assist application 1404 provides the deaf and mute user 1401 with options to select one or more communication languages from a list of communication languages to converse in and the communication language of the modal output. The multimodal communication assist application 1404 determines the delay factor and the proficiency level of the deaf and mute user 1401 based on the characteristic information of the deaf and mute user 1401.

The multimodal communication assist application 1404 captures the modal input, for example, in the visual mode or the text mode of the deaf and mute user 1401 in the first visual communication language of the deaf and mute user 1401. The deaf and mute user 1401 gesticulates in the field of view of the input device 1402*a*, for example, a camera. The multimodal communication assist application 1404 transforms the modal input in the visual mode to a modal output in the text mode and/or the audio mode of the first visual communication language using the visual to text and/or audio mapper 1406*a*. The multimodal communication assist application 1404 may also transform the modal input in the text mode to a modal output in the audio mode of the first visual communication language using the text to visual and/or audio mapper 1406*a*. Since the blind user 1401 understands the spoken form of Mandarin, the blind user 1401 understands the modal output in the audio mode. The multimodal communication assist application 1404 later transforms the modal input into a modal output in the audio mode associated with the second visual communication language, for example, the Latin script for the blind user 1401.

Consider an example where a deaf and mute user 1401 versed in the visual mode of a first visual communication language wants to communicate with another deaf and mute user 1401 versed in the visual mode of a second visual communication language. In this example, the multimodal communication assist application 1404 also acts as a transcription device, where the multimodal communication assist application 1404 captures a modal input in the visual mode from a first deaf and mute user 1401 versed in the visual mode of the first visual communication language and transforms the modal input to a modal output in the text mode of the second visual communication language. The multimodal communication assist application 1404 further transforms the text mode of the second visual communication language to the visual mode of the second visual communication language for a second deaf mute user 1401 versed only in the visual mode of the second visual communication language. Thus, the multimodal communication assist application 1404 assists the first deaf and mute user 1401 versed only in the first visual communication language to communicate with the second deaf and mute user 1401 versed only in the second visual communication language.

In another example, the multimodal communication assist application 1404 assists the user 1401, for example, the deaf and mute user 1401 versed in the visual mode of the first visual communication language to improve the user's 1401 proficiency level in the first visual communication language. Initially, the multimodal communication assist application 1404 provides the user 1401 with learning components, for example, a string of alphabets repeatedly shown in the visual mode as gestures and also transcribed to text and read out for the user 1401. The multimodal communication assist application 1404 then provides the user 1401 with a first set of testing components in the first visual communication language to determine the delay factor and therefore define the proficiency level of the user 1401. The first set of testing components in the first visual communication language comprises gestures in the visual mode presented randomly from a pool of gestures available from the learning components. The multimodal communication assist application 1404 gradually increases the pace of presenting the gestures if the user 1401 performs well in the testing components 1901*d*. The multimodal communication assist application 1404 repeats the gestures guessed wrongly by the user 1401 to determine specific problems of the user 1401. The multimodal communication assist application 1404 provides customized testing components, for example, cues repeatedly confused by the user 1401, to the user 1401 based on the assessed delay factor and proficiency level of the user 1401.

The multimodal communication assist application 1404 further presents the user 1401 with a second set of learning components having a list of new alphabets or words together with some of the alphabets and words that the user 1401 got wrong while engaging with the first set of testing components. The multimodal communication assist application 1404 then adaptively presents a second set of testing components for testing the user 1401 on alphabets and words from the initial learning components, the first set of testing components, and the second set of learning components at an increasing pace. The multimodal communication assist application 1404 adaptively varies parameters such as words, the order of the words, and the pace at which the user 1401 is expected to gesticulate. The multimodal communication assist application 1404 stores the sequence of alphabets presented to the user 1401 as well as the corresponding testing components and the performance of the user 1401 in the database 1414. The multimodal communication assist application 1404 later mines the stored sequence of alphabets presented to the user 1401 as well as the corresponding testing components for improving the operation of the adaptive tutor unit 1413 to govern the choice of the learning components and the testing components 1901*d*, and their sequence and pace to be presented to the user 1401 in real time.

The multimodal communication assist application 1404 further presents the user 1401 with advanced testing components, for example, with multilingual gestures, or with gestures of the visual mode of the first visual communication language that include less common words and phrases. The multimodal communication assist application 1404 further allows the user 1401 to play a game that narrates a story through a series of increasingly challenging testing components. Thus, the multimodal communication assist application 1404 presents young users 1401 with a fun mode of learning the visual communication language in one or more modes and motivates the young users 1401 to progress through the levels of the learning components and the testing components 1901*d* at a faster pace.

The multimodal communication assist application 1404 on two locally resident computing devices connected via the communicating network 1403, for example, the internet, allows multiple users 1401 to communicate in the visual mode of the visual communication language, as performed via a video conference.

It will be readily apparent that the various methods and algorithms disclosed herein may be implemented on computer readable media appropriately programmed for general purpose computers and computing devices. As used herein, the term "computer readable media" refers to non-transitory computer readable media that participate in providing data, for example, instructions that may be read by a computer, a processor or a like device. Non-transitory computer readable media comprise all computer readable media, for example, non-volatile media, volatile media, and transmission media, except for a transitory, propagating signal. Non-volatile media comprise, for example, optical disks or magnetic disks and other persistent memory volatile media including a dynamic random access memory (DRAM), which typically constitutes a main memory. Volatile media comprise, for example, a register memory, a processor cache, a random access memory (RAM), etc. Transmission media comprise, for example, coaxial cables, copper wire and fiber optics, including wires that constitute a system bus coupled to a processor. Common forms of computer readable media comprise, for example, a floppy disk, a flexible disk, a hard disk, magnetic tape, any other magnetic medium, a compact disc-read only memory (CD-ROM), a digital versatile disc (DVD), any other optical medium, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read. A "processor" refers to any one or more microprocessors, central processing unit (CPU) devices, computing devices, microcontrollers, digital signal processors or like devices. Typically, a processor receives instructions from a memory or like device and executes those instructions, thereby performing one or more processes defined by those instructions. Further, programs that implement such methods and algorithms may be stored and transmitted using a variety of media, for example, the computer readable media in a number of manners. In an embodiment, hard-wired circuitry or custom hardware may be used in place of, or in combination with, software instructions for implementation of the processes of various embodiments. Therefore, the embodiments are not limited to any specific combination of hardware and software. In general, the computer program codes comprising computer executable instructions may be implemented in any programming language. Some examples of languages that can be used comprise C, C++, C#, Perl, Python, or JAVA. The computer program codes or software programs may be stored on or in one or more mediums as object code. The computer program product disclosed herein comprises computer executable instructions embodied in a non-transitory computer readable storage medium, wherein the computer program product comprises computer program codes for implementing the processes of various embodiments.

Where databases are described such as the database 1414, it will be understood by one of ordinary skill in the art that (i) alternative database structures to those described may be readily employed, and (ii) other memory structures besides databases may be readily employed. Any illustrations or descriptions of any sample databases disclosed herein are illustrative arrangements for stored representations of information. Any number of other arrangements may be employed besides those suggested by tables illustrated in the drawings or elsewhere. Similarly, any illustrated entries of the databases represent exemplary information only; one of ordinary skill in the art will understand that the number and content of the entries can be different from those disclosed herein. Further, despite any depiction of the databases as tables, other formats including relational databases, object-based models, and/or distributed databases may be used to store and manipulate the data types disclosed herein. Likewise, object methods or behaviors of a database can be used to implement various processes such as those disclosed herein. In addition, the databases may, in a known manner, be stored locally or remotely from a device that accesses data in such a database. In embodiments where there are multiple databases in the system, the databases may be integrated to communicate with each other for enabling simultaneous updates of data linked across the databases, when there are any updates to the data in one of the databases.

The present invention can be configured to work in a network environment including a computer that is in communication with one or more devices via a communication network. The computer may communicate with the devices directly or indirectly, via a wired medium or a wireless medium such as the Internet, a local area network (LAN), a wide area network (WAN) or the Ethernet, token ring, or via any appropriate communications means or combination of communications means. Each of the devices may comprise computers such as those based on the Intel® processors, AMD® processors, UltraSPARC® processors, Sun® processors, IBM® processors, etc., that are adapted to communicate with the computer. Any number and type of machines may be in communication with the computer.

The foregoing examples have been provided merely for the purpose of explanation and are in no way to be construed as limiting of the present invention disclosed herein. While the invention has been described with reference to various embodiments, it is understood that the words, which have been used herein, are words of description and illustration, rather than words of limitation. Further, although the invention has been described herein with reference to particular means, materials, and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

We claim:

1. A computer implemented method for assisting a user to learn and/or communicate in a visual communication language in one or more of a plurality of modes, comprising:

providing a multimodal communication assist application embedded in a non-transitory computer readable storage medium executable by a processor of said user, wherein said multimodal communication assist application provides an interactive interface to said user for enabling communication of said visual communication language in said modes;

providing a plurality of multimodal communication mappers to said user by said multimodal communication assist application via said interactive interface, wherein said multimodal communication mappers map a modal input in one of said modes to a modal output in another one or more of said modes;

receiving a selection of one of said multimodal communication mappers from said user via said interactice interface;

acquiring user-defined communication mappers by said multimodal communication assist application;

adapting said multimodal communication assist application for said received user-selected one of said multimodal communication mappers and said user-defined communication mappers acquired by said multimodal communication assist application;

determining characteristic information of said user by said multimodal communication assist application based on one or more of said user-selected multimodal communication mapper and said acquired user-defined communication mappers;

determining a delay factor for said user based on a calculation of response times of said user for repeating each of a set of pre-stored gestures presented to said user along with a corresponding set of words, by said multimodal communication assist application, using a set of formulas:

Delay Factor=Total time $T_t/(C-2)$;

$T_t=(T_1+T_2+T_3+\ldots+T_C-T_{max}-T_{min})$;

wherein $T_1, T_2, T_3, \ldots, T_C$ are response times of said user for repeating each of a set of pre-stored gestures presented to said user along with a corresponding set of words;

C is total number of said pre-stored gestures and words presented to said user;

said $T_{max}$ is slowest among the response times; and said $T_{min}$ is fastest among the response times;

capturing said modal input in one of said modes from said user via said interactive interface based on said determined delay factor and one or more of said characteristic information by said multimodal communication assist application, wherein said multimodal communication assist application controls sampling rate of said capturing of said modal input based on user's proficiency level, and wherein said proficiency level of said user is determined by said multimodal communication assist application based on said determined delay factor using a criteria set comprising:

(a) if said delay factor is greater than or equal to 2.5 seconds, then said multimodal communication assist application defines and displays said proficiency level of said user as "beginner" on said interactive interface;

(b) if said delay factor is greater than or equal to 2 seconds and less than 2.5 seconds, then said multimodal communication assist application defines and displays said proficiency level of said user as "advanced beginner" on said interactive interface;

(c) if said delay factor is greater than or equal to 1.5 seconds and less than 2 seconds, then said multimodal communication assist defines and displays said proficiency level of said user as "competent" on said interactive interface;

(d) if said delay factor is greater than or equal to 1 second and less than 1.5 seconds, then said multimodal communication assist defines and displays said proficiency level of said user as "professional" on said interactive interface; and (e) if said delay factor is less than 1 second, then said multimodal communication assist application defines and displays said proficiency level of said user as "expert" on said interactive interface; and processing and transforming said captured modal input in said one of said modes into said modal output in said another one or more of said modes using said selected one or more multimodal communication mappers by said multimodal communication assist application, wherein said multimodal communication assist application renders said modal output in said another one or more of said modes to said user via said interactive interface for assisting said user to learn and/or communicate in said visual communication language in said one or more of said modes.

2. The computer implemented method of claim 1, wherein said modes for communicating said visual communication language comprise a visual mode, a text mode, an audio mode, and any combination thereof.

3. The computer implemented method of claim 1, wherein said characteristic information comprises one or more of skin color of said user, position of hands of said user, accessories of said user used as markers by said multimodal communication assist application, a communication language of said user, and a response time of said user.

4. The computer implemented method of claim 1, wherein said multimodal communication assist application initiates said capture of said modal input in said one of said modes from said user via said interactive interface based on one of a plurality of options selected by said user on said interactive interface, wherein one or more of said options represent one or more of said multimodal communication mappers, and learning components and testing components generated by said multimodal communication assist application.

5. The computer implemented method of claim 1, wherein said determination of said response times of said user further comprises:
  presenting one or more text elements and corresponding visual elements to said user via said interactive interface;
  capturing said modal input in a visual mode of said modes from said user via said interactive interface at a predefined sampling rate, wherein said modal input is a simulation of said visual elements corresponding to said presented one or more text elements;
  matching said captured modal input in said visual mode with a plurality of modal outputs in said visual mode stored in a database maintained by said multimodal communication assist application; and
  determining a response time of said user for each of said presented one or more text elements during said capture of said matched modal input and utilizing said response time to determine said delay factor for said user.

6. The computer implemented method of claim 1, wherein said processing and said transformation of said captured modal input in a visual mode of said modes received from an input device into said modal output in a text mode and/or an audio mode of said modes by said multimodal communication assist application comprises:
  detecting and extracting one or more visual elements from said captured modal input in said visual mode based on said characteristic information of said user;
  scaling said extracted one or more visual elements to a predetermined scale;
  segmenting each of said scaled one or more visual elements into a predetermined number of blocks;
  determining a numerical descriptor for said each of said scaled one or more visual elements based on number of highlighted visual constituents in each of said predetermined number of said blocks;
  recognizing a gesture from a plurality of gestures stored in a database maintained by said multimodal communication assist application based on said determined numerical descriptor; and
  associating said recognized gesture with one or more text elements and/or one or more audio elements stored in said database to generate said modal output in said text mode and/or said audio mode respectively, that corresponds to said captured modal input in said visual mode, wherein said multimodal communication assist application renders said generated modal output in said text mode and/or said audio mode to said user via said interactive interface for assisting said user to learn and/or communicate in said visual communication language.

7. The computer implemented method of claim 6, further comprising processing and transforming said generated modal output in said text mode into said modal output in said audio mode by said multimodal communication assist application by associating said generated modal output in said text mode with one or more audio elements stored in said database to generate said modal output in said audio mode, wherein said multimodal communication assist application renders said generated modal output in said text mode and said audio mode to said user via said interactive interface for assisting said user to learn and/or communicate in said visual communication language.

8. The computer implemented method of claim 6, wherein said modal input in said visual mode comprises single handed gestures, dual handed gestures, and overlapping hand gestures of said user.

9. The computer implemented method of claim 6, wherein each of said predetermined number of blocks of said each of said scaled one or more visual elements is of one of an equal size and a non-equal size.

10. The computer implemented method of claim 1, wherein said processing and said transformation of said captured modal input in a text mode of said modes into said modal output in a visual mode and/or an audio mode of said modes by said multimodal communication assist application comprises:
  extracting one or more text elements from said captured modal input in said text mode;
  retrieving one or more modal outputs in said visual mode and/or said audio mode for said extracted one or more text elements from a database maintained by said multimodal communication assist application; and
  archiving said retrieved one or more modal outputs in said visual mode and/or said audio mode, wherein said multimodal communication assist application renders said archived one or more modal outputs in said visual mode and/or said audio mode to said user via said interactive interface for assisting said user to learn and/or communicate in said visual communication language.

11. The computer implemented method of claim 1, further comprising storing mappings of said modal input in said one of said modes to said modal output in said another one or more of said modes, said characteristic information of said user, said determined delay factor for said user, and a proficiency level of said user defined by said multimodal communication assist application based on said determined delay factor, in a database maintained by said multimodal communication assist application.

12. The computer implemented method of claim 1, further comprising generating learning components and testing components for said user using one or more of mappings of said modal input in said one of said modes to said modal output in said another one or more of said modes, said characteristic information of said user, said determined delay factor for said user, said proficiency level of said user defined by said multimodal communication assist application based on said determined delay factor, predetermined test information, and previous performance reports stored in a database maintained by said multimodal communication assist application.

13. The computer implemented method of claim 12, further comprising:
  presenting one of said generated learning components and said generated testing components in one or more of said modes to said user via said interactive interface based on said determined delay factor;
  capturing said modal input in another one of said modes provided by said user based on said determined delay factor using an input device, by said multimodal communication assist application;
  evaluating said captured modal input in said another one of said modes based on said mappings of said modal input to said modal output stored in said database by said multimodal communication assist application; and
  generating a performance report based on said evaluation by said multimodal communication assist application and rendering said performance report to said user via said interactive interface.

14. The computer implemented method of claim 12, wherein said generation of said learning components and said testing components comprises communicating with a central adaptive learning system by said multimodal communication assist application via a communication network, wherein said central adaptive learning system gathers performance data of a plurality of users for enhancing said generation of said learning components and said testing components.

15. The computer implemented method of claim 12, further comprising tracking performance of said user who engages with said generated learning components and said generated testing components by said multimodal communication assist application to select said generated learning components and said generated testing components to be presented to said user via said interactive interface for assisting said user to learn and/or communicate in said visual communication language in said one or more of said modes.

16. The computer implemented method of claim 1, further comprising acquiring one or more mappings of said modal input in one or more of said modes to said modal output in another one or more of said modes from said user via said interactive interface by said multimodal communication assist application and storing said acquired one or more mappings in a database maintained by said multimodal communication assist application.

17. A computer implemented system for assisting a user to learn and/or communicate in a visual communication language in one or more of a plurality of modes, comprising:
    a multimodal communication assist application embedded in a non-transitory computer readable storage medium executable by a processor of said user, comprising:
    an interactive interface that enables communication of said visual communication language in said modes;
    a plurality of multimodal communication mappers accessible to said user via said interactive interface, wherein said multimodal communication mappers map a modal input in one of said modes to a modal output in another one or more of said modes;
    a mapper identification module that identifies a selection of one of said multimodal communication mappers received from said user via said interactice interface;
    a mapping acquisition module for acquiring user-defined communication mappers;
    a characteristic information determination module that determines characteristic information of said user based on one or more of said received user-selected multimodal communication mappers and said acqquired user-defined communication mappers;
    a delay factor determination module that determines a delay factor for said user based on a calculation of response times of said user for repeating each of a set of pre-stored gestures presented to said user along with a corresponding set of words, using a set of formulas:

Delay Factor=Total time $T_t/(C-2)$;

$T_t=(T_1+T_2+T_3+\ldots+T_C-T_{max}-T_{min})$;

wherein
    $T_1, T_2, T_3, \ldots, T_C$ are response times of said user for repeating each of a set of pre-stored gestures presented to said user along with a corresponding set of words;
    C is total number of said pre-stored gestures and words presented to said user;
    said $T_{max}$ is slowest among the response times; and
    said $T_{min}$ is fastest among the response times;
    a modal input capture module that captures said modal input in one of said modes from said user via said interactive interface based on said determined delay factor and one or more of said characteristic information, wherein said multimodal communication assist application controls sampling rate of said capturing of said modal input based on user's proficiency level, and wherein said proficiency level of said user is determined by said multimodal communication assist application based on said determined delay factor using a criteria set comprising:
    (a) if said delay factor is greater than or equal to 2.5 seconds, then said multimodal communication assist application defines and displays said proficiency level of said user as "beginner" on said interactive interface;
    (b) if said delay factor is greater than or equal to 2 seconds and less than 2.5 seconds, then said multimodal communication assist application defines and displays said proficiency level of said user as "advanced beginner" on said interactive interface;
    (c) if said delay factor is greater than or equal to 1.5 seconds and less than 2 seconds, then said multimodal communication assist defines and displays said proficiency level of said user as "competent" on said interactive interface;
    (d) if said delay factor is greater than or equal to 1 second and less than 1.5 seconds, then said multimodal communication assist defines and displays said proficiency level of said user as "professional" on said interactive interface; and
    (e) if said delay factor is less than 1 second, then said multimodal communication assist application defines and displays said proficiency level of said user as "expert" on said interactive interface; and
    a control unit that processes and transforms said captured modal input in said one of said modes into said modal output in said another one or more of said modes using said selected one or more multimodal communication mappers, wherein said modal output in said another one or more of said modes is rendered to said user via said interactive interface for assisting said user to learn and/or communicate in said visual communication language in said one or more of said modes.

18. The computer implemented system of claim 17, wherein said multimodal communication assist application further comprises a database that stores mappings of said modal input in said one of said modes to said modal output in said another one or more of said modes, said characteristic information of said user, said determined delay factor for said user, and a proficiency level of said user defined by said multimodal communication assist application based on said determined delay factor, wherein said characteristic information comprises one or more of skin color of said user, position of hands of said user, accessories of said user used as markers by said multimodal communication assist application, a communication language of said user, and a response time of said user.

19. The computer implemented system of claim 17, wherein said modal input capture module captures said modal input in a visual mode of said modes from said user via said interactive interface at a predefined sampling rate, wherein said modal input is a simulation of visual elements corresponding to one or more text elements presented to said user via said interactive interface, and wherein said control unit matches said captured modal input in said visual mode with a plurality of modal outputs in said visual mode stored in a database maintained by said multimodal communication assist application, and wherein said delay factor determination module, in communication with said interactive interface, said modal input capture module, and said control unit determines a response time of said user for each of said presented one or more text elements during said capture of said matched modal input and utilizes said response time to determine said delay factor for said user.

20. The computer implemented system of claim 17, wherein said control unit comprises:
an element extraction module that detects and extracts one or more visual elements from said captured modal input in a visual mode of said modes based on said characteristic information of said user;
a scaling module that scales said extracted one or more visual elements to a predetermined scale;
a segmentation module that segments each of said scaled one or more visual elements into a predetermined number of blocks;
a numerical descriptor determination module that determines a numerical descriptor for said each of said scaled one or more visual elements based on number of highlighted visual constituents in each of said predetermined number of said blocks;
a mode association module that recognizes a gesture from a plurality of gestures stored in a database maintained by said multimodal communication assist application based on said determined numerical descriptor, in communication with one of said multimodal communication mappers; and
said mode association module that associates said recognized gesture with one or more text elements and/or one or more audio elements stored in said database to generate said modal output in a text mode of said modes and/or an audio mode of said modes respectively, that corresponds to said captured modal input in said visual mode, wherein said generated modal output in said text mode and/or said audio mode is rendered to said user via said interactive interface for assisting said user to learn and/or communicate in said visual communication language.

21. The computer implemented system of claim 20, wherein said mode association module, in communication with one of said multimodal communication mappers, associates said generated modal output in said text mode with one or more audio elements stored in said database to generate said modal output in said audio mode, wherein said generated modal output in said text mode and said audio mode is rendered to said user via said interactive interface for assisting said user to learn and/or communicate in said visual communication language.

22. The computer implemented system of claim 17, wherein said multimodal communication assist application further comprises:
an element extraction module in said control unit that extracts one or more text elements from said captured modal input in a text mode of said modes;
a mode association module in said control unit that retrieves one or more modal outputs in a visual mode of said modes and/or an audio mode of said modes for said extracted one or more text elements from a database maintained by said multimodal communication assist application; and
said database that archives said retrieved one or more modal outputs in said visual mode and/or said audio mode, wherein said archived one or more modal outputs in said visual mode and/or said audio mode are rendered to said user via said interactive interface for assisting said user to learn and/or communicate in said visual communication language.

23. The computer implemented system of claim 17, wherein said multimodal communication assist application further comprises an adaptive tutor unit comprising:
a learning and testing component generation module that generates learning components and testing components for said user using one or more of mappings of said modal input in said one of said modes to said modal output in said another one or more of said modes, said characteristic information of said user, said determined delay factor for said user, said proficiency level of said user defined by said multimodal communication assist application based on said determined delay factor, predetermined test information, and previous performance reports stored in a database maintained by said multimodal communication assist application;
said learning and testing component generation module that presents one of said generated learning components and said generated testing components in one or more of said modes to said user via said interactive interface based on said determined delay factor;
an evaluation module that evaluates said modal input in another one of said modes captured from said user by said modal input capture module based on said determined delay factor, based on said mappings of said modal input to said modal output stored in said database; and
said evaluation module that generates a performance report based on said evaluation, wherein said performance report is rendered to said user via said interactive interface.

24. The computer implemented system of claim 23, wherein said adaptive tutor unit communicates with a central adaptive learning system via a communication network for said generation of said learning components and said testing components, wherein said central adaptive learning system gathers performance data of a plurality of users for enhancing said generation of said learning components and said testing components.

25. The computer implemented system of claim 23, wherein said adaptive tutor unit further comprises a performance tracker that tracks performance of said user who engages with said generated learning components and said generated testing components to select said generated learning components and said generated testing components to be presented to said user via said interactive interface for assisting said user to learn and/or communicate in said visual communication language in said one or more of said modes.

26. The computer implemented system of claim 17, wherein said multimodal communication assist application further comprises a mapping acquisition module that acquires one or more mappings of said modal input in one or more of said modes to said modal output in another one or more of said modes from said user via said interactive interface and stores said acquired one or more mappings in a database maintained by said multimodal communication assist application.

27. The computer implemented system of claim 17, wherein said modal input capture module communicates with an input device for capturing said modal input in said one of said modes from said user based on said determined delay factor via said interactive interface, wherein said input device is one of a keyboard, a touchpad, a microphone, and an image recording device.

28. A computer program product comprising computer executable instructions embodied in a non-transitory computer readable storage medium executable by a processor wherein said computer program product comprises:
a first computer program code for providing a multimodal communication assist application on a computing device of a user, wherein said multimodal communication assist application provides an interactive interface to said user for enabling communication of a visual communication language in a plurality of modes;

a second computer program code for providing a plurality of multimodal communication mappers to said user by said multimodal communication assist application via said interactive interface, wherein said multimodal communication mappers map a modal input in one of said modes to a modal output in another one or more of said modes;

a third computer program code for receiving a selection of one of said multimodal communication mappers from said user via said interactice interface, acquiring user-defined communication mappers by said multimodal communication assist application, adapting said multimodal communication assist application for said received user-selected multimodal communication mapper and said acquired user-defined communication mappers, and determining characteristic information of said user by said multimodal communication assist application based on one or more of said received multimodal communication mapper and said acquired user-defined communication mappers;

a fourth computer program code for determining a delay factor for said user based on a calculation of response times of said user for repeating each of a set of pre-stored gestures presented to said user along with a corresponding set of words, by said multimodal communication assist application, using a set of formulas:

Delay Factor=Total time $T_t/(C-2)$;

$T_t=(T_1+T_2+T_3+\ldots+T_C-T_{max}-T_{min})$;

wherein $T_1, T_2, T_3 \ldots T_C$ are response times of said user for repeating each of a set of pre-stored gestures presented to said user along with a corresponding set of words;

C is total number of said pre-stored gestures and words presented to said user;

said $T_{max}$ is slowest among the response times; and
said $T_{min}$ is fastest among the response times;

a fifth computer program code for capturing said modal input in one of said modes from said user via said interactive interface based on said determined delay factor and one or more of said characteristic information by said multimodal communication assist application, wherein said multimodal communication assist application controls sampling rate of said capturing of said modal input based on user's proficiency level, and wherein said proficiency level of said user is determined by said multimodal communication assist application based on said determined delay factor using a criteria set comprising:

(a) if said delay factor is greater than or equal to 2.5 seconds, then said multimodal communication assist application defines and displays said proficiency level of said user as "beginner" on said interactive interface;

(b) if said delay factor is greater than or equal to 2 seconds and less than 2.5 seconds, then said multimodal communication assist application defines and displays said proficiency level of said user as "advanced beginner" on said interactive interface;

(c) if said delay factor is greater than or equal to 1.5 seconds and less than 2 seconds, then said multimodal communication assist defines and displays said proficiency level of said user as "competent" on said interactive interface;

(d) if said delay factor is greater than or equal to 1 second and less than 1.5 seconds, then said multimodal communication assist defines and displays said proficiency level of said user as "professional" on said interactive interface; and (e) if said delay factor is less than 1 second, then said multimodal communication assist application defines and displays said proficiency level of said user as "expert" on said interactive interface; and a sixth computer program code for processing and transforming said captured modal input in said one of said modes into said modal output in said another one or more of said modes using said selected one or more multimodal communication mappers by said multimodal communication assist application, wherein said multimodal communication assist application renders said modal output in said another one or more of said modes to said user via said interactive interface for assisting said user to learn and/or communicate in said visual communication language in said one or more of said modes.

29. The computer program product of claim 28, further comprising:

a seventh computer program code for detecting and extracting one or more visual elements from said captured modal input in a visual mode of said modes based on said characteristic information of said user;

an eighth computer program code for scaling said extracted one or more visual elements to a predetermined scale;

a ninth computer program code for segmenting each of said scaled one or more visual elements into a predetermined number of blocks;

a tenth computer program code for determining a numerical descriptor for said each of said scaled one or more visual elements based on number of highlighted visual constituents in each of said predetermined number of said blocks;

an eleventh computer program code for recognizing a gesture from a plurality of gestures stored in a database maintained by said multimodal communication assist application based on said determined numerical descriptor; and a twelfth computer program code for associating said recognized gesture with one or more text elements and/or one or more audio elements stored in said database to generate said modal output in a text mode of said modes and/or an audio mode of said modes respectively, that corresponds to said captured modal input in said visual mode, wherein said generated modal output in said text mode and/or said audio mode is rendered to said user via said interactive interface for assisting said user to learn and/or communicate in said visual communication language.

30. The computer program product of claim 28, further comprising a thirteenth computer program code for generating learning components and testing components for said user using one or more of mappings of said modal input in said one of said modes into said modal output in said another one or more of said modes, said characteristic information of said user, said determined delay factor for said user, a proficiency level of said user defined by said multimodal communication assist application based on said determined delay factor, predetermined test information, and previous performance reports stored in a database maintained by said multimodal communication assist application.

31. A computer implemented method for assisting a user to learn and/or communicate in a visual communication language in one or more of a plurality of modes, comprising:
- providing a multimodal communication assist application embedded in a non-transitory computer readable storage medium executable by a processor of said user, wherein said multimodal communication assist application provides an interactive interface to said user for enabling communication of said visual communication language in said modes;
- providing a plurality of multimodal communication mappers to said user by said multimodal communication assist application via said interactive interface, wherein said multimodal communication mappers map a modal input in one of said modes to a modal output in another one or more of said modes;
- receiving a selection of one of said multimodal communication mappers from said user via said interactive interface;
- acquiring user-defined communication mappers by said multimodal communication assist application;
- adapting said multimodal communication assist application for said received user-selected one of said multimodal communication mappers and said user-defined communication mappers acquired by said multimodal communication assist application;
- determining characteristic information of said user by said multimodal communication assist application based on one or more of said user-selected multimodal communication mapper and said acquired user-defined communication mappers;
- determining a delay factor for said user based on a calculation of response times of said user for repeating each of a set of pre-stored gestures presented to said user along with a corresponding set of words, by said multimodal communication assist application, by steps comprising:
  - presenting a set of pre-stored gestures and a corresponding set of words to said user;
  - repeating each of said presented gestures by said user;
  - determining a set of response times of said user for said repeating of each of said presented gestures;
  - ignoring maximum response time and minimum response time from said set of determined response times;
  - determining total response time for said set of gestures after said ignoring of said maximum response time and said minimum response time; and
  - calculating said delay factor by dividing said determined total response time by number of said presented gestures after ignoring two gestures out of said presented set of gestures that resulted in said maximum response time and said minimum response time;
- capturing said modal input in one of said modes from said user via said interactive interface based on said determined delay factor and one or more of said characteristic information by said multimodal communication assist application; and
- processing and transforming said captured modal input in said one of said modes into said modal output in said another one or more of said modes using said selected one or more multimodal communication mappers by said multimodal communication assist application, wherein said multimodal communication assist application renders said modal output in said another one or more of said modes to said user via said interactive interface for assisting said user to learn and/or communicate in said visual communication language in said one or more of said modes.

32. A computer implemented method for assisting a user to learn and/or communicate in a visual communication language in one or more of a plurality of modes, comprising:
- providing a multimodal communication assist application embedded in a non-transitory computer readable storage medium executable by a processor of said user, wherein said multimodal communication assist application provides an interactive interface to said user for enabling communication of said visual communication language in said modes;
- providing a plurality of multimodal communication mappers to said user by said multimodal communication assist application via said interactive interface, wherein said multimodal communication mappers map a modal input in one of said modes to a modal output in another one or more of said modes;
- receiving a selection of one of said multimodal communication mappers from said user via said interactice interface;
- acquiring user-defined communication mappers by said multimodal communication assist application;
- adapting said multimodal communication assist application for said received user-selected one of said multimodal communication mappers and said user-defined communication mappers acquired by said multimodal communication assist application;
- determining characteristic information of said user by said multimodal communication assist application based on one or more of said user-selected multimodal communication mapper and said acquired user-defined communication mappers;
- presenting a set of pre-stored gestures to said user along with a corresponding set of words and calculating response time of said user for repeating each of said presented gestures, by said multimodal communication assist application;
- determining a delay factor for said user by calculating average response time of said user after ignoring maximum and minimum of said calculated response times, by said multimodal communication assist application;
- determining a proficiency level of said user based on said determined delay factor, by said multimodal communication assist application;
- capturing said modal input in one of said modes from said user via said interactive interface based on said determined delay factor and one or more of said characteristic information by said multimodal communication assist application, wherein said multimodal communication assist application controls sampling rate of said capturing of said modal input based on said determined proficiency level; and
- processing and transforming said captured modal input in said one of said modes into said modal output in said another one or more of said modes using said selected one or more multimodal communication mappers by said multimodal communication assist application, wherein said multimodal communication assist application renders said modal output in said another one or more of said modes to said user via said interactive interface for assisting said user to learn and/or communicate in said visual communication language in said one or more of said modes.

* * * * *